United States Patent
Tachibana et al.

(10) Patent No.: US 11,095,786 B2
(45) Date of Patent: Aug. 17, 2021

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventors: Yoshiro Tachibana, Inagi (JP); Jun Miyajima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/749,765

(22) Filed: Jan. 22, 2020

(65) Prior Publication Data

US 2020/0162622 A1 May 21, 2020

Related U.S. Application Data

(63) Continuation of application No. 16/038,796, filed on Jul. 18, 2018, now Pat. No. 10,582,074, which is a continuation of application No. 15/592,025, filed on May 10, 2017, now Pat. No. 10,079,946, which is a continuation of application No. 14/832,904, filed on Aug. 21, 2015, now Pat. No. 9,686,429.

(30) Foreign Application Priority Data

Aug. 26, 2014 (JP) ................................. 2014-171160
Jul. 10, 2015 (JP) ................................. 2015-138897

(51) Int. Cl.
*G06F 3/12* (2006.01)
*G03G 15/00* (2006.01)
*H04N 1/00* (2006.01)

(52) U.S. Cl.
CPC ......... *H04N 1/0048* (2013.01); *G03G 15/502* (2013.01); *G03G 15/6544* (2013.01); *G06F 3/121* (2013.01); *G06F 3/1234* (2013.01); *H04N 1/00575* (2013.01); *H04N 1/00631* (2013.01); *H04N 1/00641* (2013.01); *H04N 1/00663* (2013.01); *G03G 2215/00738* (2013.01); *G03G 2215/00936* (2013.01); *H04N 2201/0094* (2013.01)

(58) Field of Classification Search
None
See application file for complete search history.

(56) References Cited

U.S. PATENT DOCUMENTS 6,632,035 B1 * 10/2003 Kawamoto ............... B41J 3/60
400/61

* cited by examiner

*Primary Examiner* — Dov Popovici
(74) *Attorney, Agent, or Firm* — Canon U.S.A., Inc. I.P. Division

(57) ABSTRACT

A printing apparatus capable of conveying sheets to a sheet processing apparatus and to control the type of a sheet to be used as a cover sheet in a case where a book bound product is generated by switching back sheets each having an image printed, inverting the sheets and folding the inverted sheets, and to notify an error to a user based on the type of a sheet to be used as the cover sheet in a case where printing an image on the cover sheet is designated.

8 Claims, 85 Drawing Sheets

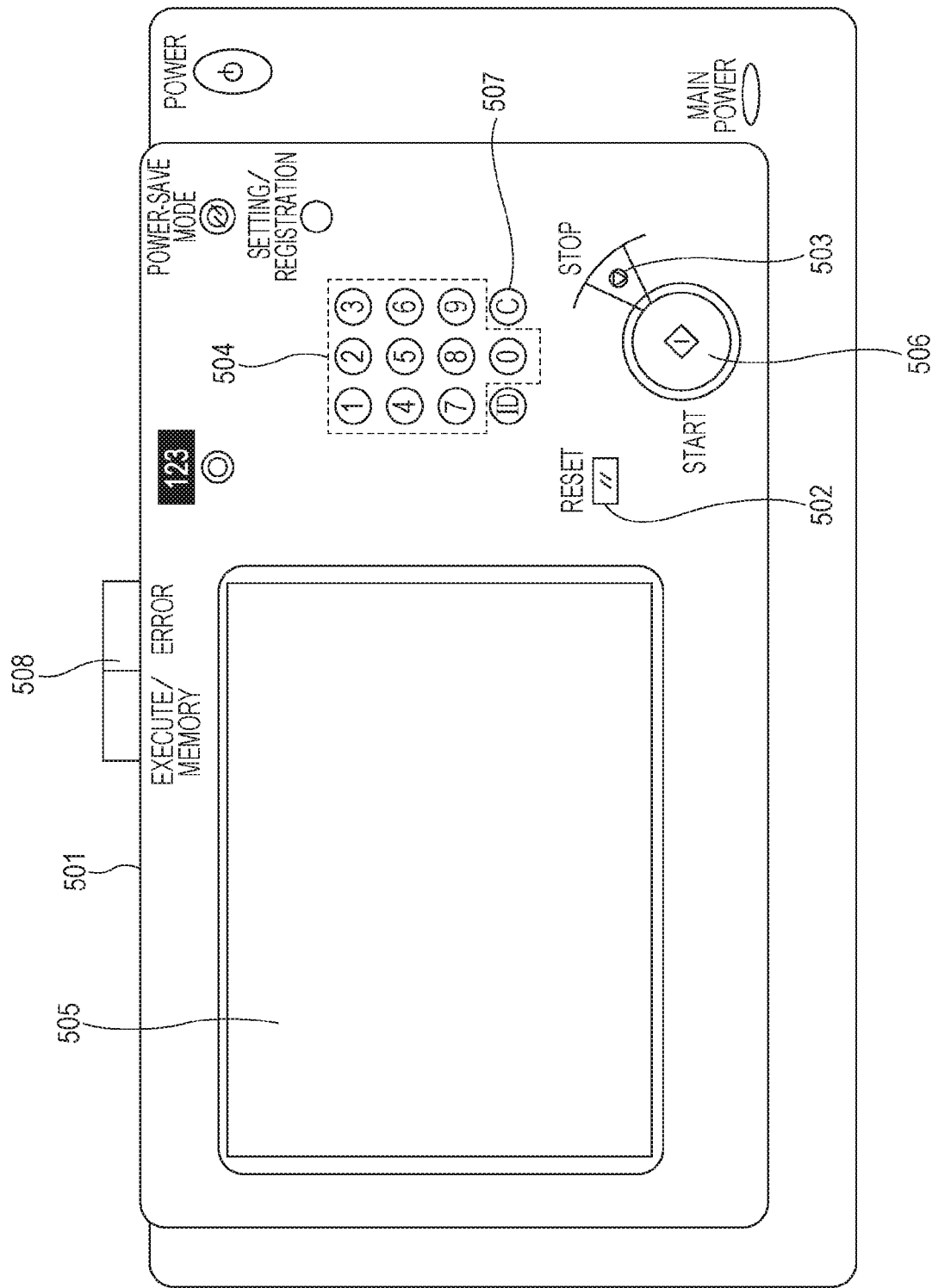

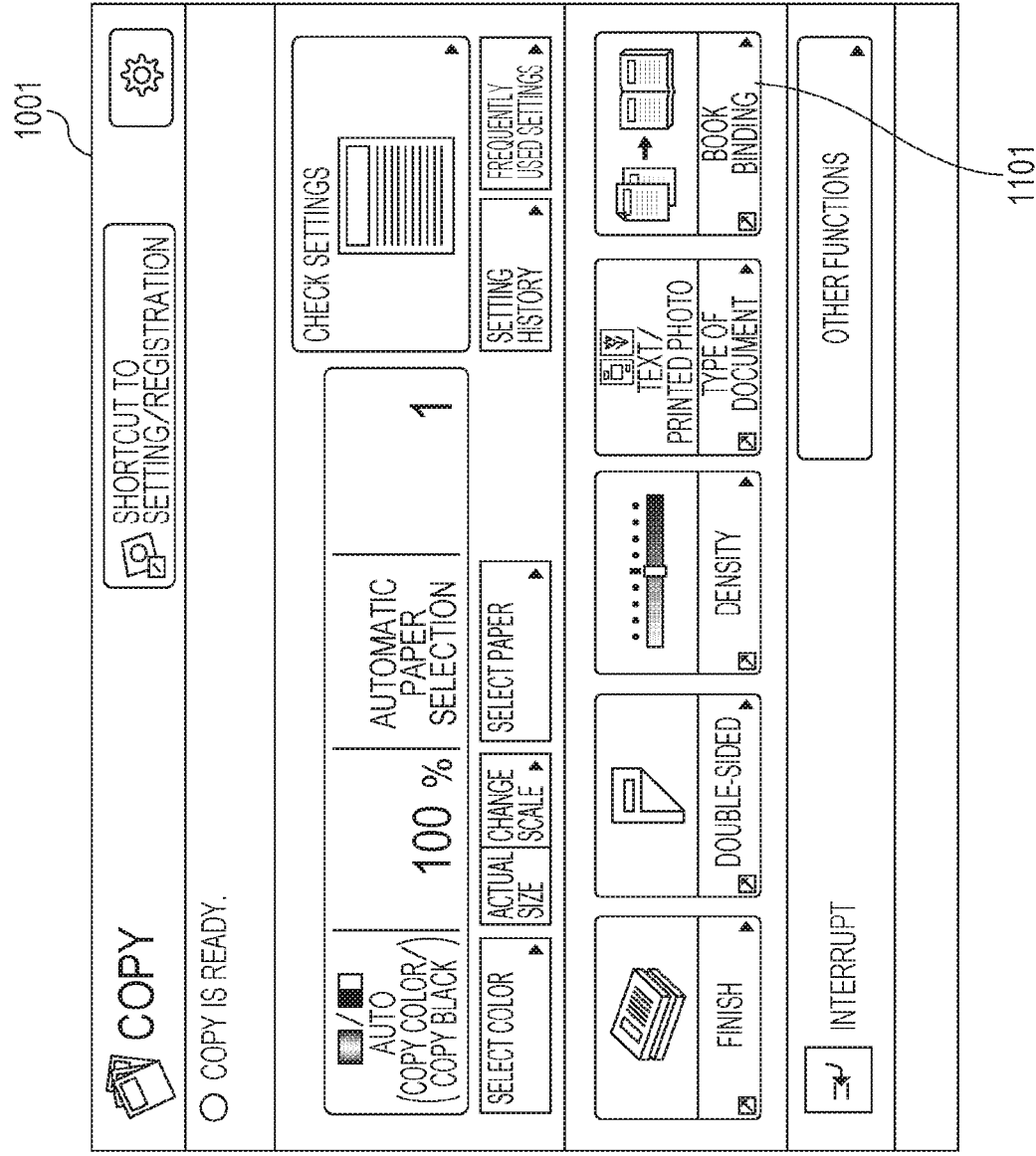

FIG. 5C

| PAPER SIZE | NAME |
|---|---|
| A3 | PLAIN PAPER (64 TO 105 g/m²) |
| A3 | CARDBOARD 1 (106 TO 150 g/m²) |
| A3 | CARDBOARD 2 (151 TO 220 g/m²) |
| A3 | CARDBOARD 3 (221 TO 256 g/m²) |
| A3 | CARDBOARD 4 (257 TO 300 g/m²) |

COPY

<PAPER SIZE>
SELECT PAPER SIZE.

PAPER SIZES 320×450 mm, 306×457 mm, A3, B4, A4, 11×17, LGL, LTR ARE AVAILABLE.

SHORTCUT TO SETTING/REGISTRATION

DETAIL INFORMATION

1/2

OK

1003

1112

1113

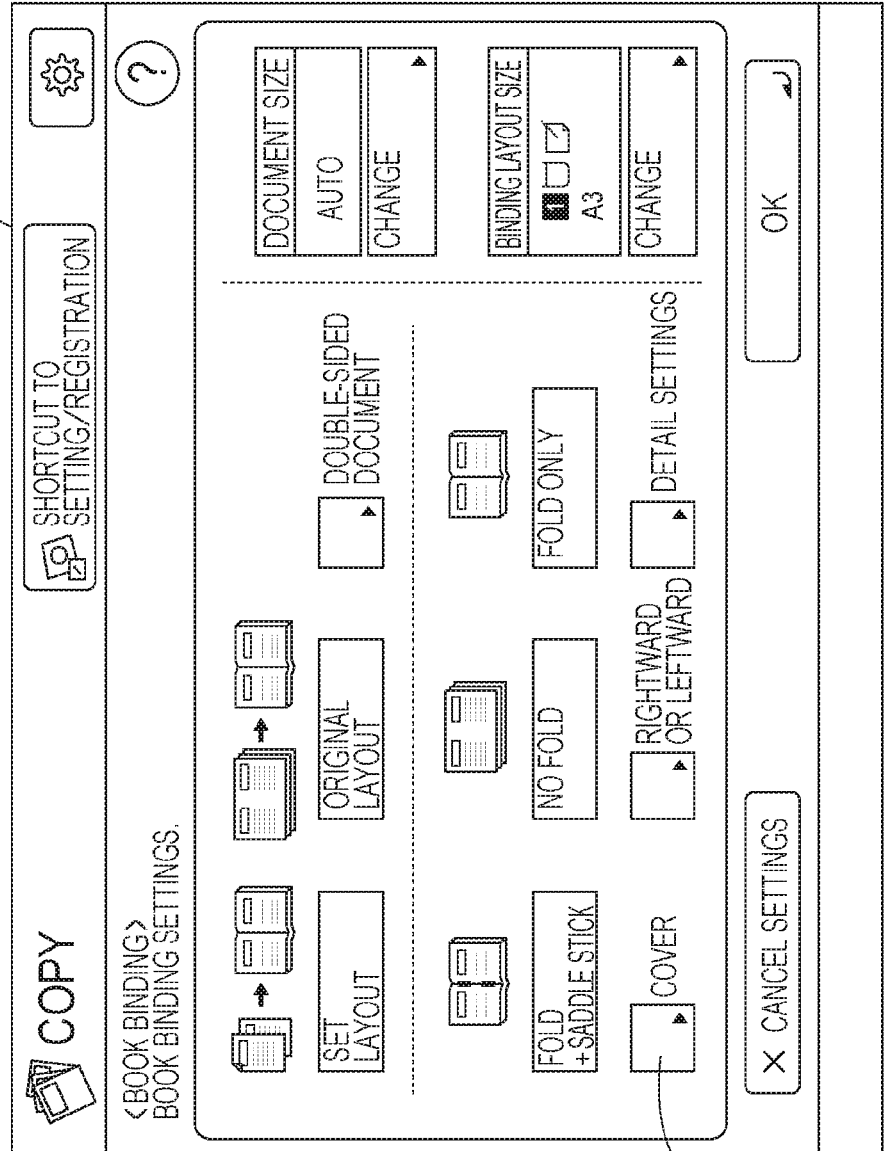

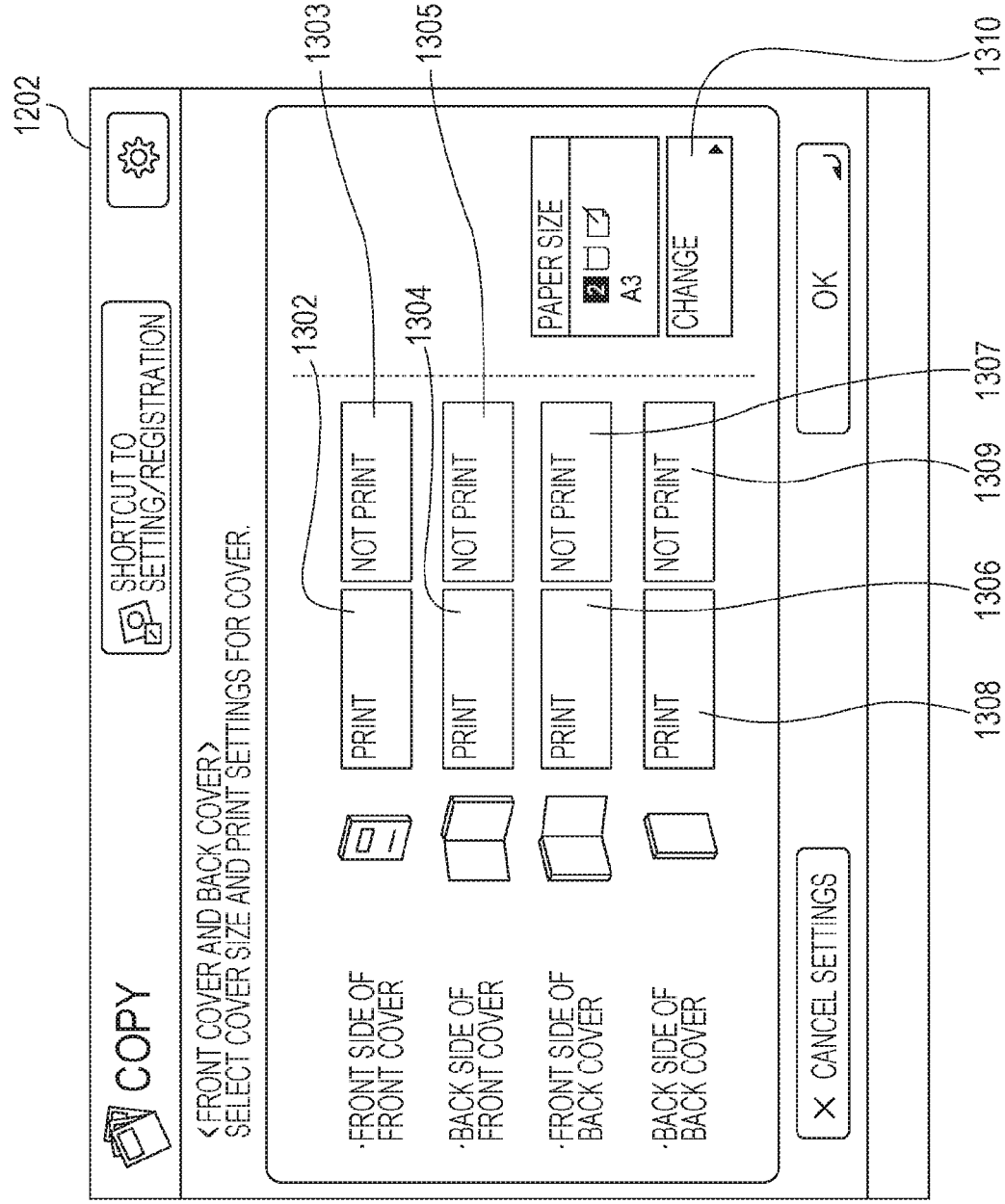

FIG. 7

| TYPE OF PAPER | BASIS WEIGHT | DOUBLE-SIDED PRINTING | PAPER REVERSE AND DISCHARGE | BOOK BOUND PRODUCT (OR COVER) |
|---|---|---|---|---|
| PLAIN PAPER | 64 TO 105 g/m$^2$ | YES | YES | YES |
| CARDBOARD 1 | 106 TO 150 g/m$^2$ | YES | YES | YES |
| CARDBOARD 2 | 151 TO 220 g/m$^2$ | YES | YES | YES |
| CARDBOARD 3 | 221 TO 256 g/m$^2$ | NO | YES | YES |
| CARDBOARD 4 | 257 TO 300 g/m$^2$ | NO | NO | YES |

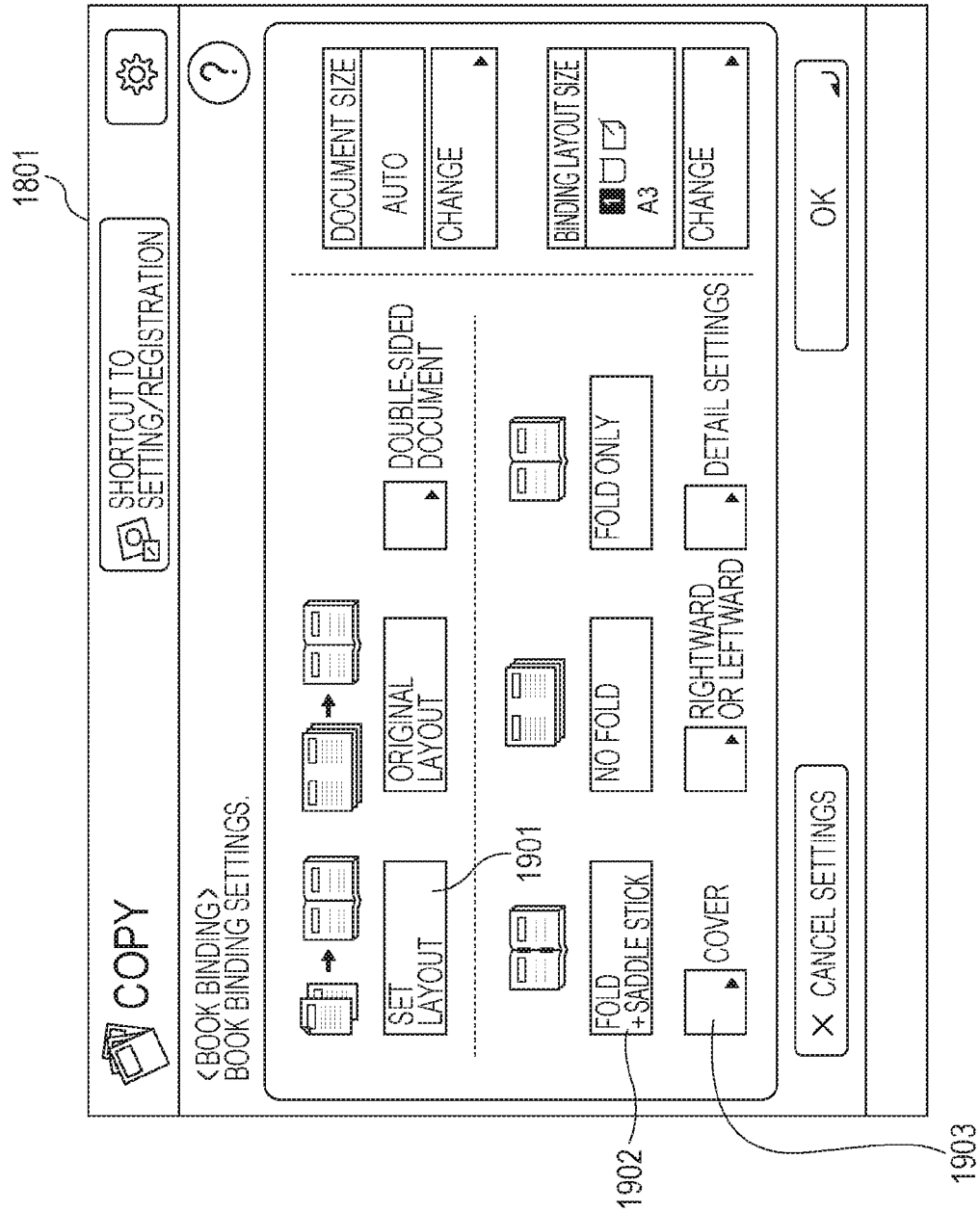

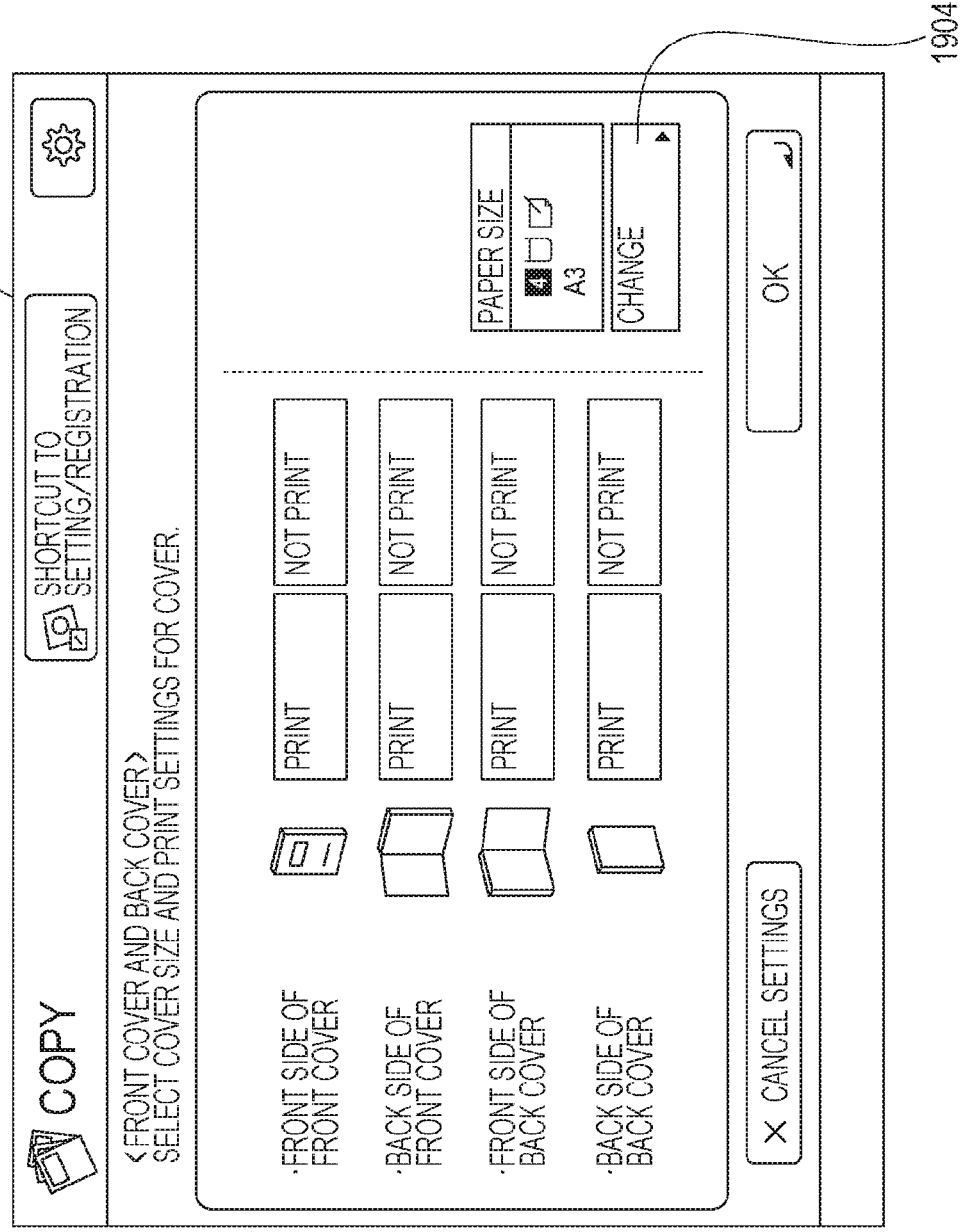

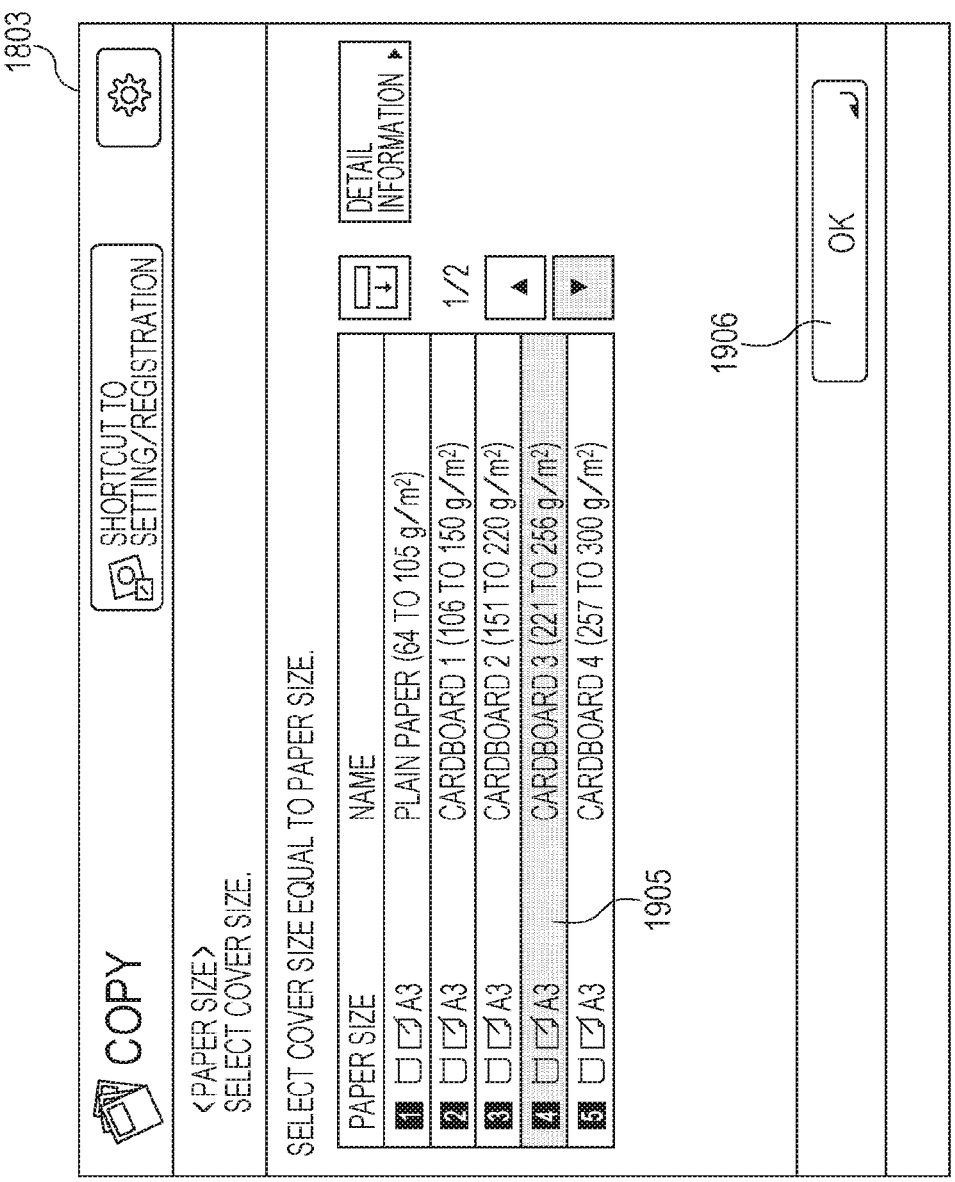

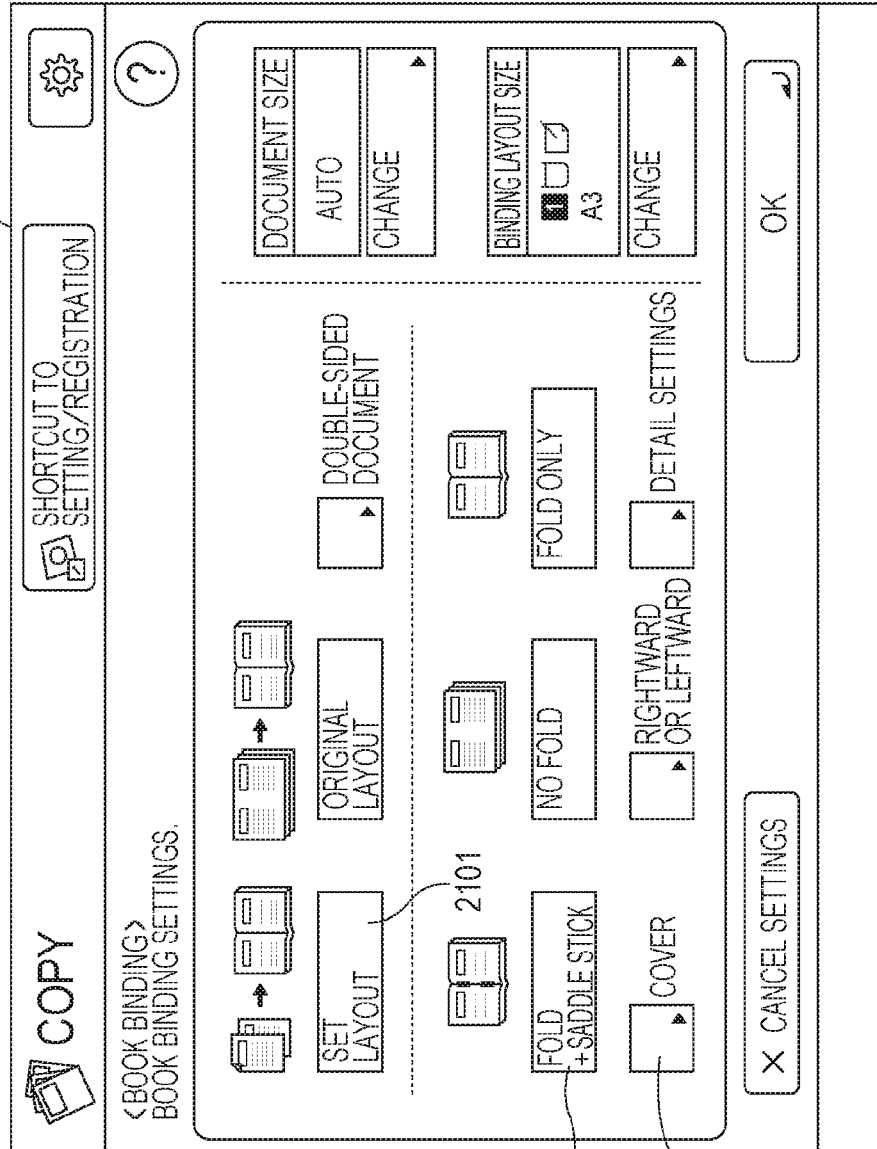

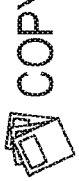

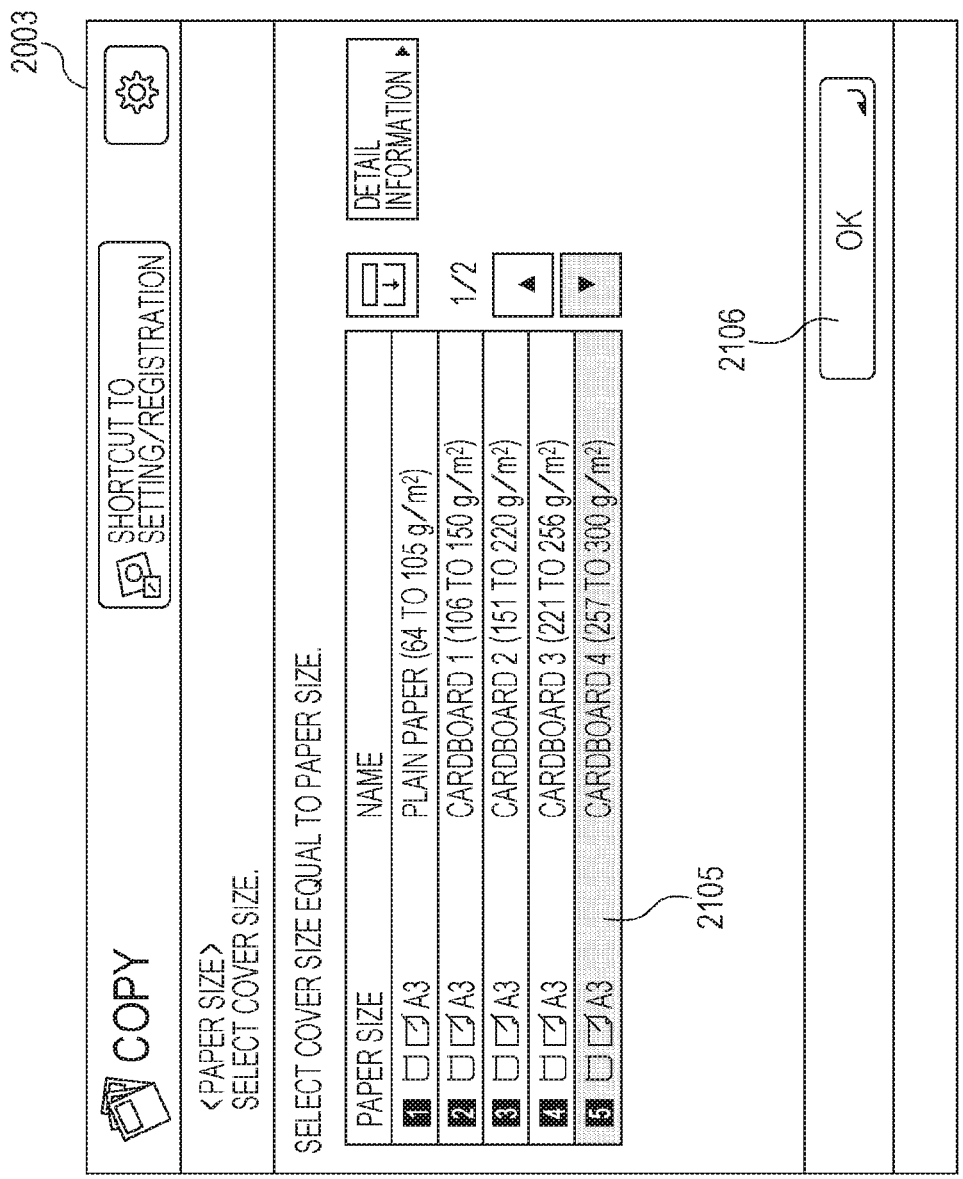

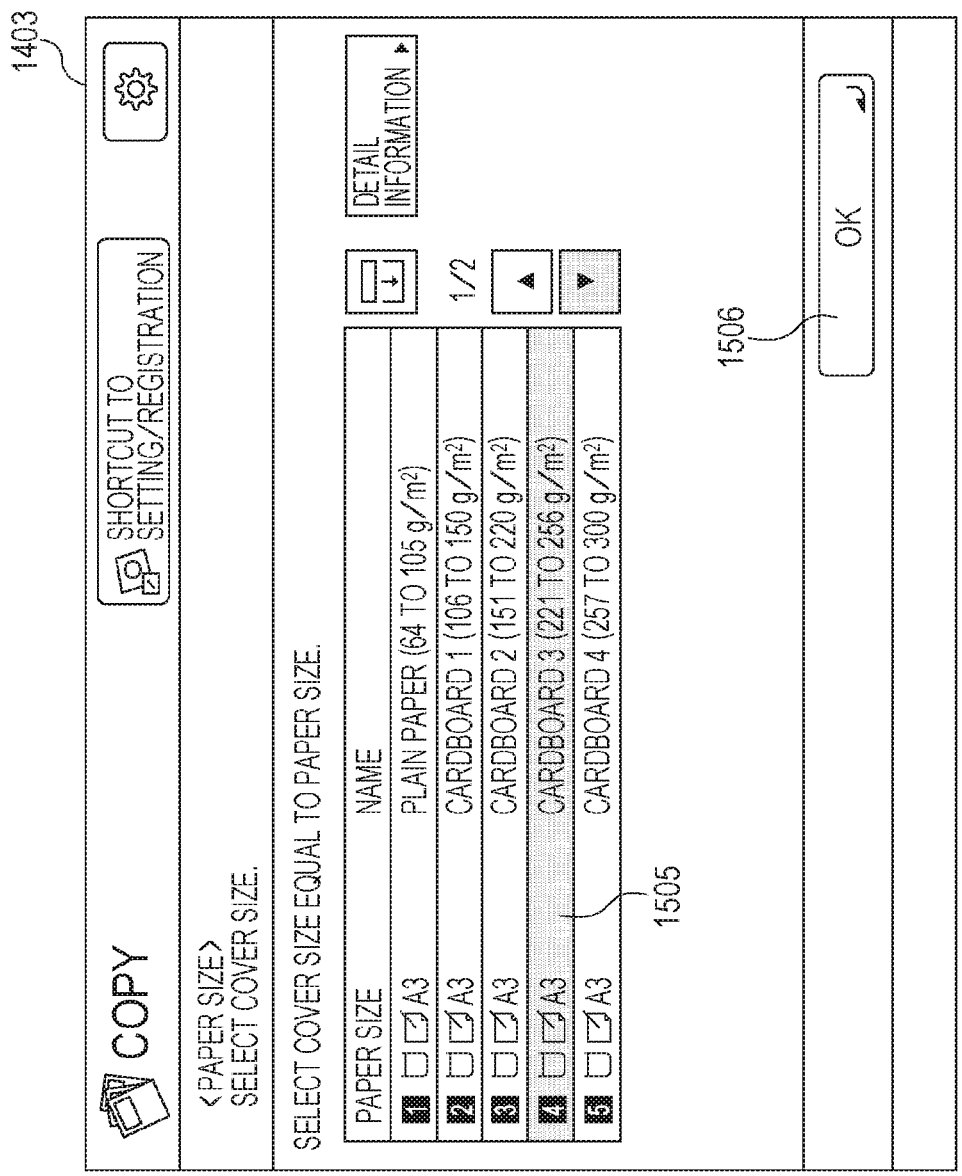

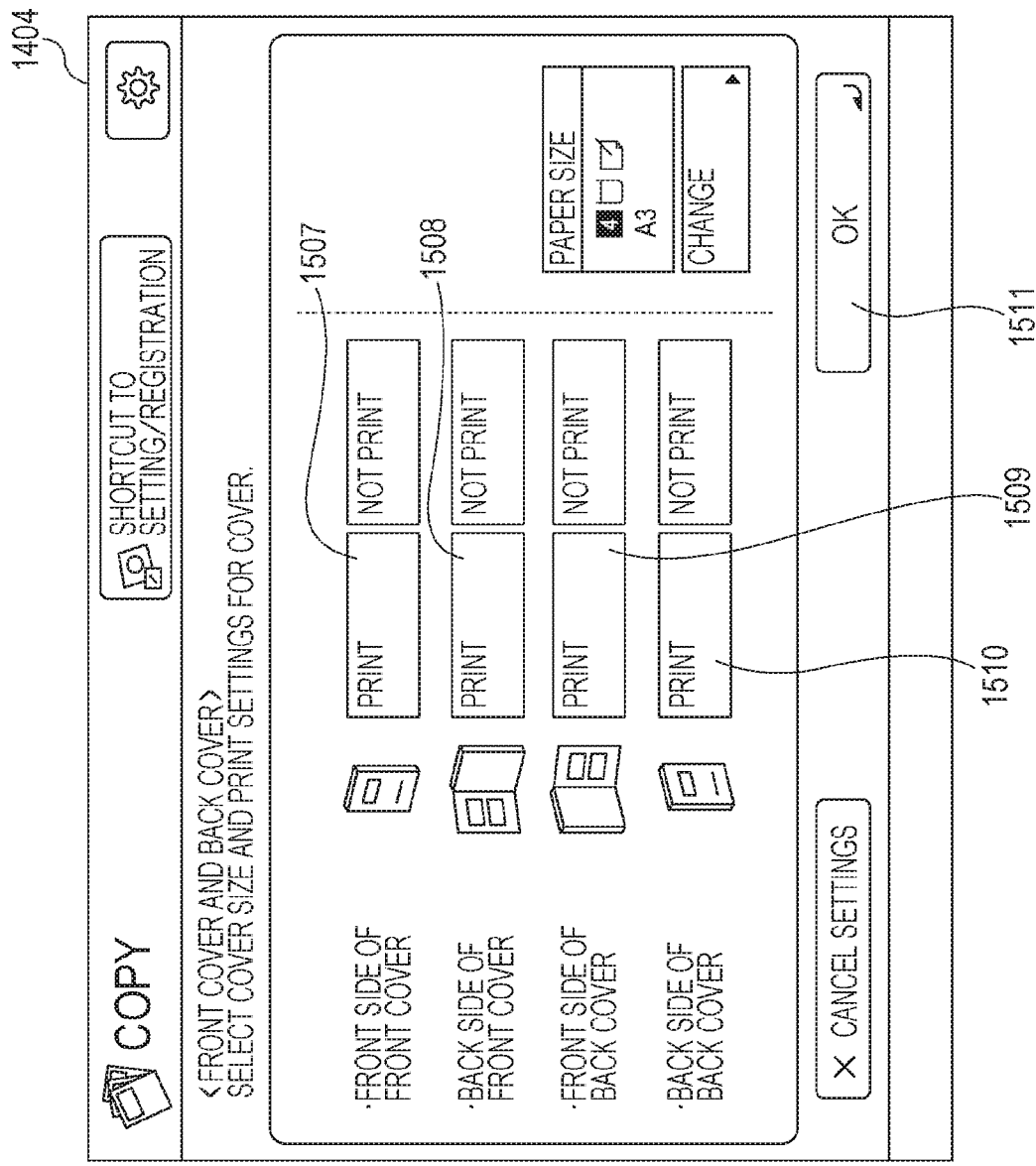

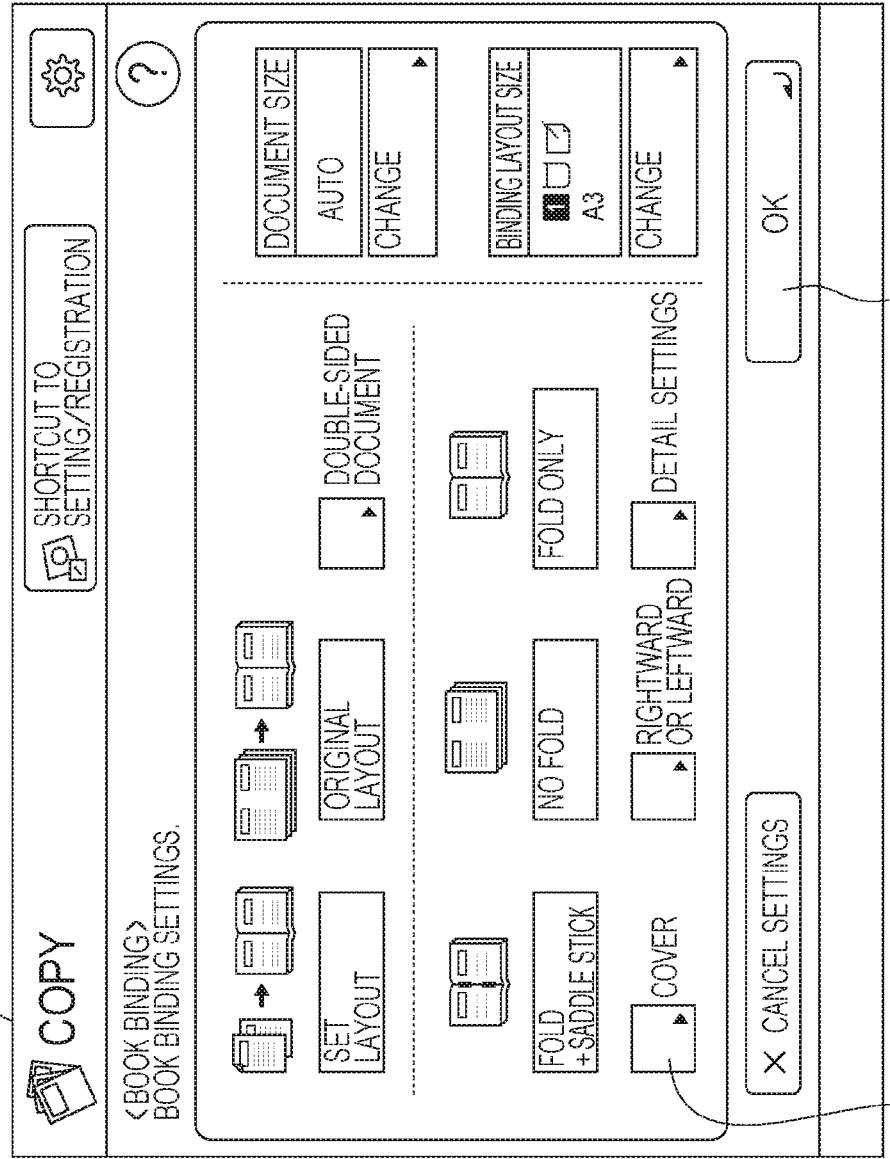

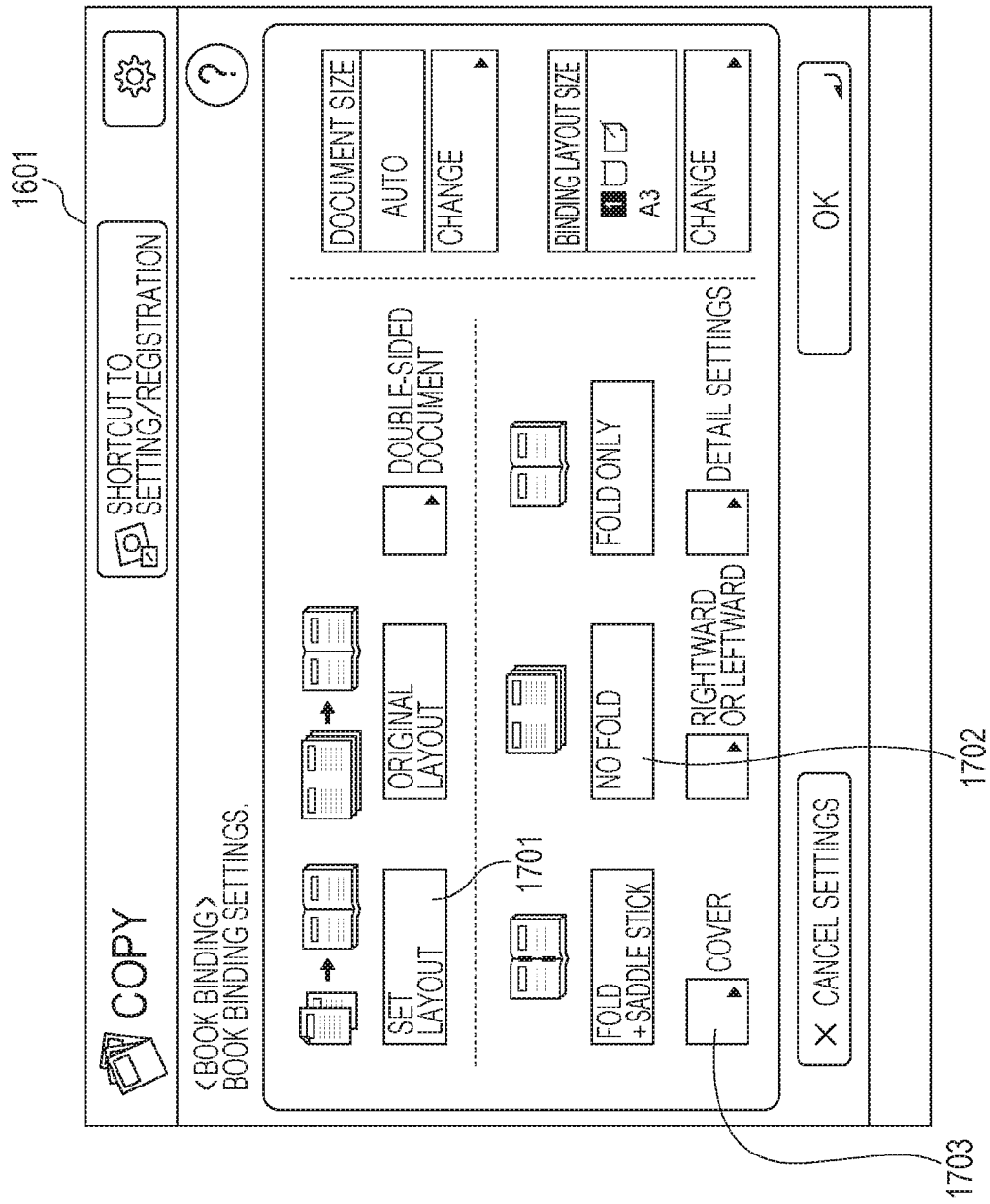

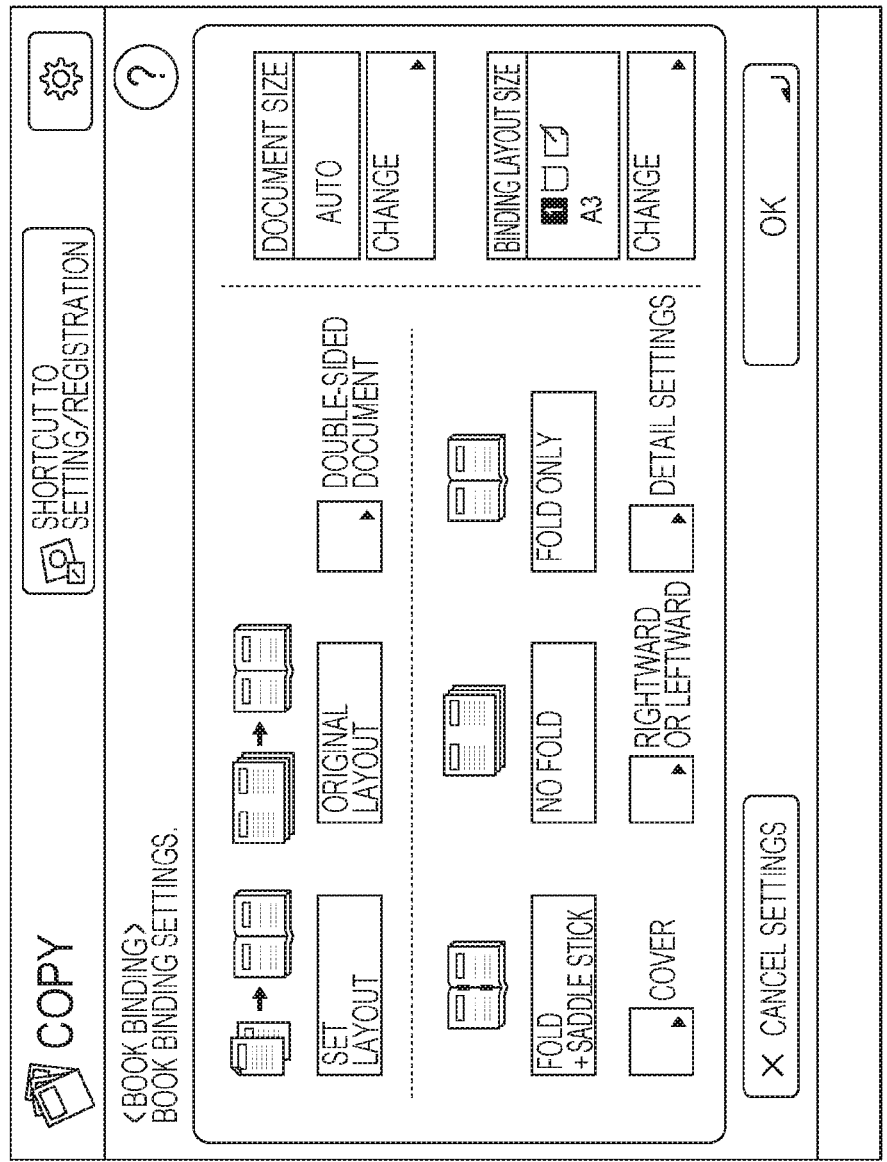

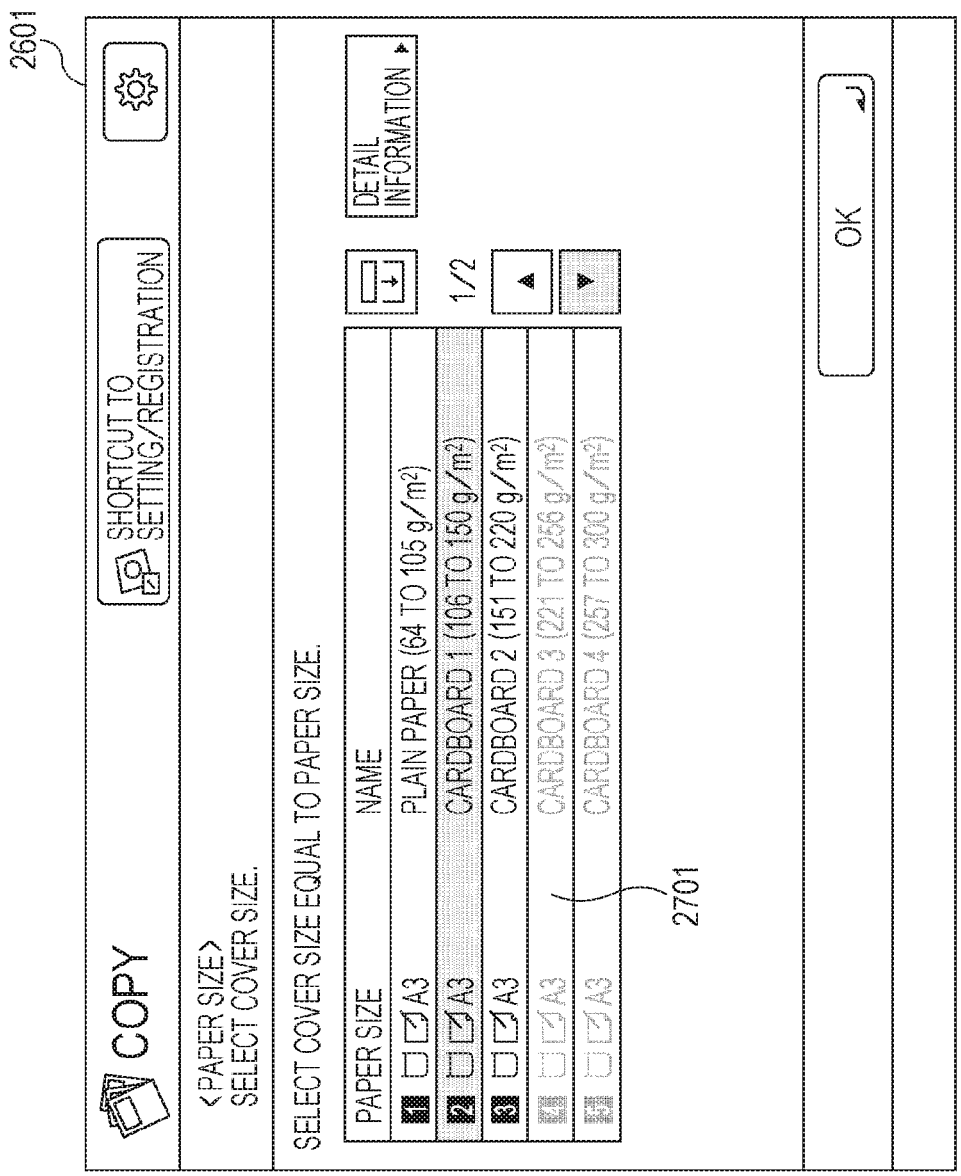

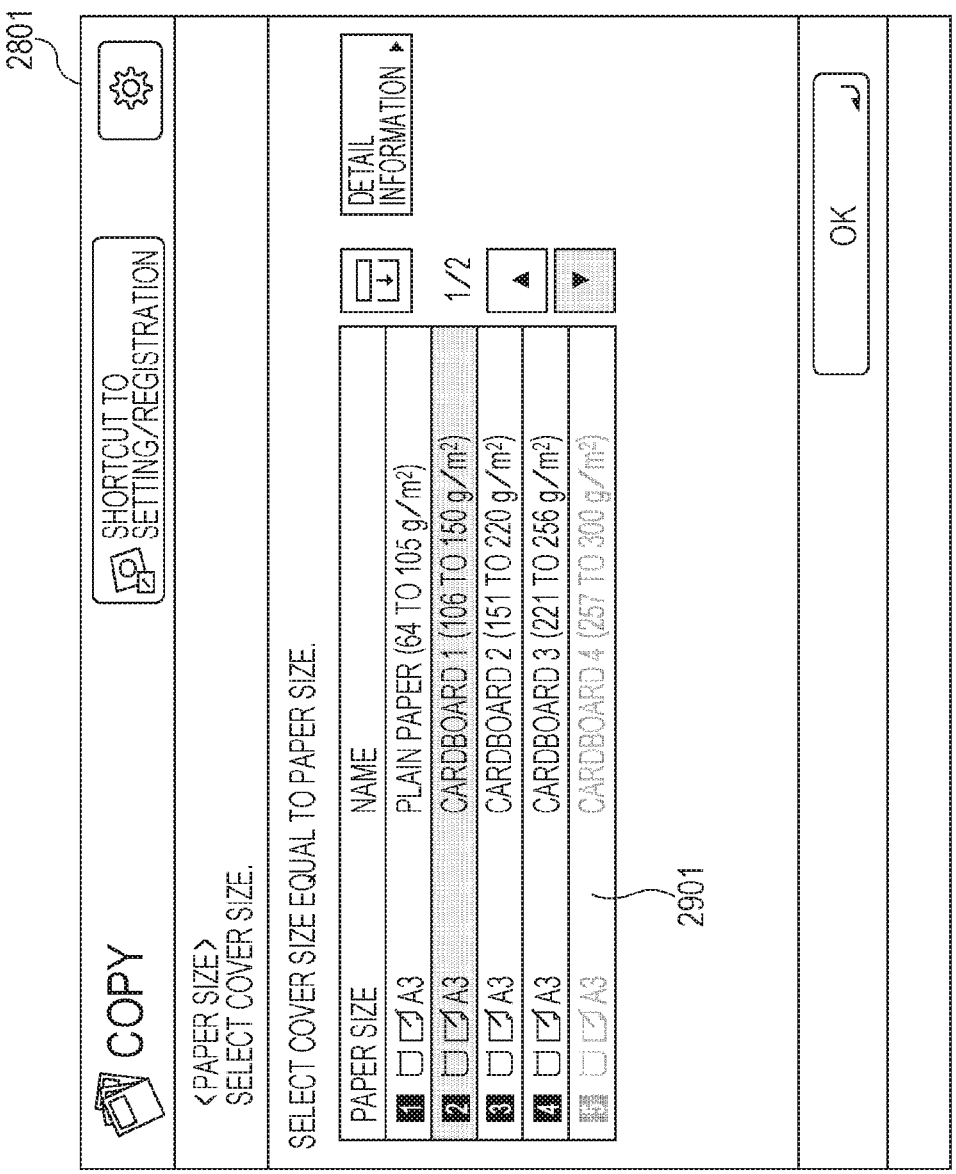

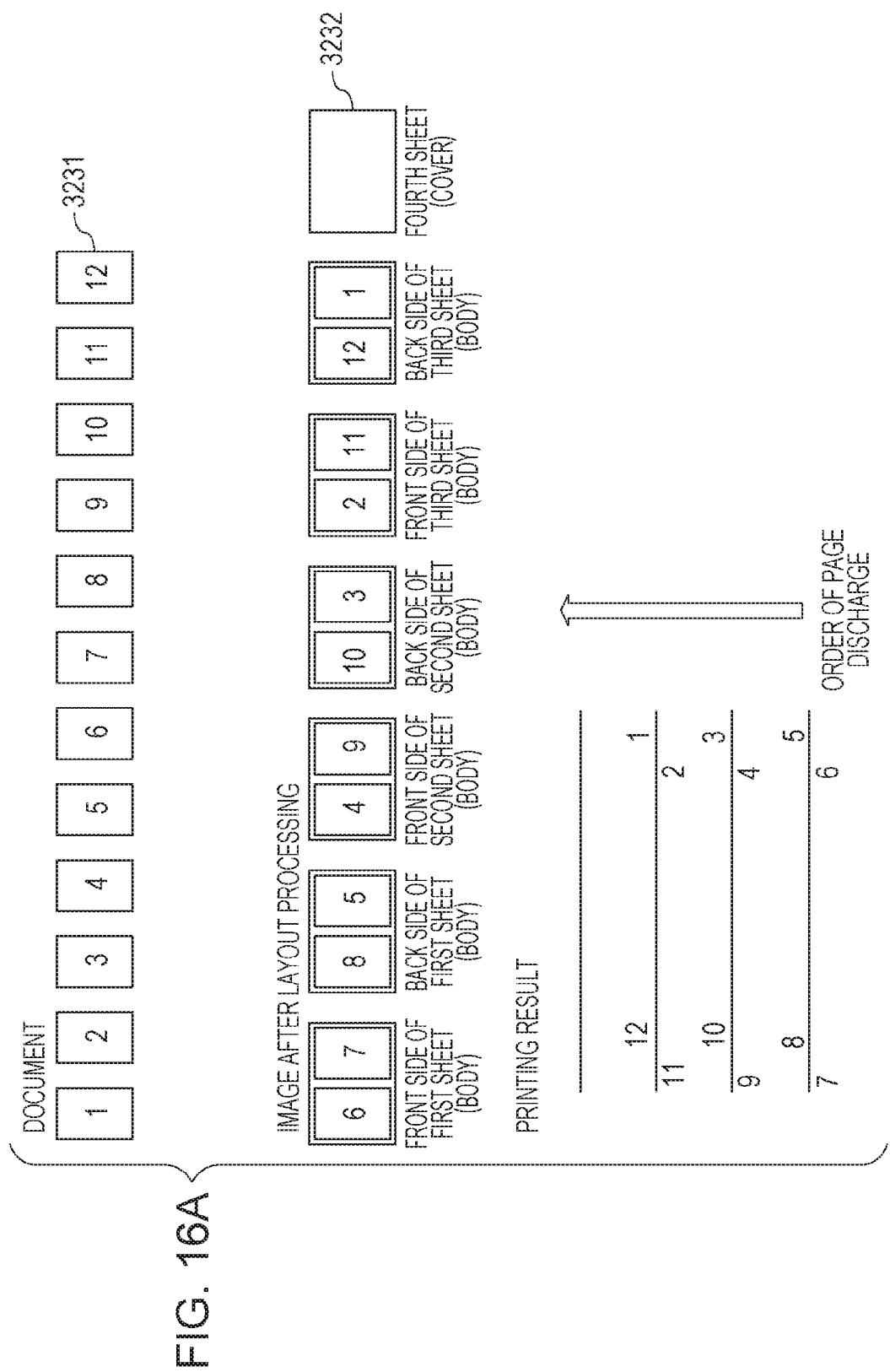

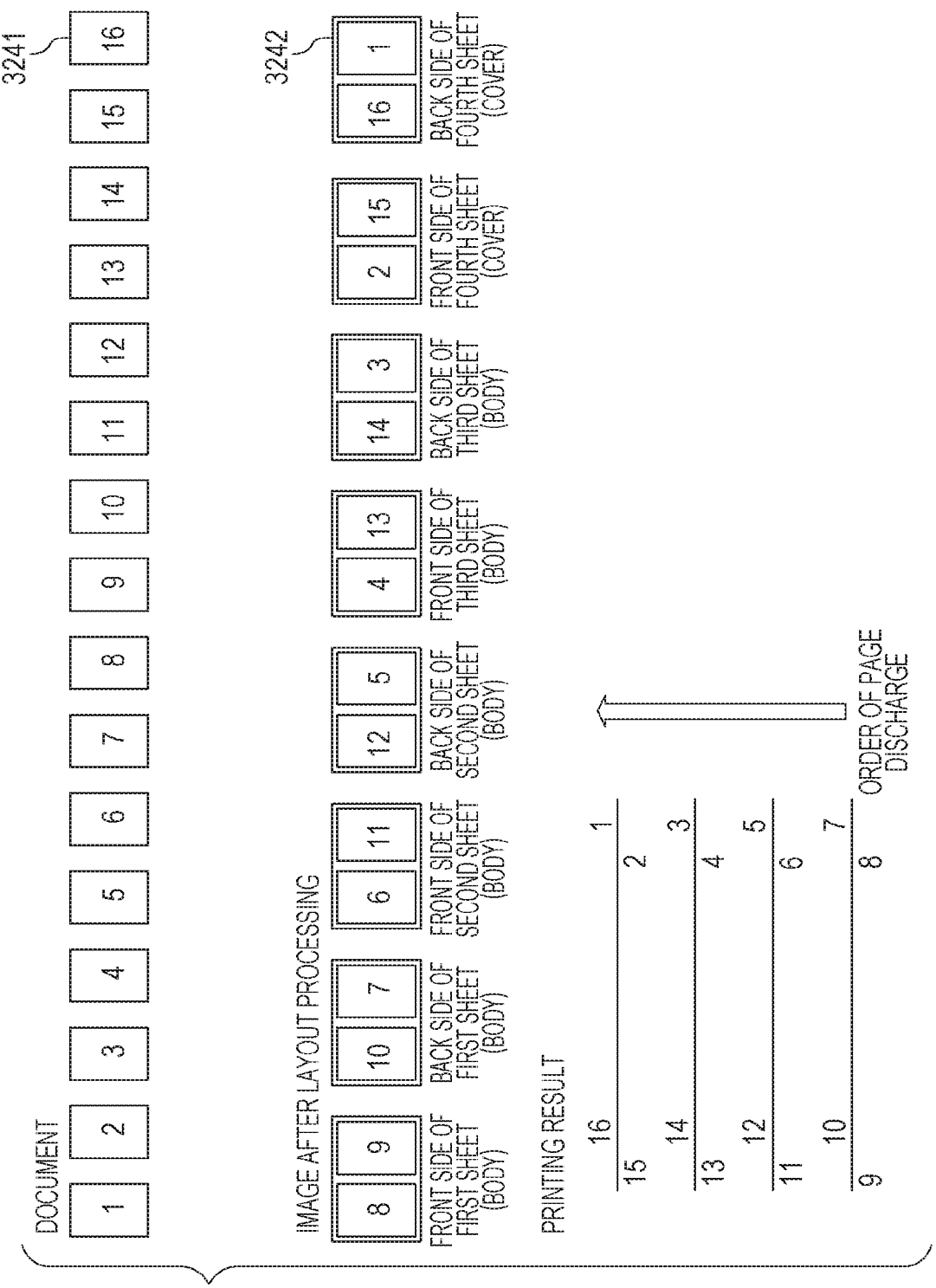

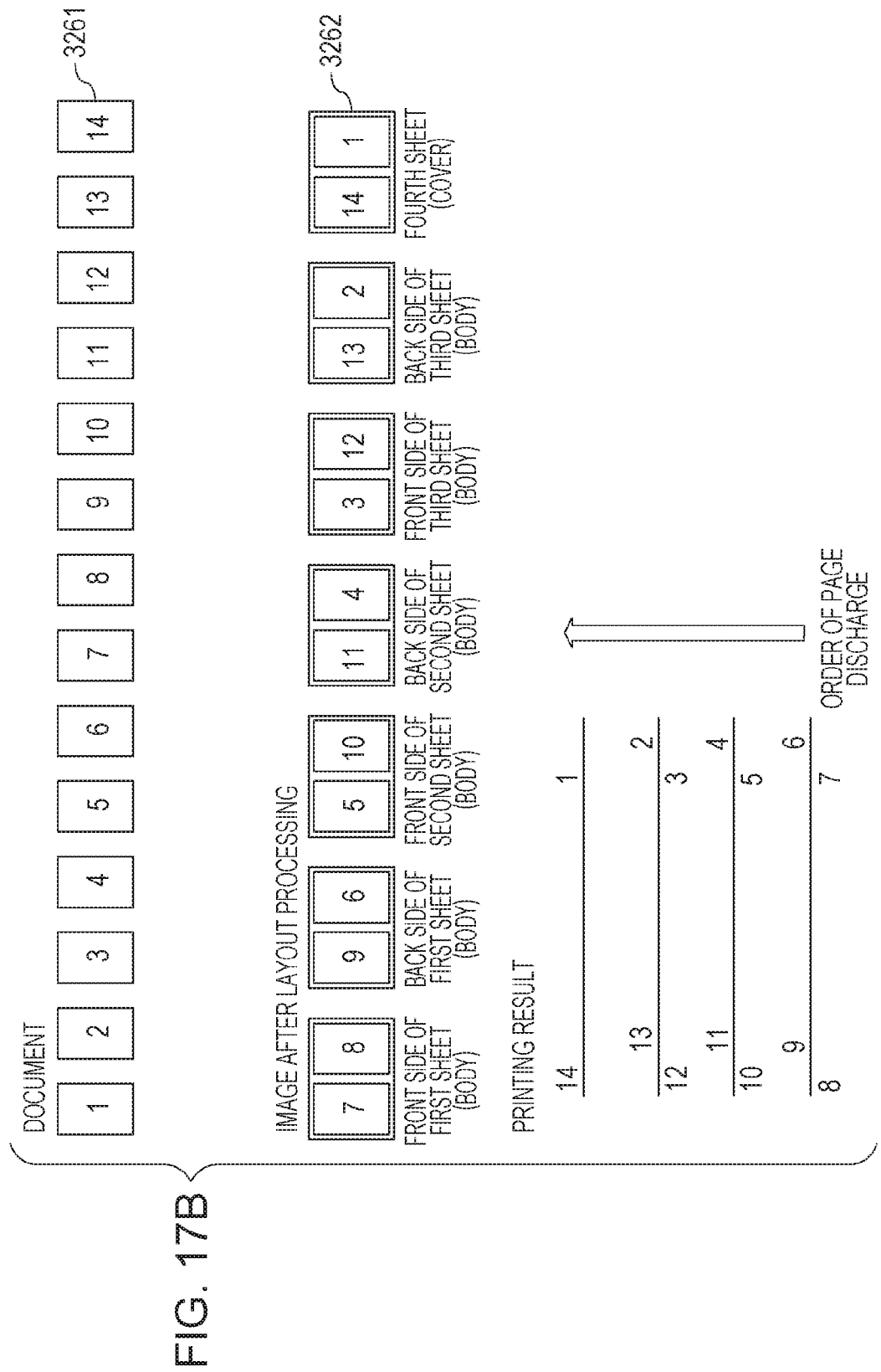

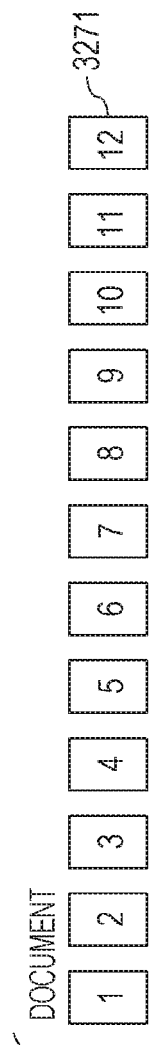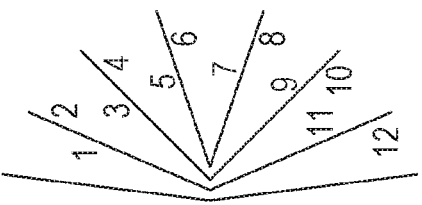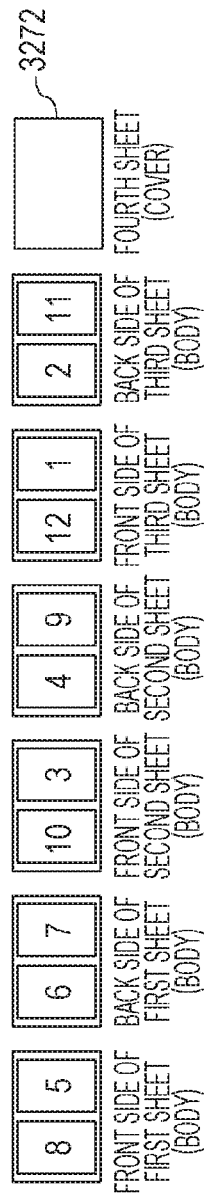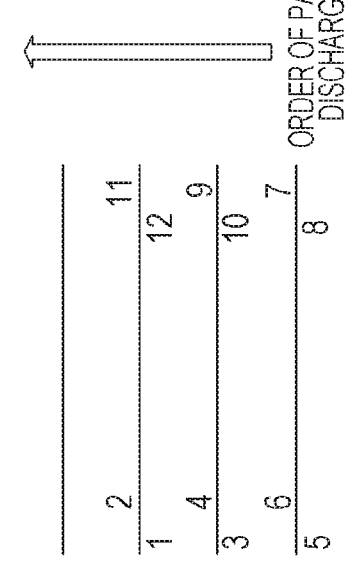
FIG. 18A

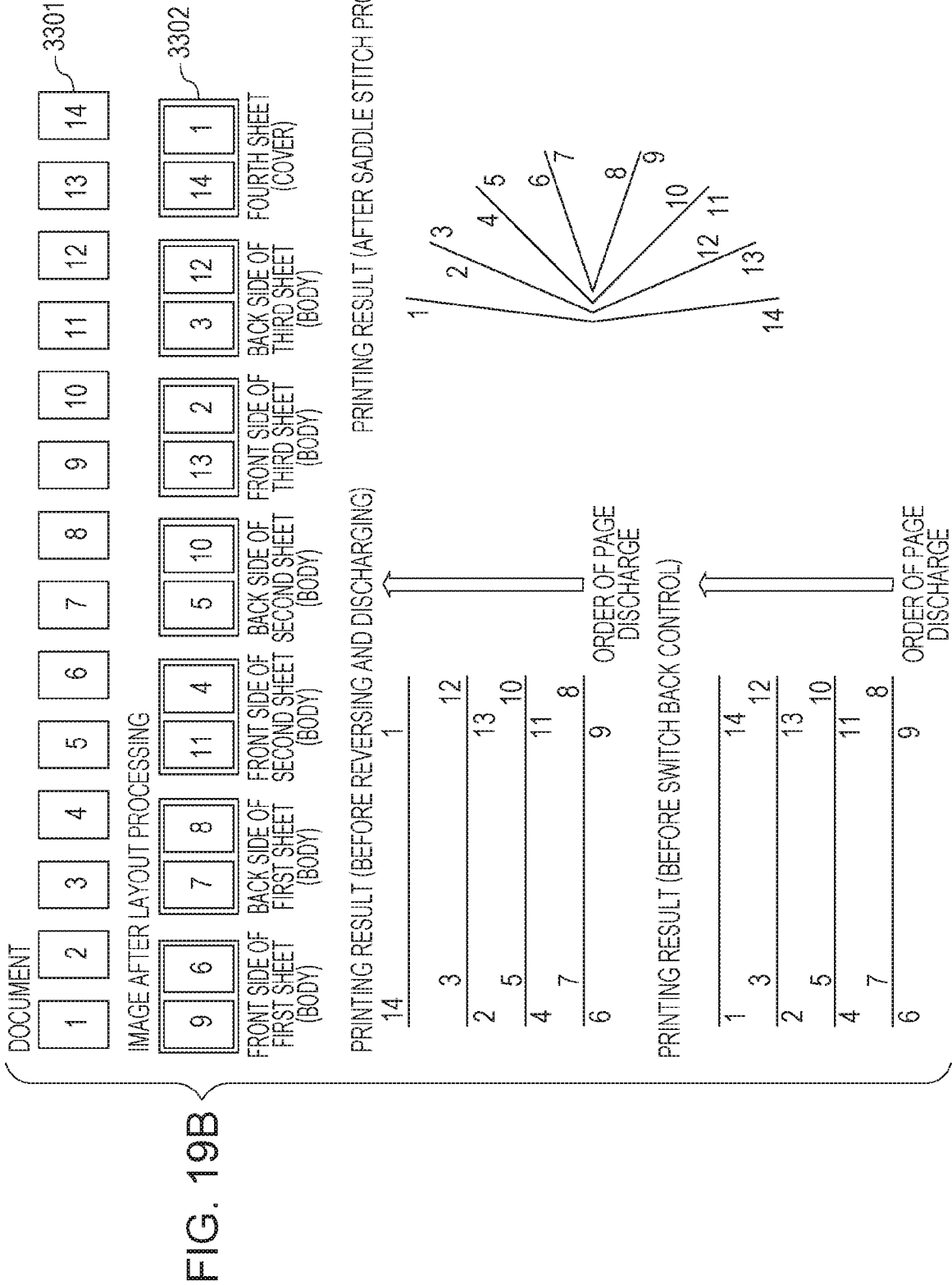

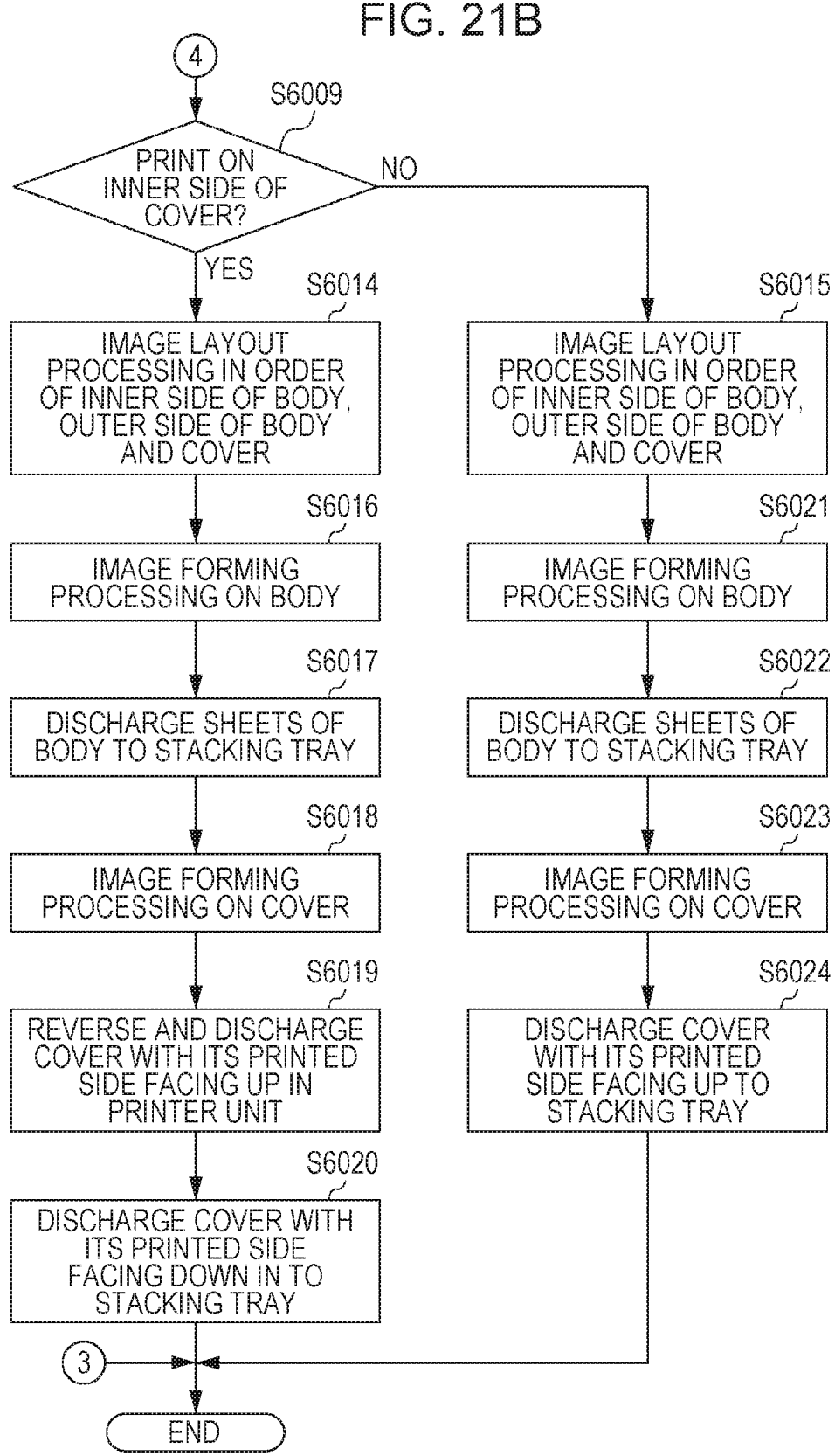

FIG. 27

| TYPE OF PAPER | BASIS WEIGHT | DOUBLE-SIDED PRINTING | BOOK BOUND PRODUCT (OR COVER) |
|---|---|---|---|
| PLAIN PAPER | 64 TO 105 g/m$^2$ | YES | YES |
| CARDBOARD 1 | 106 TO 150 g/m$^2$ | YES | YES |
| CARDBOARD 2 | 151 TO 220 g/m$^2$ | YES | YES |
| CARDBOARD 3 | 221 TO 256 g/m$^2$ | NO | YES |
| CARDBOARD 4 | 257 TO 300 g/m$^2$ | NO | YES |

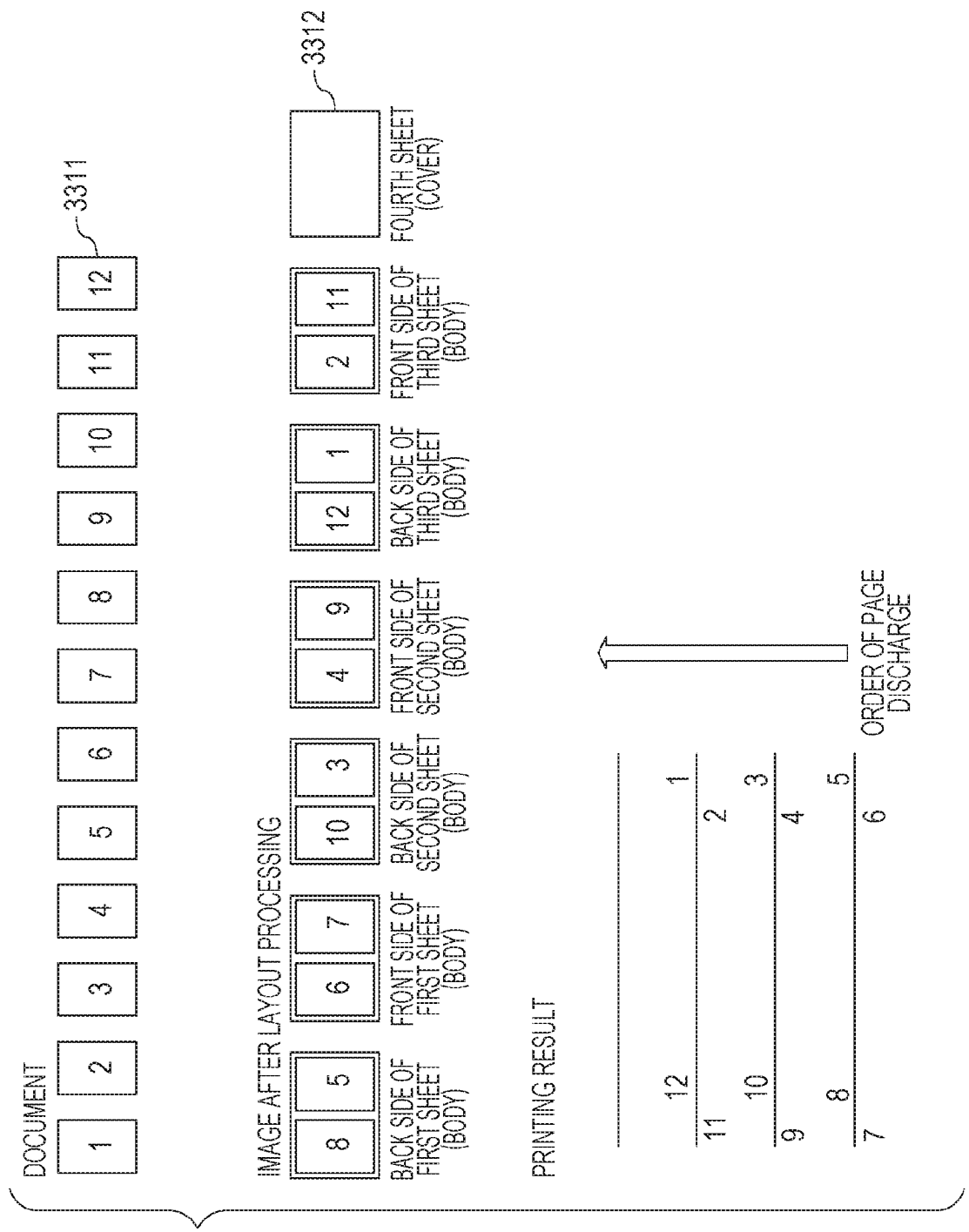

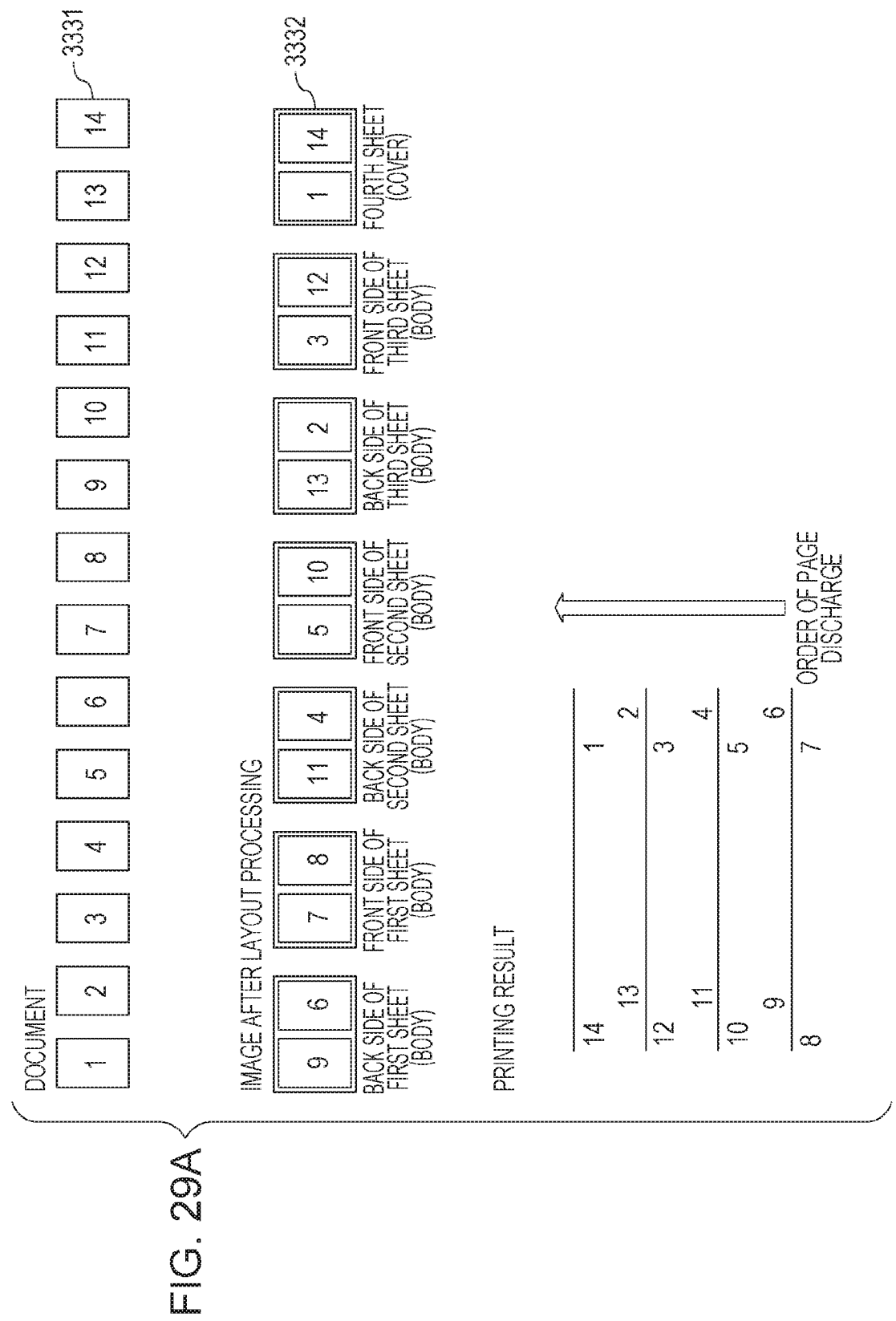

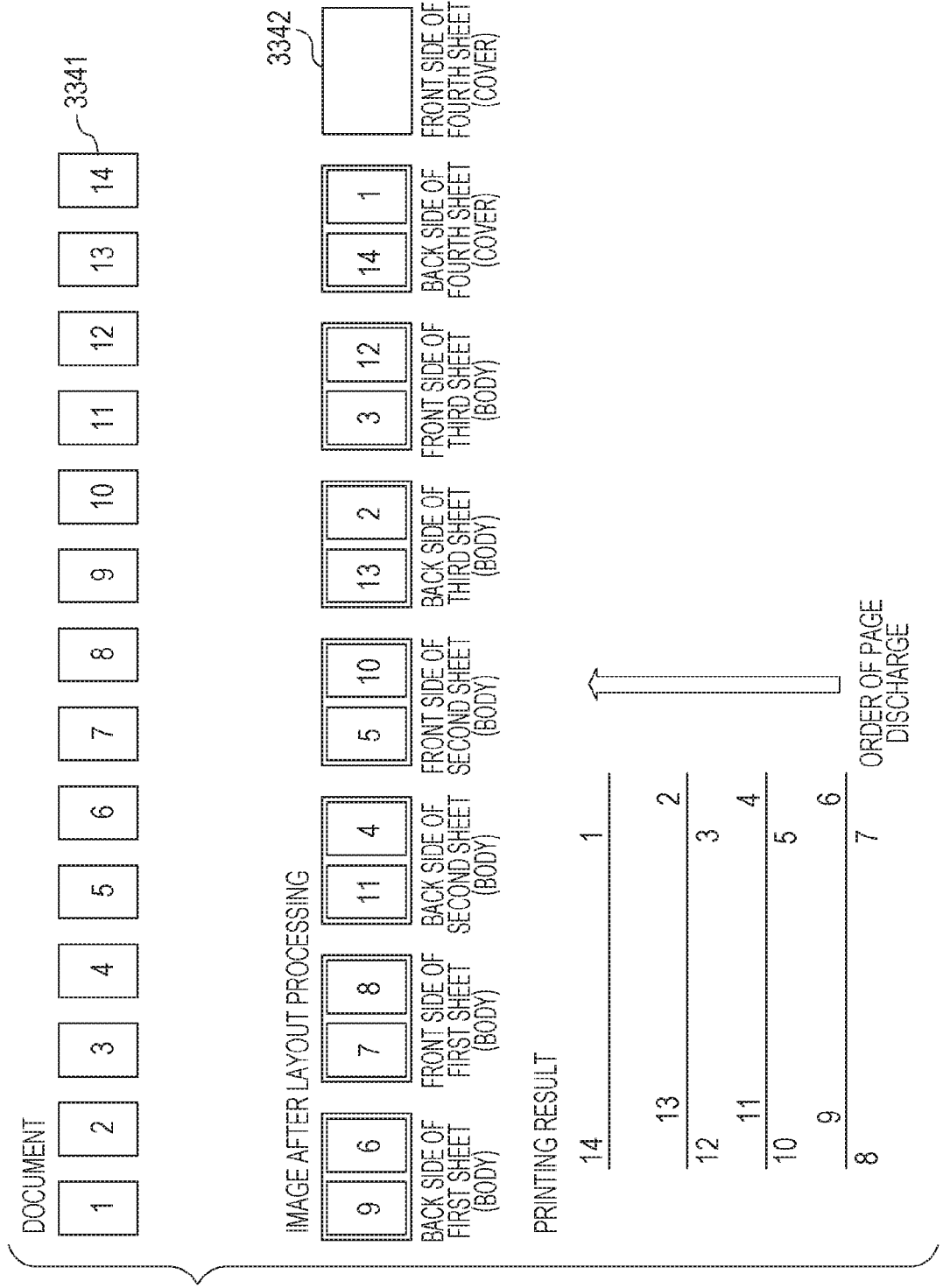

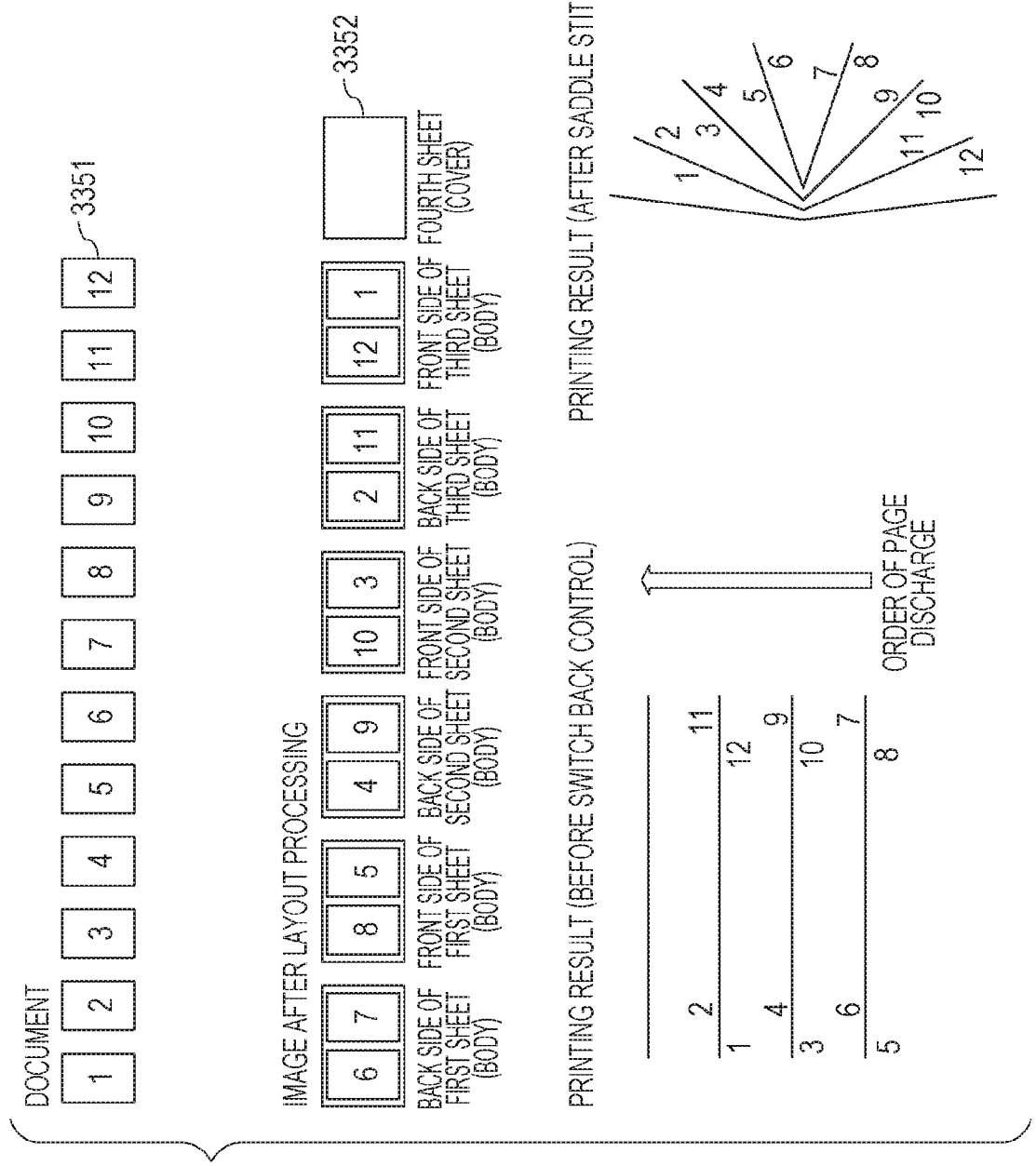

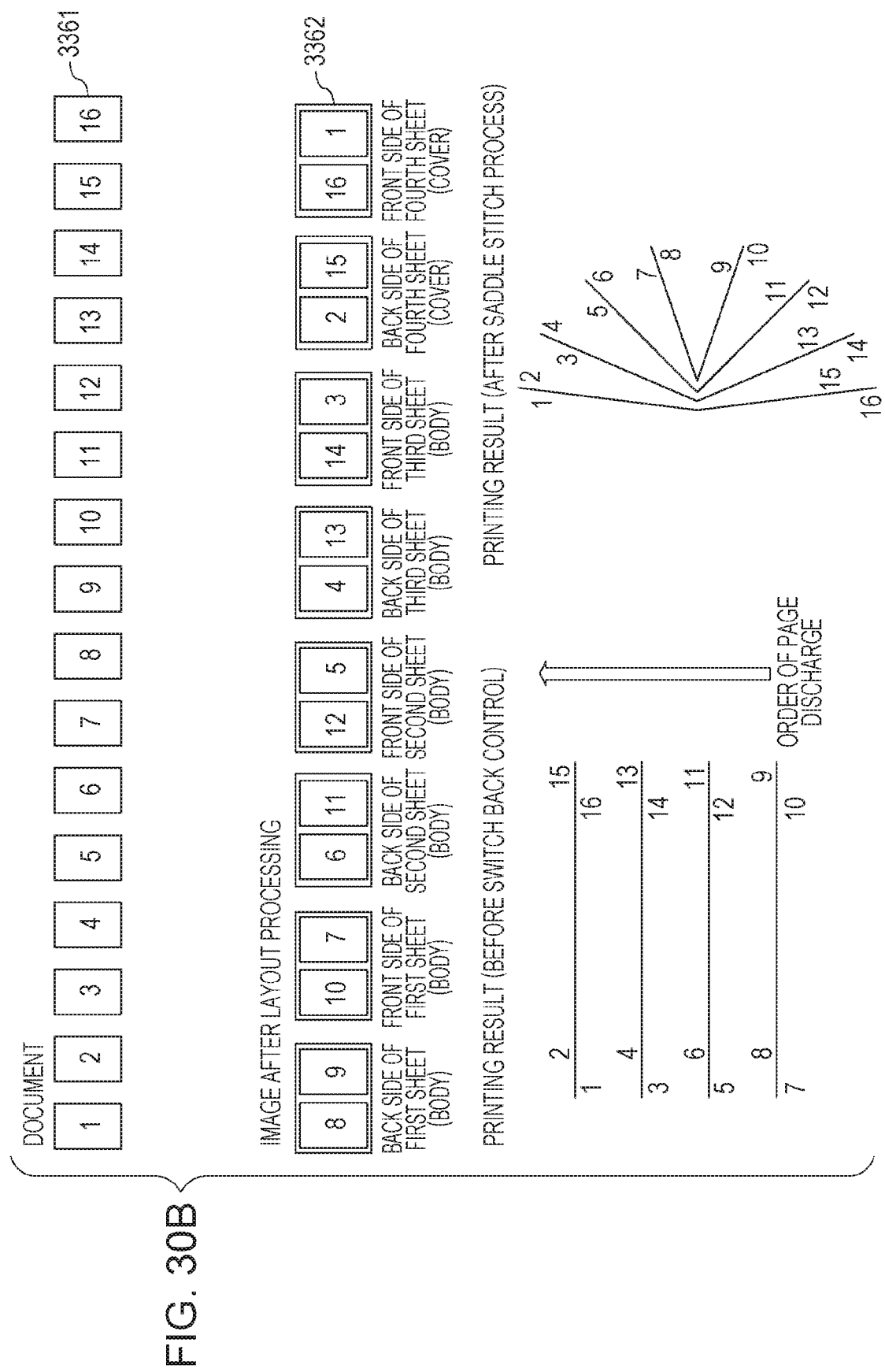

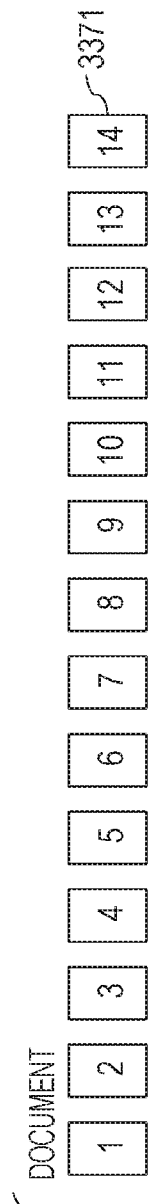
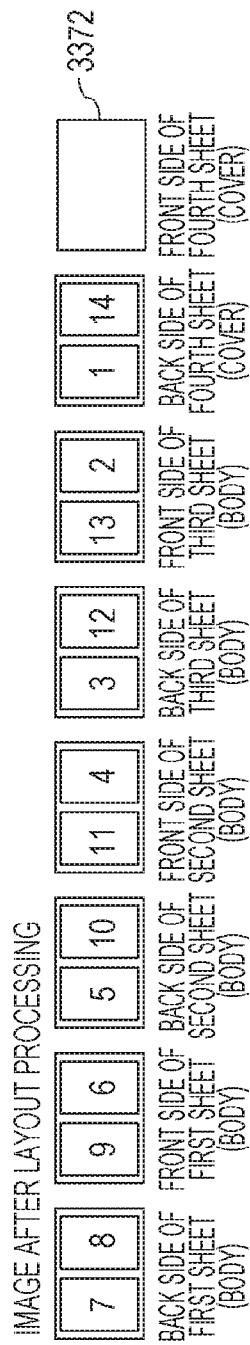
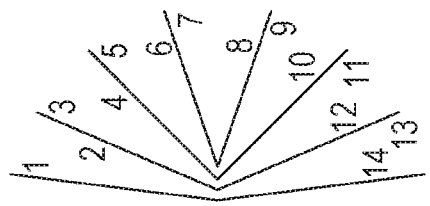
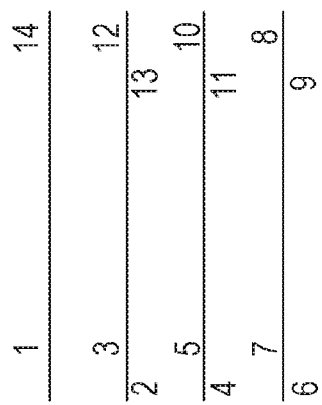
FIG. 31A

PRINTING APPARATUS, CONTROL METHOD FOR PRINTING APPARATUS, AND STORAGE MEDIUM

CROSS-REFERENCE TO RELATED APPLICATIONS

This application is a continuation of U.S. patent application Ser. No. 16/038,796, filed on Jul. 18, 2018, which is a continuation of Ser. No. 15/592,025, filed on May 10, 2017 and issued as U.S. Pat. No. 10,079,946 on Sep. 18, 2018, which is a continuation of prior U.S. patent application Ser. No. 14/832,904 filed Aug. 21, 2015 and issued as U.S. Pat. No. 9,686,429 on Jun. 20, 2017, which claims the benefit of Japanese Patent Application No. 2014-171160, filed Aug. 26, 2014 and No. 2015-138897 filed Jul. 10, 2015, which are hereby incorporated by reference herein in their entireties.

BACKGROUND OF THE INVENTION

Field of the Invention

The present invention relates to a printing apparatus, a control method for a printing apparatus, and a storage medium.

Description of the Related Art

In the past, printing apparatuses have been available each of which includes a sheet processing apparatus capable of executing a saddle stitch bookbinding process.

In the sheet processing apparatus, a plurality of sheets on which images are printed by the printing apparatus are stored, and the center of each of the sheets are bound. The bound sheets are folded in two and are output in a book shape.

Japanese Patent Laid-Open No. 2005-142609 discloses a sheet processing apparatus which switches back a sheet having a printed image is switched back within the sheet processing apparatus, stores a plurality of such sheets, then finds the center of the sheets, folds the bound sheets in two, and outputs it in a book shape.

Use of such a switch back mechanism allows common use of a part of a sheet conveying path, and thus the size of the sheet processing apparatus may be reduced.

In a case where the mechanism for switching back a sheet is used, a sheet discharged with its printed side facing up is to be switched back. Thus, after one side of a cover sheet is printed, the cover sheet is added to the body without inverting the cover sheet. When a saddle stitch bookbinding process is executed, the printed side on which an image has been printed positions inside of the book bound product.

Inverting the cover sheet on which an image has been printed within a main body of the printing apparatus allows the book bound product with the printed side on which the image has been printed facing outside.

However, some types of sheets such as cardboard having a large basis weight may not be inverted within a main body of a printing apparatus. When such a type of sheet is used as a cover sheet, a book bound product having an image printed on the outside of its cover sheet cannot be generated.

Control in consideration of such a limitation has not been implemented in the past. Therefore, for example, a user may sometimes instruct to execute a setting which is inhibited without realizing it.

Some printing apparatuses may discharge a sheet having a printed side facing down. When a sheet on which an image has been printed is switched back and undergoes a saddle stitch bookbinding process in such a printing apparatus, the printed side having a printed image positions on an outer side of the resulting book bound product.

By printing an image on a cover sheet and then inverting the cover sheet within a main body of the printing apparatus, the printed side having an image printed may face inside of the resulting book bound product.

However, some types of sheet such as cardboard having a large basis weight, may not be inverted within a main body of a printing apparatus. When such a type of sheet is used as a cover sheet, the resulting book bound product may not have a cover sheet having an image printed on its inner side.

Control in consideration of such a limitation has not been implemented in the past. Therefore, for example, a user may sometimes instruct to execute a setting which is inhibited without realizing it.

SUMMARY OF THE INVENTION

A printing apparatus capable of conveying sheets to a sheet processing apparatus in which the sheets each having an image printed is switched back and the inverted sheets are folded to generate a book bound product includes a printing unit configured to print an image on a cover sheet to be attached to the book bound product, and a control unit configured to control so as to notify an error to a user based on the type of a sheet to be used as the cover sheet in a case where printing an image on the cover sheet is designated.

Further features of the present invention will become apparent from the following description of exemplary embodiments with reference to the attached drawings.

BRIEF DESCRIPTION OF THE DRAWINGS

FIG. 4 illustrates a configuration of an operating unit according to an embodiment of the present invention.

FIGS. 5A to 5F are diagrams for describing screens according to the embodiment.

FIGS. 6A to 6E are diagrams for describing screens according to the embodiment.

FIG. 7 is a diagram for describing a paper management table according to a first embodiment of the present invention.

FIGS. 8A to 8F are diagrams for describing screens according to the embodiment.

FIGS. 9A to 9F are diagrams for describing screens according to the embodiment.

FIGS. 10A to 10F are diagrams for describing screens according to the embodiment.

FIGS. 11A to 11F are diagrams for describing screens according to the embodiment.

FIGS. 12A to 12C are diagrams for describing screens according to the embodiment.

FIGS. 13A to 13C are diagrams for describing screens according to the embodiment.

FIGS. 16A and 16B illustrate a document, images after layout processing and a printing result according to the first embodiment of the present invention.

FIGS. 17A and 17B illustrate a document, images after layout processing and a printing result according to the first embodiment of the present invention.

FIGS. 18A and 18B illustrate a document, images after layout processing and a printing result according to the first embodiment of the present invention.

FIGS. 19A and 19B illustrate a document, images after layout processing and a printing result according to the first embodiment of the present invention.

FIGS. 21A and 21B illustrate a flowchart for describing a control example according to the first embodiment of the present invention.

FIG. 27 is a diagram for describing a paper management table according to the second embodiment of the present invention.

FIGS. 28A and 28B illustrate a document, images after layout processing and a printing result according to the second embodiment of the present invention.

FIGS. 29A and 29B illustrate a document, images after layout processing and a printing result according to the second embodiment of the present invention.

FIGS. 30A and 30B illustrate a document, images after layout processing and a printing result according to the second embodiment of the present invention.

FIGS. 31A and 31B illustrate a document, images after layout processing and a printing result according to the second embodiment of the present invention.

DESCRIPTION OF THE EMBODIMENTS

Embodiments of the present invention will be described in detail with reference to drawings. The following embodiments are not intended to limit the claimed invention, and all of combinations of features according to the embodiments are not always required in the invention.

First Embodiment

Figure 1:
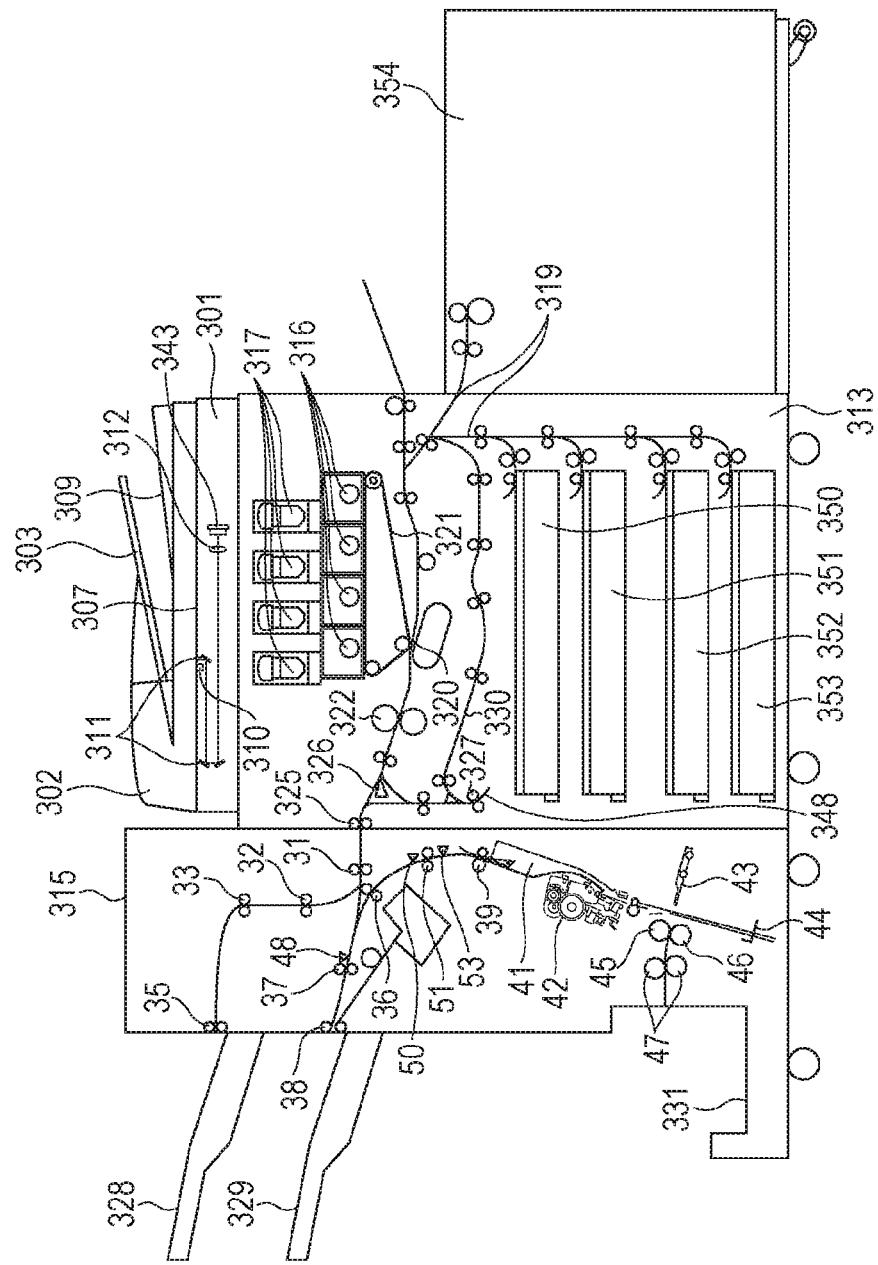
FIG. 1 is a section view illustrating a configuration of an image formation apparatus according to an embodiment of the present invention.

FIG. 1 illustrates a configuration of a print system including an image formation apparatus and a sheet processing apparatus which are examples of a printing apparatus according to a first embodiment of the present invention. The image formation apparatus is connected to the sheet processing apparatus via a conveying path and is capable of conveying a sheet to the sheet processing apparatus.

According to this embodiment, the printing apparatus may be an image formation apparatus (MFP) having a plurality of functions such as a copying function, a printer function, a facsimile function, for example. However, the image formation apparatus may be an image formation apparatus (SFP) having one function of a copying function, a printer function, and a facsimile function. The term "MFP" stands for Multi Functional Peripheral. The term "SFP" stands for Single Function Peripheral.

Referring to FIG. 1, the image formation apparatus includes a scanner 301, an auto document feeder (ADF) 302, a print engine 313 having a polychrome 4-color drum, and a deck 354.

First of all, a reading operation to be performed by the scanner 301 will be described.

In order to set a document on a platen glass and execute a reading operation thereon, a user may set a document on a platen glass 307 and close an ADF 302. If an open/close sensor detects that the ADF 302 has been closed, a reflective document-size sensor placed within a housing of the scanner 301 detects the size of the document set on the platen glass.

If the size of the document has been detected, the light source 310 radiates light to the document, and the irradiated light enters to the CCD 343 through a reflector 311 and a lens 312. The CCD 343 converts the entering light to a digital signal and transmits it to a controller for the scanner 301. The controller performs a desired image process on the received digital signal and converts it to a laser printing signal and stores it as image data in a memory.

In order to perform a reading operation on a document set on the ADF 302, a user may set a document with its face up on a tray of a document setting unit 303 in the ADF 302. If a document is placed, a document presence/absence sensor detects that document setting has been performed. If the document presence/absence sensor detects that the document setting has been performed, the controller rotates a document feed roller and conveying belt and thus conveys the document to a predetermined reading position on the platen glass 307. When the document has been conveyed to the predetermined reading position, the controller performs a reading operation on the document and stores image data generated by the reading operation performed on the document in a memory. The document having undergone the reading operation completely is discharged to the document paper discharge tray 309 through the conveyance roller.

In a case where a plurality of documents exist on the ADF 302, the controller discharges a document having undergone the reading operation completely and at the same time feeds the next document by using a feeding roller and performs a reading operation on the next document. Thus, the reading operations performed on a plurality of documents.

Next, a print operation to be performed by a printer 313 will be described.

A print signal (print image data) once stored in a memory within the controller is transferred to the printer 313 and is converted, in a laser printing unit, to print laser beams for colors of Yellow, Magenta, Cyan and Black. Then, the print laser beams are irradiated to photosensitive bodies 316 for those colors to form an electrostatic latent image on the photosensitive bodies.

The electrostatic latent image is then developed with toner supplied from a toner cartridge 317, and the visualized image is primarily transferred to an intermediate transfer belt 321. After that, the intermediate transfer belt 321 rotates clockwise, and when a sheet conveyed from one of cassettes 350 to 353 or deck 354 through a fed paper conveying path 319 reaches a secondary transfer position 320, the image is transferred from the intermediate transfer belt 321 to the sheet.

The image transferred to the sheet is fixed by pressing and with heat in the fixing unit 322, and the sheet is conveyed to the discharge conveying path. The sheet is discharged to a sheet discharge port 325 connecting to the sheet processing apparatus 315. A flapper 326 is a mechanism for switching between two modes of a straight discharge mode and a paper reverse and discharge mode. In a case where the flapper 326 positions at a lower position, a sheet is discharged with its printed side facing up (straight discharge). On the other hand, in a case where the flapper 326 positions at an upper part, a sheet is conveyed to a lower conveying path. In order to reverse a sheet, the sheet conveyed to a reversing unit 348 is switch backed and reversed so that the sheet may be conveyed to the sheet discharge port 325 with its printed side facing down (paper reverse and discharge).

In a double-sided printing operation, after a sheet passes through the fixing unit 322 and undergoes printing of an image on a first side of the sheet, the flapper 326 is changed its position to an upper part, and the sheet is conveyed to the reversing unit 348. Then, after the sheet is conveyed to the reversing unit 348, the flapper 327 is changed so as to convey the sheet to a conveying path 330 for double-sided printing. The switching back allows conveyance of the sheet to the secondary transfer position 320 again through the conveying path 330 for double-sided printing. Then, an image is printed on a second side of the sheet.

With reference to FIGS. 2A to 2E, operations to be performed by the sheet processing apparatus 315 will be described next. FIGS. 2A to 2E illustrate a part of the sheet processing apparatus 315 illustrated in FIG. 1.

The sheet processing apparatus 315 performs a sheet process (post-processing) on a sheet in accordance with settings designated by a user.

Exemplary sheet processes executable by the sheet processing apparatus 315 may include stapling (one-position and two-position stapling), punching (two-, three-, and four-hole punching), and saddle-stitch bookbinding processes.

Figure 2A:
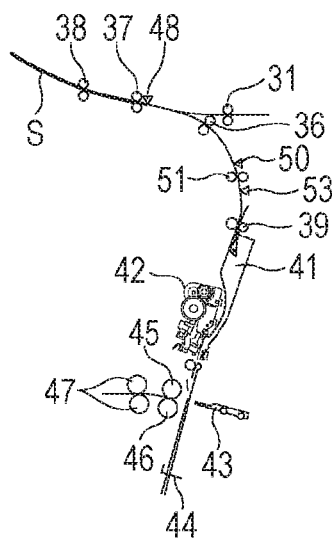
FIGS. 2A to 2E are section view illustrating a part of a sheet processing apparatus according to an embodiment of the present invention.

As illustrated in FIG. 2A, the sheet processing apparatus 315 includes conveyance rollers 31 to 39, front end sensors 50 and 53 and a rear end sensor 48, a stapler 42, a veneer 43, a stopper 44, folding rollers 45 and 46, and a bundle conveying roller pair 47.

The sheet processing apparatus 315 may operate in accordance with a command from a controller unit in the image formation apparatus or may be operated by a propriety controller.

A sheet conveyed from the image formation apparatus is discharged to one of stacking trays 328 and 329 and a saddle-stitch bookbinding tray 331 in accordance with the type of sheet processing set by a user.

For example, in a case where no sheet processing is executed, a sheet is discharged to the stacking tray 328. On the other hand, in a case where a user has set to execute a staple process, a sheet is discharge do the stacking tray 329. In order to execute a saddle stitch bookbinding process, a sheet is discharged to the saddle-stitch bookbinding tray 331.

A case where a saddle stitch bookbinding process is to be executed will be described in detail with reference to FIG. 2A to 2E.

The sheet conveyed from the image formation apparatus is conveyed by the conveyance rollers 31, 37, and 38 until a rear end of the sheet may reach the rear end sensor 48, as illustrated in FIG. 2A. If the rear end sensor 48 detects the rear end of the sheet, the conveyance rollers 37 and 38 holding the sheet stop.

Figure 2B:
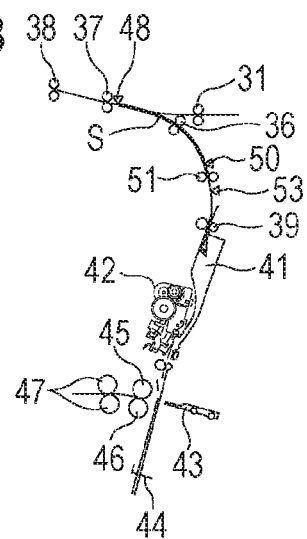

Next, the sheet is switched back by the reverse rotation of the conveyance rollers 37 and 38 and is conveyed by the conveyance roller 36 until a leading edge of the sheet reaches the front end sensor 50, as illustrated in FIG. 2B. If the front end sensor 50 detects the leading edge of the sheet, the conveyance roller 36 holding the sheet decelerates, and the leading edge of the sheet comes to a nip of a skew correction roller 51.

Even after the leading edge of the sheet comes to the nip of the skew correction roller 51, the conveyance roller 36 keeps rotating for a while. After the sheet forms a loop in a loop space, the conveyance roller 36 stops.

Next, the skew correction roller 51 starts rotating. When a sheet skews, the skew correction roller 51 corrects the skew. The skew-corrected sheet is conveyed toward the conveyance roller 39. If the leading edge of the sheet is detected by the front end sensor 53, the sheet is conveyed by a predetermined amount from the time point. The leading edge of the sheet then comes to the stopper 44, as illustrated in FIG. 2C.

Figure 2C:
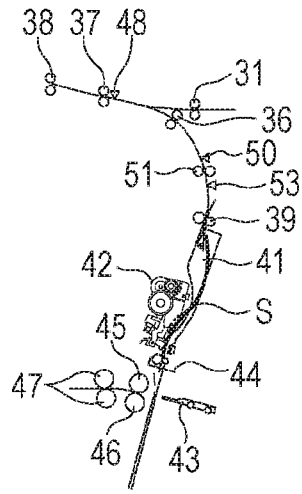

Here, as illustrated in FIG. 2C, the sheet is positioned by the stopper 44 such that the binding position with the stapler 42 may be at the center of the sheet. Repeating these operations sequentially convey a plurality of sheets to the inside of a conveying path 41.

After all sheets included in the book bound product are conveyed to the inside of the conveying path 41, these sheets are aligned by a width direction aligning plate, not illustrated, in a width direction. Then, a sheet bundle is formed within the conveying path 41.

In this case, the sheets are conveyed sequentially from an innermost sheet of the book bound product to the inside of the conveying path 41, and a sheet corresponding to a cover sheet of the book bound product is conveyed lastly.

Figure 2D:
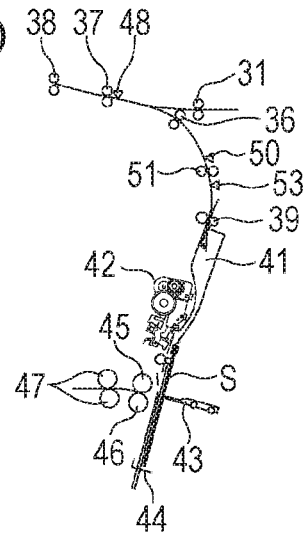

In a case where a saddle stitch bookbinding process is set to be executed, a stapler 42 is configured to execute a binding process on the sheet bundle. When the sheet bundle is bound by the stapler 42, a stopper 44 supporting the sheet bundle moves toward the downstream of the conveyance direction. With this, the sheet bundle moves toward the downstream of the conveyance direction as illustrated in FIG. 2D.

Figure 2E:
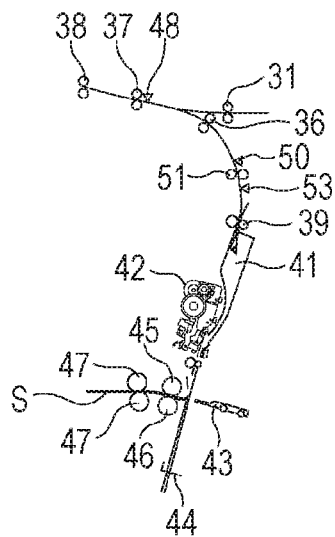

The stopper 44 positions the sheet bundle such that the center of the sheet bundle may be matched with the position of the veneer 43. Then, a leading edge of the veneer 43 is abutted against a part where a fold line is to be formed on the sheet bundle positioned by the stopper 44 and press the sheet bundle into nips of folding rollers 45 and 46 to form a fold line on the sheet bundle. The sheet bundle having the fold line formed by the folding rollers 45 and 46 is output to a saddle-stitch bookbinding tray 331 through a bundle conveying roller pair 47 as illustrated in FIG. 2E.

Figure 3:
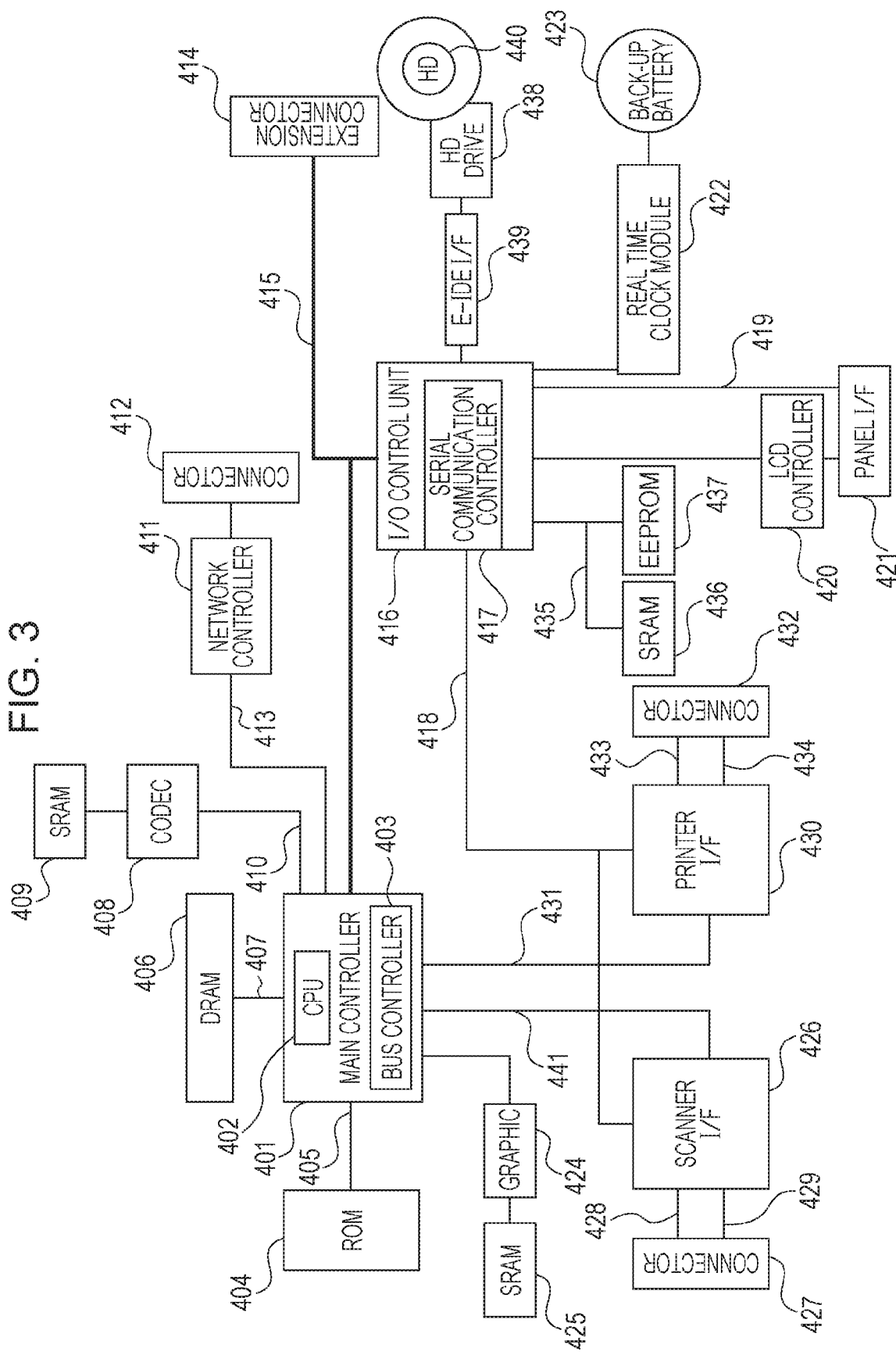
FIG. 3 is a block diagram illustrating a configuration of the image formation apparatus according to an embodiment of the present invention.

Next, details of a hardware configuration of a controller including an image formation apparatus will be described with reference to FIG. 3.

A main controller 401 includes a CPU 402, a bus controller 403, and I/F controller circuits.

The CPU 402 and the bus controller 403 are configured to generally control operations of the whole apparatus.

The CPU 402 operates based on a program read from a ROM 404 through a ROM I/F 405. An operation for interpreting PDL (page description language) code data received from an external PC and rasterizing it to raster image data is also described in the program and is processed by software. The bus controller 403 is configured to control transfer of data input and output through I/Fs and control bus arbitration and DMA data transfer.

A DRAM 406 is connected to a main controller 401 through a DRAM I/F 407 and is usable as a work area usable by the CPU 402 for operations and an area for storing image data.

A codec (Codec in FIG. 3) 408 is configured to compress raster image data stored in the DRAM 406 in MH/MR/MMR/JBIG/JPEG or the like and, conversely, decompresses stored compressed code data to raster image data.

The SRAM 409 is usable as a temporary work area for the codec 408. The codec 408 is connected to the main controller 401 through an I/F 410. The data transfer between the codec 408 and the DRAM 406 is controlled by the bus controller 403 to be DMA transfer.

A graphics processor (Graphic in FIG. 3) 424 is configured to perform image rotation, image magnification, color-space conversion, binarization processes on raster image data stored in the DRAM 406.

The SRAM 425 is usable as a temporary work area for the graphics processor 424. The graphics processor 424 is connected to the main controller 401 through an I/F. The data transfer between the graphics processor 424 and the DRAM 406 is controlled by the bus controller 403 to be DMA transfer.

A network controller 411 is connected is connected to the main controller 401 through an I/F 413 and is connected to an external network through a connector 412. Ethernet (registered trademark) is a general example of the external network. Print data received from an external PC is received and is transmitted to the CPU 402 under control of the network controller 411. The CPU 402 stores and processes the received print data in the DRAM 406 or an HD (hard disk) 440.

An extension connector 414 and an I/O control unit 416 are connected to a general-purpose high speed bus 415. According to this embodiment, commands are transmitted and received from and to the sheet processing apparatus 315 through the general-purpose high speed bus 415.

The I/O control unit 416 includes a serial communication controller 417 having two channels for transmitting and receiving control commands to and from CPUs in a scanner unit and a printer unit. The I/O control unit 416 is connected to a scanner I/F circuit 426 and a printer I/F circuit 430 through an I/O bus 418.

A panel I/F 421 is connected to the LCD controller 420 and includes an I/F usable for displaying a screen on a liquid crystal display on an operating unit 501 illustrated in FIG. 4 and a key input I/F usable for hardware keys and touch panel keys. Details of the operating unit 501 will be described below.

A real time clock module 422 is configured to update/store dates and times for management within the apparatus and is backed up by a backup battery 423.

An E-IDE I/F 439 is configured to connect an external memory. According to this exemplary embodiment, the CPU 402 connects to a hard disk drive 438 though the E-IDE I/F 439 for performing operations including storing image data in the hard disk 440 and reading out image data from the hard disk 440. Connectors 427 and 432 are connected to a scanner unit and a printer unit, respectively and include an asynchronization serial I/Fs (428, 433) and video I/F (429, 434).

The scanner I/F 426 is connected to a scanner unit through the connector 427 and is connected to the main controller 401 through a scanner bus 441 and has a function for performing a predetermined process on an image received from the scanner unit. The scanner I/F 426 has a function for outputting a control signal generated based on a video control signal transmitted from the scanner unit to the scanner bus 429. Data transfer from the scanner bus 429 to the DRAM 406 is controlled by the bus controller 403.

The printer I/F 430 is connected to a printer unit through the connector 432 and is connected to the main controller 401 through the printer bus 431. The printer I/F 430 has a function for performing a predetermined process on image data output from the main controller 401 and outputting the result to the printer unit. The printer I/F 430 further has a function of outputting a control signal generated based on a video control signal received from the printer unit to the printer bus 431. Raster image data rasterized on the DRAM 406 to a printer unit is transferred under control of the bus controller 403 and is DMA transferred to the printer unit through the printer bus 431 and video I/F 434.

An SRAM 436 is a memory configured to hold data stored therein with power supply from the backup battery even when the whole apparatus is powered-off and is connected to the I/O control unit through the bus 435. An EEPROM 437 is also a memory connected to the I/O control unit through the bus 435.

Next, the operating unit 501 will be described with reference to FIG. 4.

The operating unit 501 has a liquid crystal display unit, a touch panel input device attached to the liquid crystal display unit and a plurality of hardware keys.

Through the operating unit 501, a user is allowed to define a setting such as job settings and apparatus settings for the image formation apparatus.

A reset key 502 is a key for cancelling a set value defined by a user.

A stop key 503 is a key for aborting a job in operation.

A numeric keypad 504 is a key for inputting a numerical value such as a substituted number.

A display unit 505 has a touch panel and a liquid crystal display unit which are integral and may display various screens based on instructions from the CPU 402 on the liquid crystal display unit and receive an instruction user through the touch panel. The liquid crystal display unit may display an operation screen for operating the image formation apparatus and display image data to be printed, for example. A signal input through the touch panel or hardware keys is transmitted to the CPU 402 through the panel I/F 421.

The start key 506 is a key for starting a job such as reading a document.

A clear key 507 is a key for clearing a setting.

A lamp 508 lights up while a job is being executed and in response to occurrence of an error in the image formation apparatus and sheet processing apparatus 315 to notify a state of the apparatus to a user.

Next, a procedure for setting a bookbinding process through screens displayed on the display unit 505 in the operating unit 501 will be described with reference to FIGS. 5A to 6E.

When a user defines setting for executing a bookbinding process, the image formation apparatus generates an image having a page having a set layout to be printed and executes printing in accordance with the generated image. The sheet processing apparatus 315 performs a proper sheet process based on a setting.

FIGS. 5A to 5F schematically illustrate an example of a screen transition of binding setting screens to be displayed on the display unit 505 in order for a user to set sheets to be used in a book bound product.

A copy default screen 1001 is to be displayed on the display unit 505. An item "AUTOMATIC PAPER SELECTION" on a copy default screen 1001 indicates that an automatic paper selection is set whereby a proper paper is selected automatically based on a setting for executing a copy operation.

In a case where it is detected that a "BOOK BINDING" key 1101 has been pressed, the CPU 402 displays a binding portal screen 1002. The portal screen 1002 displays a "SET LAYOUT" key 1102 and an "ORIGINAL LAYOUT" key 1103. The "SET LAYOUT" key 1102 is a key for instructing to lay out an image on a document read by the scanner 301 to right or left of a sheet. Images on documents are rearranged such that the images may be printed on sheets in the page order for binding when the sheets are folded. The "ORIGINAL LAYOUT" key 1103 is a key usable for instructing to lay out images of one document read by the scanner 301 on one sheet as they are on the document.

The portal screen 1002 displays a "FOLD+SADDLE STITCH" key 1104, a "NO FOLD" key 1105, and a "FOLD ONLY" key 1106 usable for setting a finish of a book bound product. A bookbinding may vary according to the following three forms of finish:

Form 1: Folding+saddle stitch (saddle stitch bookbinding process),

Form 2: Folding only (center-folding and binding process), and

Form 3: No folding (binding layout process)

In Form 1, sheets having undergone printing in the image formation apparatus are conveyed to the sheet processing apparatus 315 and are stored at a position illustrated in FIG. 2D within the sheet processing apparatus 315 through the stopper 44. Then, when a predetermined number of printed sheets are stored, a binding process is performed which binds the sheets at the center with the stapler 42. After that, the sheets having undergone the binding process undergoes a folding process in which the veneer 43 and folding rollers 45 and 46 fold the sheets into two. The folded sheets are conveyed by the bundle conveying roller pair 47 and are discharged to the saddle-stitch bookbinding tray 331. On the portal screen 1002, in a case where the CPU 402 detects that the "FOLD+SADDLE STITCH" key 1104 has been pressed, the "FOLD+SADDLE STITCH" key 1104 is highlighted to set to execute the saddle stitch bookbinding process in Form 1.

In a case of Form 2, the sheets printed in image formation apparatus are conveyed to the sheet processing apparatus 315 and are stored at a position illustrated in FIG. 2D inside the sheet processing apparatus 315. When a predetermined number of printed sheets are stored therein, the stored sheets undergo a folding process which folds the sheets into two with the veneer 43 and folding rollers 45 and 46 and are conveyed to the bundle conveying roller pair 47 and are discharged to the saddle-stitch bookbinding tray 331. In this case, the binding process is not executed. On the portal screen 1002, if the CPU 402 detects that the "FOLD ONLY" key 1106 has been pressed, "FOLD ONLY" key 1106 is highlighted to set to execute the center-folding and binding process in Form 2.

In a case of Form 3, page images are laid out for binding, but the resulting sheets are discharged without performing the binding process and the folding process. In this case, the sheets are discharged to a stacking tray 328 instead of the saddle-stitch bookbinding tray 331. A user may use a sheet processing apparatus specially for binding which is called an offline finisher to execute the binding process or the folding process on sheets and thus acquire a book bound product. On the portal screen 1002, if the CPU 402 detects that the "NO FOLD" key 1105 has been pressed, the "NO FOLD" key 1105 is highlighted to set to execute a binding layout process in Form 3.

The portal screen 1002 further displays a "COVER" key 1107 for setting whether a cover sheet is attached to a book bound product or not and a "RIGHTWARD OR LEFTWARD" key 1108 for setting whether a book bound product is to be opened leftward or rightward. The portal screen 1002 further displays a "CHANGE" key 1109 for setting a size of a document to be read by the scanner 301, a "DOUBLE-SIDED DOCUMENT" key 1110 for setting whether a given document is double-sided or not, and a "CHANGE" key 1111 for setting sheets to be used in a book bound product.

On the portal screen 1002, if the CPU 402 detects that the "CHANGE" key 1111 for setting sheets to be used in a book bound product has been pressed, a sheet selection screen 1003 is displayed. The sheet selection screen 1003 displays a vertical list of sizes and names of types of sheets stored in the cassettes 350 to 353 and the deck 354 so that a user may select a target paper type used for a book bound product. The sheet selection screen 1003 indicates that sheets having a size of A3 and a name "plain paper (64 g to 105 g/m2)" are stored in the cassette 350. On the sheet selection screen 1003, a row 1112 corresponding to the cassette 350 is highlighted to indicate that the cassette 350 is being selected for sheets to be used in a book bound product. On the other hand, it is indicated that the cassette 351 stores sheets of a paper type having a size of A3 and a name "CARDBOARD 1 (106 to 150 g/m2)", and that the cassette 352 stores sheets having a size A3 and a name "CARDBOARD 2 (151 to 220 g/m2)". It is further indicated that the cassette 353 stores sheets having a size A3 and a name "CARDBOARD 3 (221 to 256 g/m2)" and that the deck 354 stores sheets having a size A3 and a name "CARDBOARD 4 (257 to 300 g/m2)".

On the sheet selection screen 1003, if the CPU 402 detects that a row 1113 corresponding to the cassette 351 has been pressed, a row 1114 corresponding to the cassette 351 as illustrated on the sheet selection screen 1004 is highlighted.

On the sheet selection screen 1004, if the CPU 402 detects that an "OK" key 1115 has been pressed, a binding portal screen 1005 is displayed. On the binding portal screen 1005, a display field 1116 indicates that sheets to be used for a book bound product are to be fed from the cassette 351.

On the portal screen 1005, if the CPU 402 detects that an "OK" key 1117 has been pressed, a copy default screen 1006 is displayed. The display field 1118 on the copy default screen 1006 indicates that sets for performing binding have been defined. The CPU 402 pre-holds in the DRAM 406 the settings received through the screens illustrated in FIGS. 5A to 5F.

If a start key 506 is pressed with the portal screen 1005 or copy default screen 1006 displayed, the CPU 402 starts a document reading operation and a print operation and sheet processing control performed by a printer unit in accordance with the settings stored in the DRAM 406.

By performing these operations as described above, a user may acquire a book bound product having undergone the saddle stitch bookbinding process, center-folding, binding process and binding layout process.

A user is also allowed to instruct to attach a cover sheet to the book bound product having undergone the saddle stitch bookbinding process, center-folding and binding process and binding layout process. A user is also allowed to set a location in a cover sheet where an image is to be printed and a paper type of a cover sheet. The cover sheet may be defined by pressing the "COVER" key 1301 on a portal screen 1201 in FIG. 6A.

Figure 5B:
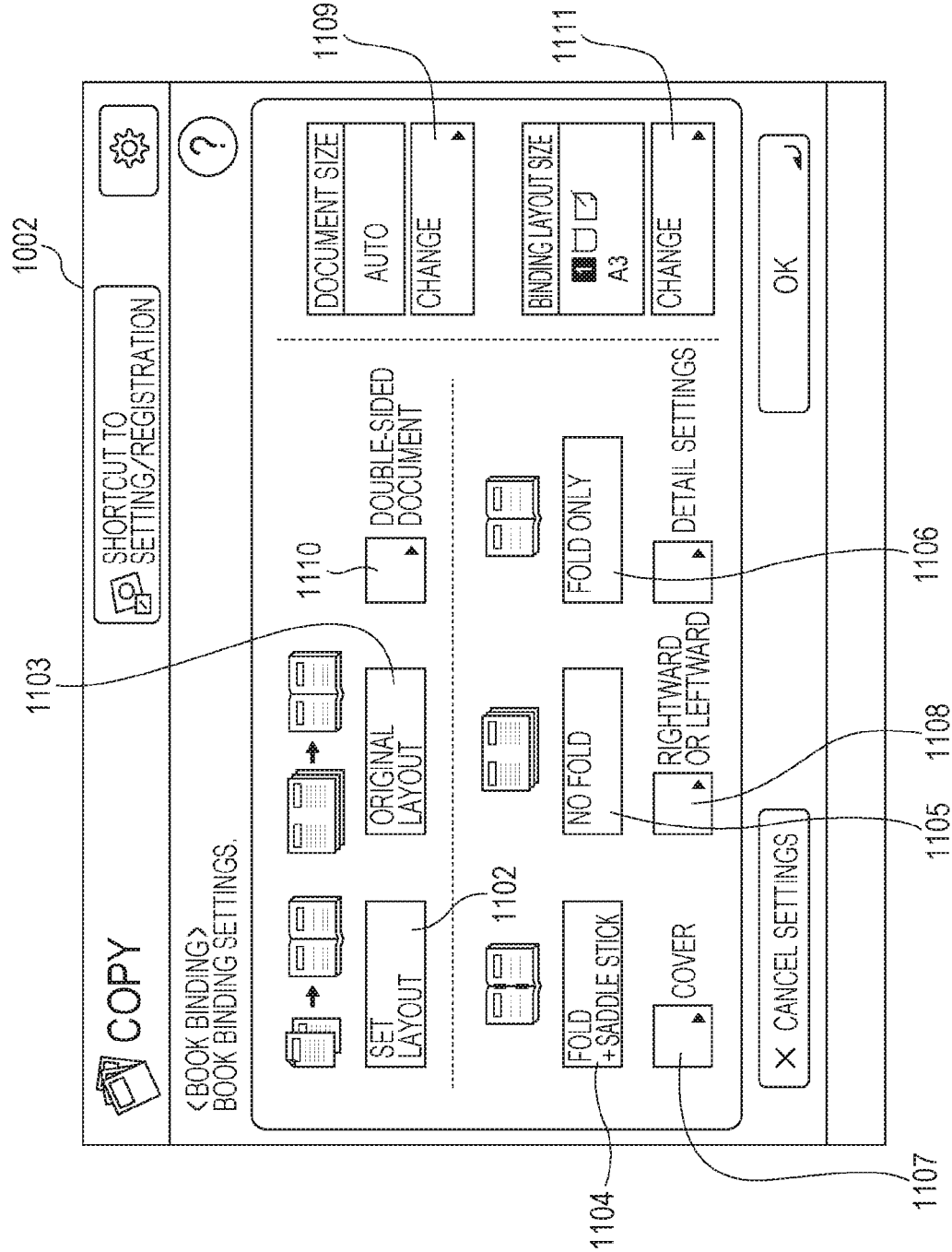
Figure 5D:
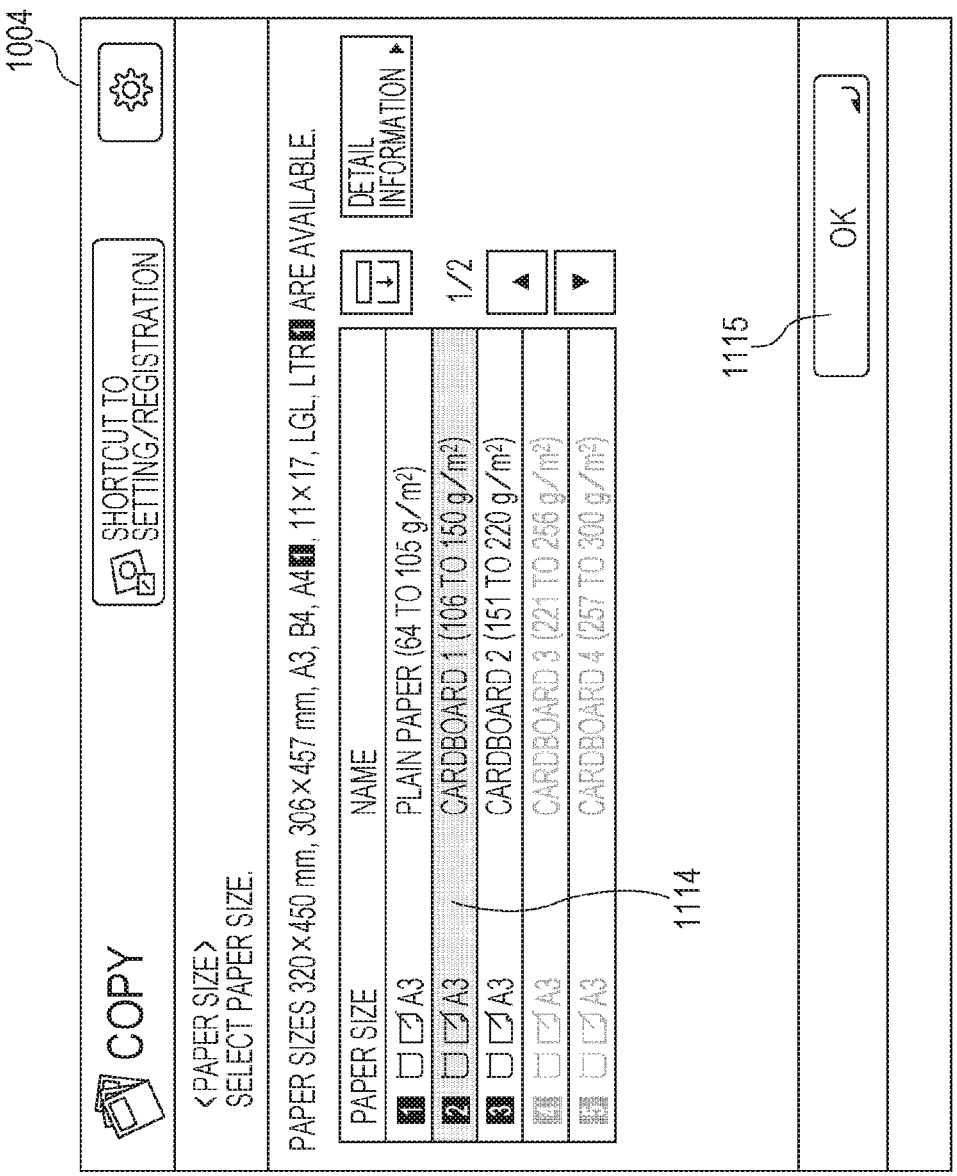
Figure 5E:
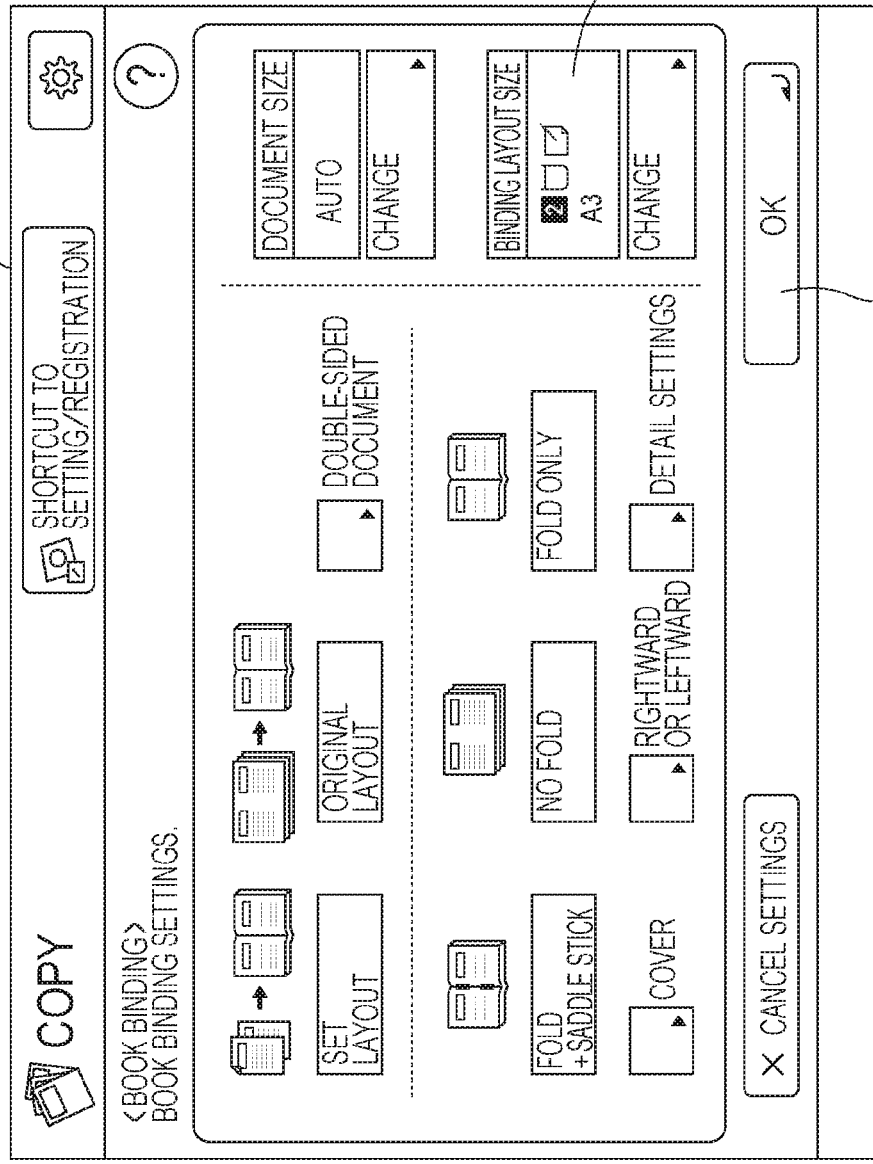
Figure 5F:
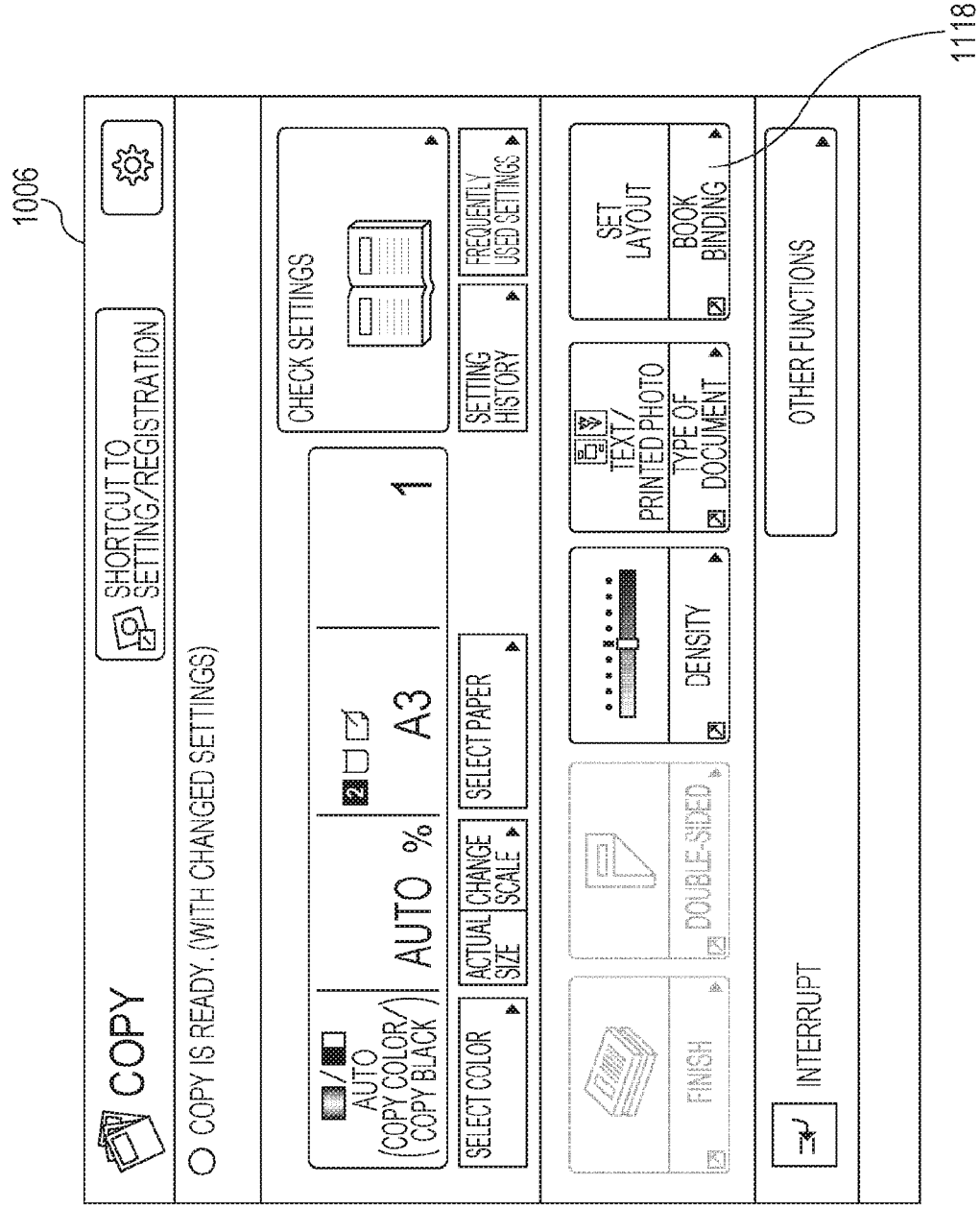
Figure 6C:
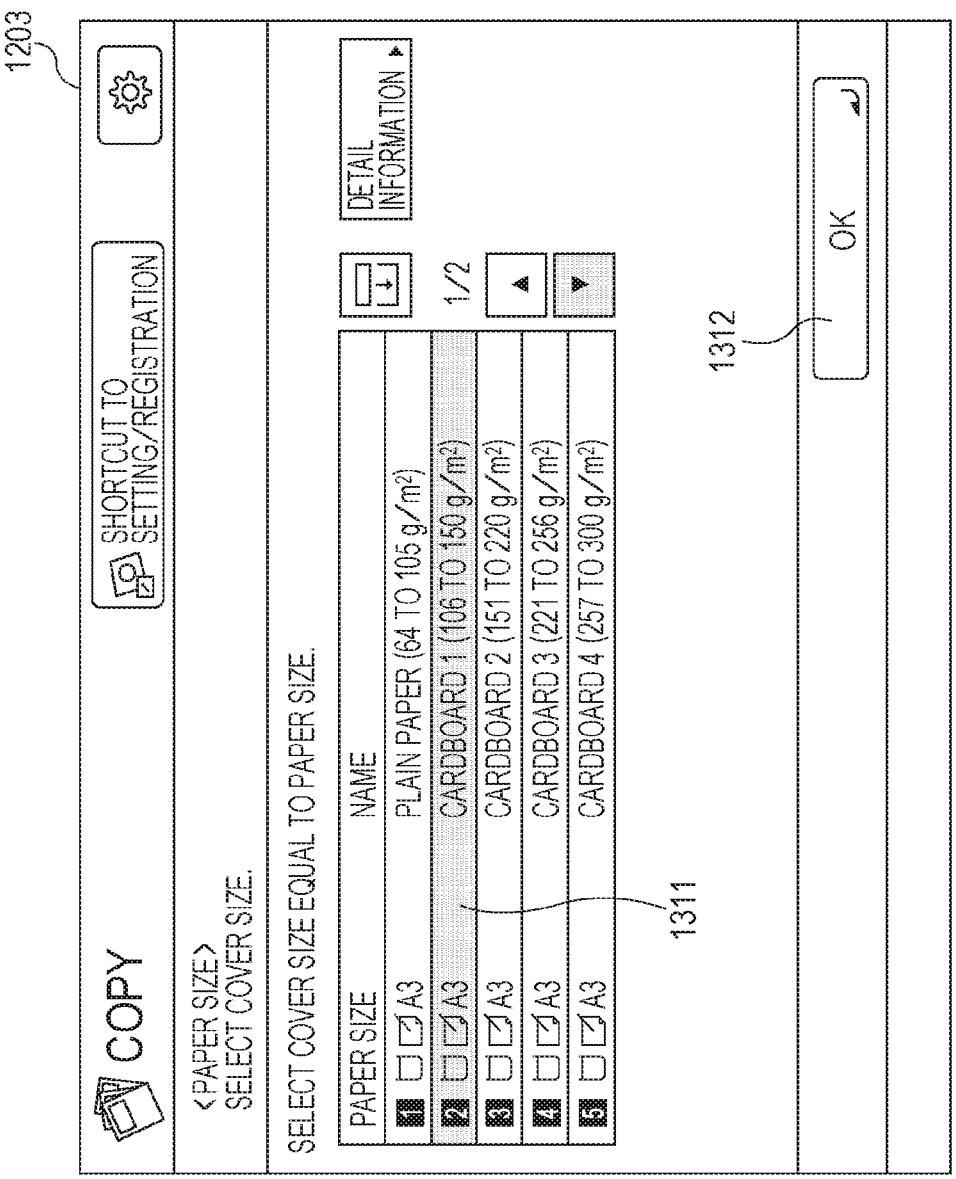
Figure 6D:
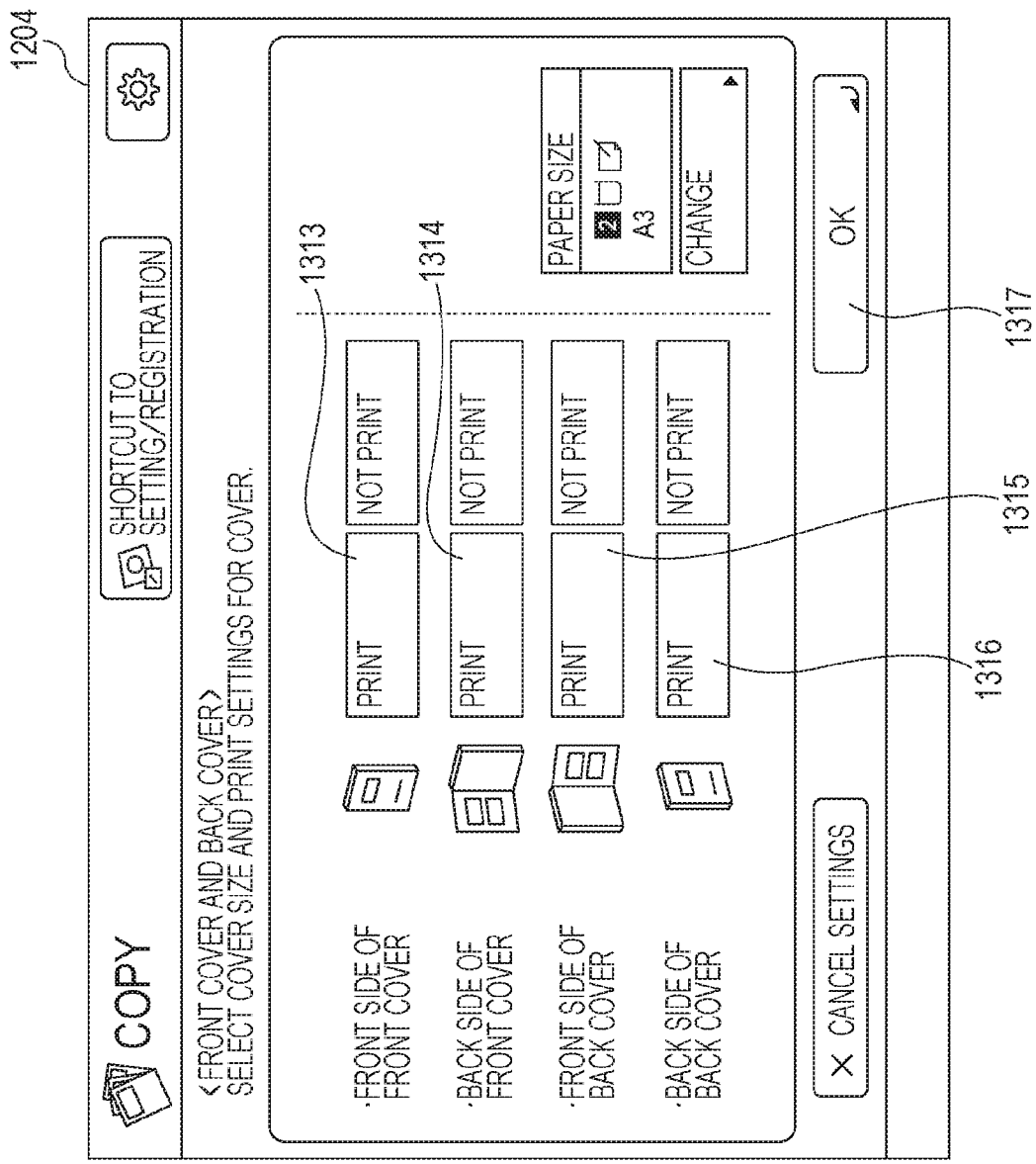
Figure 6E:
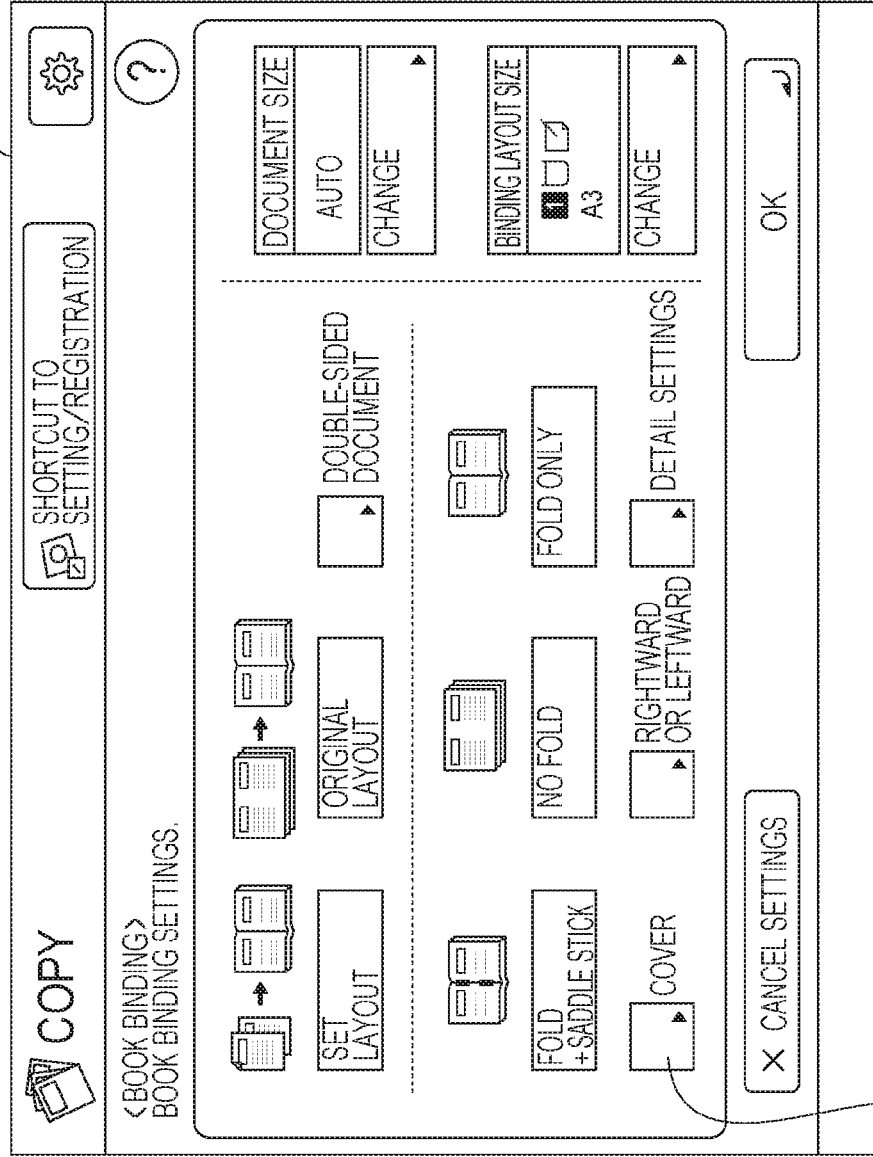

The portal screen 1201 in FIG. 6A is the same screen as the portal screen illustrated in FIG. 5B and is displayed on the display unit 505.

If it is detected that a "COVER" key 1301 has been pressed on the portal screen 1201, the CPU 402 causes the display unit 505 to display a setting screen 1202 for setting a print position on a cover sheet. An example in a case where "LEFTWARD" is set through the "RIGHTWARD OR LEFTWARD" key 1108 on the portal screen 1201 will be described.

The setting screen 1202 displays a "PRINT" key 1302 and "NOT PRINT" key 1303 for setting whether a print is to be performed on a front side of a cover sheet to be attached to a leftward book bound product. The front side of a cover sheet to be attached to a leftward book bound product refers to a surface positioned on the outer side of the front cover of the leftward book bound product as indicated by the icon displayed to the right of the "BACK SIDE OF FRONT COVER" in FIG. 6B.

The setting screen 1202 further displays a "PRINT" key 1304 and a "NOT PRINT" key 1305 for setting whether printing is to be performed on a back side of a cover sheet to be attached to a leftward book bound product. The back side of a cover sheet of a leftward book bound product refers to a surface positioned on an inner side of a front cover of the leftward book bound product as indicated by the icon displayed to the right of "BACK SIDE OF FRONT COVER" in FIG. 6B.

The setting screen 1202 further displays a "PRINT" key 1306 and a "NOT PRINT" key 1307 for setting whether printing is to be performed on a front side of a back cover to be attached to a leftward book bound product or not. The front side of a back cover to be attached to a leftward book bound product refers to a surface positioned on the inner side of a back cover of a leftward book bound product as indicated by the icon displayed to the right of "FRONT SIDE OF BACK COVER" in FIG. 6B.

The setting screen 1202 further displays a "PRINT" key 1308 and a "NOT PRINT" key 1309 for setting whether printing is to be performed on a back side of a back cover to be attached to a leftward book bound product or not. The back side of a back cover to be attached to a leftward book bound product refers to a surface positioned on the outer side of a back cover of a leftward book bound product as indicated by the icon displayed to the right of the "BACK SIDE OF BACK COVER" in FIG. 6B.

The setting screen 1202 further displays a "CHANGE" key 1310 for setting paper to be used for a cover sheet to be attached to a book bound product.

On the setting screen 1202, if the CPU 402 detects that the "CHANGE" key 1310 has been pressed for setting paper to be used for a cover sheet to be attached to a book bound product, a sheet selection screen 1203 is displayed. The sheet selection screen 1203 displays a vertical list of sizes and names of types of sheets stored in the cassettes 350 to 353 and the deck 354 so that a user may select a target paper type used for a cover sheet of a book bound product. On the sheet selection screen 1203, a row 1311 corresponding to the cassette 351 is highlighted to indicate that the cassette 351 is being selected for paper to be used as a cover sheet to be attached to a book bound product.

On the sheet selection screen 1203, if the CPU 402 detects that an "OK" key 1312 has been pressed, a screen 1204 is displayed for setting a print position on the cover sheet. Here, in a case where all of "PRINT" keys 1313 to 1316 are highlighted on the screen 1204, printing is performed on all surfaces of the cover sheet to be attached to a book bound product.

On the screen 1204, if the CPU 402 detects that an "OK" key 1317 has been pressed, a binding portal screen 1205 is displayed where a "COVER" key 1318 is highlighted to indicate the settings for the cover sheet of a book bound product have been completely defined. The CPU 402 holds the settings received through the screens as illustrated in FIGS. 6A to 6E in the DRAM 406.

When the start key 506 is pressed with the portal screen 1205 displayed, the CPU 402 starts a document reading operation and a print operation and sheet processing control performed by a printer unit in accordance with the settings stored in the DRAM 406. If the OK key on the portal screen 1205 is pressed and proper settings are defined, a copy default screen is displayed. Even if the start key 506 is pressed with the copy default screen displayed, the CPU 402 starts a document reading operation and a print operation and sheet processing control performed by a printer unit in accordance with the settings stored in the DRAM 406.

By performing these operations as described above, a user is allowed to select a desired paper type as a type of a sheet to be used for a cover sheet. A user is also allowed to instruct to print an image on a desired surface of a cover sheet. Thus, a user can acquire a leftward book bound product having a desired cover sheet.

In a case where an image is to be printed on a cover sheet, an image read by the scanner 301 may be laid out and printed also on a surface instructed to print. For example, in a case where printing on the front side of a front cover is instructed, the CPU 402 lays out an image of the first page of a document on a front side of front cover. On the other hand, in a case where printing on the back side of a front cover is instructed, the CPU 402 lays out an image of the first page of a document on the back side of a front cover. On the other hand, in a case where printing on the back side of a back cover is instructed, the CPU 402 lays out an image of the last page of a document on the back side of the back cover. Thus, after an image is laid out on a cover sheet, the CPU 402 lays out images of other pages of the document in page order for binding and controls so as to print the laid out images on sheets for body.

Various settings may be defined as described above. However, due to the structure of the sheet processing apparatus 315 illustrated in FIG. 1, a book bound product which satisfies the settings may not be output.

More specifically, the sheet processing apparatus 315 switches back both of the body and the cover sheet of a book bound product and stores the sheets with a stopper within the conveying path 41.

The sheet to be used as a cover sheet undergoes image printing after the printing on the body and then is added to the body. In a case where the sheet to be used as the cover sheet is a sheet allowing double-sided printing through the conveying path 330 for double-sided printing, the image formation apparatus is allowed to print an image on a desired surface as in the body.

On the other hand, in a case where a sheet to be sued as the cover sheet does not allow double-sided printing through the conveying path 330 for double-sided printing, the surface on which an image has been formed lastly of the sheet without being inverted comes to the inner side of the book bound product. It is desirable if a user intends to print an image on the inner side of the cover sheet of the book bound product. However, the book bound product acquired in that case is different from the book bound product intended by the user in a case where the user intends to print an image on the outer side of the cover sheet of the book bound product.

Some types of paper may be inverted by the reversing unit 348 though they cannot pass through the conveying path 330 for double-sided printing. For such types of paper, it is controlled such that a cover sheet having an image printed at a position desired by a user may be added by inverting the sheet as required in accordance with the surface set by the user to print the image. However, because such types of paper cannot pass through the conveying path 330 for double-sided printing, there is a limitation that an image is not allowed to be printed on both of the front side and back side of the sheet.

Some types of paper cannot pass through both of the conveying path 330 for double-sided printing and the reversing unit 348. Such types of paper may allow an image to be printed only on an inner side of a book bound product.

In consideration of such limitations and based on the set type of paper for a cover sheet and the set side of the sheet for printing an image, the image formation apparatus according to this embodiment performs the following control. More specifically, the image formation apparatus displays a warning in a case where an unexecutable setting is defined while the image formation apparatus generates a book bound product based on defined settings if the settings are executable.

A procedure for controlling such that printing is inhibited from starting with unexecutable settings based on a paper management table illustrated in FIG. 7 will be described with reference to screens illustrated in FIGS. 8A to 15C. The paper management table in FIG. 7 is stored in HD 440.

The paper management table defines each paper type with respect to whether it allows double-sided printing performed by the printer 313 or not, whether it allows reversing and discharging in the printer 313 or not, or whether it is usable as a cover sheet to be attached to a book bound product. The paper management table manages a plurality of paper types usable for printing including plain paper, cardboard 1, cardboard 2, cardboard 3, and cardboard 4. These paper types have different basis weights on which whether it is double-side printable or not, whether it is reversible to discharge and whether it is usable as a cover sheet are dependent. Therefore, the paper management table manages each of the paper types with respect to whether it is double-side printable or not, whether it is reversible to discharge and whether it is usable as a cover sheet. It should be noted that the paper types to be managed are not limited to those paper types above and that other paper types such as recycled paper and coated paper. A paper type may be registered by a user through the operating unit 501. In a case where a paper type is registered, the CPU 402 may prompt to further register the basis weight, whether it is double-side printable or not, whether it is reversible to discharge and whether it is usable as a cover sheet.

As illustrated in FIG. 7, sheets corresponding to plain paper, cardboard 1, and cardboard 2 are all double-side printable, are reversible to discharge, and are usable as a cover sheet to be attached to a book bound product. On the other hand, sheets corresponding to cardboard 3 and cardboard 4 do not allow printing images on their both sides. Therefore, control may be required so as to inhibit printing images on both size of a cover sheet to be attached to a book bound product. However, because a sheet corresponding to cardboard 3 is reversible to discharge, control may be required so as to allow printing an image on one of the inner and outer sides of a cover sheet to be attached to a book bound product. On the other hand, because a sheet corresponding to cardboard 4 is not reversible to discharge, control may be required so as to inhibit printing an image on an inner side of a cover sheet to be attached to a book bound product to discharge it to the stacking tray 328. Because a sheet corresponding to cardboard 4 is not reversible to discharge, control may be required so as to inhibit printing an image on an outer side of a cover sheet to be attached to a book bound product to discharge it to the saddle-stitch bookbinding tray 331.

FIGS. 8A to 8F are schematic diagrams illustrating an example of a screen transition of a binding setting screen displayed on the display unit 505 in a case where a user defines settings for discharging a leftward book bound product to the saddle-stitch bookbinding tray 331.

A portal screen 1801 is a binding portal screen to be displayed on the display unit 505. On the portal screen 1801, a "FOLD+SADDLE STITCH" key 1902 is highlighted which indicates that a book bound product is to be discharged to the saddle-stitch bookbinding tray 331.

If the CPU 402 detects on the portal screen 1801 that a "COVER" key 1903 has been pressed, a setting screen 1802 is displayed on which a print position of a cover sheet is set.

If the CPU 402 detects on the setting screen 1802 that a "CHANGE" key 1904 has been pressed, a sheet selection screen 1803 is displayed. On the sheet selection screen 1803, a row 1905 corresponding to the cassette 353 storing sheets of a paper type having a size of A3 and a name "CARDBOARD 3 (221 to 256 g/m2)" so as to indicate the paper type is selected to be used as a cover sheet to be attached to the book bound product.

If the CPU 402 detects on the sheet selection screen 1803 that the "OK" key 1906 has been pressed, a setting screen 1804 is display where a print position on a cover sheet is set. In a case where all of the "PRINT" keys 1907 to 1910 are selected and are highlighted as illustrated on the setting screen 1804, double-sided printing on a cover sheet by using "cardboard 3 (221 to 256 g/m2)" is set here. However, double-sided printing may not be executed on "cardboard 3 (221 to 256 g/m2)" as illustrated in the paper management table illustrated in FIG. 7.

If the CPU 402 detects that the "OK" key 1911 has been pressed on the setting screen 1804, the binding portal screen 1805 is displayed where the "COVER" key 1912 is highlighted indicating that the setting for covering a book bound product has completed. The CPU 402 holds the settings received through the screens illustrated in FIGS. 8A to 8F in the DRAM 406.

If the start key 506 is pressed with the portal screen 1805 displayed, the CPU 402 provides a display warning 1806 that binding using the cardboard 3 as a cover sheet is not allowed to be set based on the settings stored in the DRAM 406 and the paper management table illustrated in FIG. 7.

On the portal screen 1805, if the CPU 402 detects that "OK" key 1913 has been pressed, it may be controlled so as to provide the display warning 1806 based on the settings stored in the DRAM 406 and the paper management table illustrated in FIG. 7.

Figure 12B:
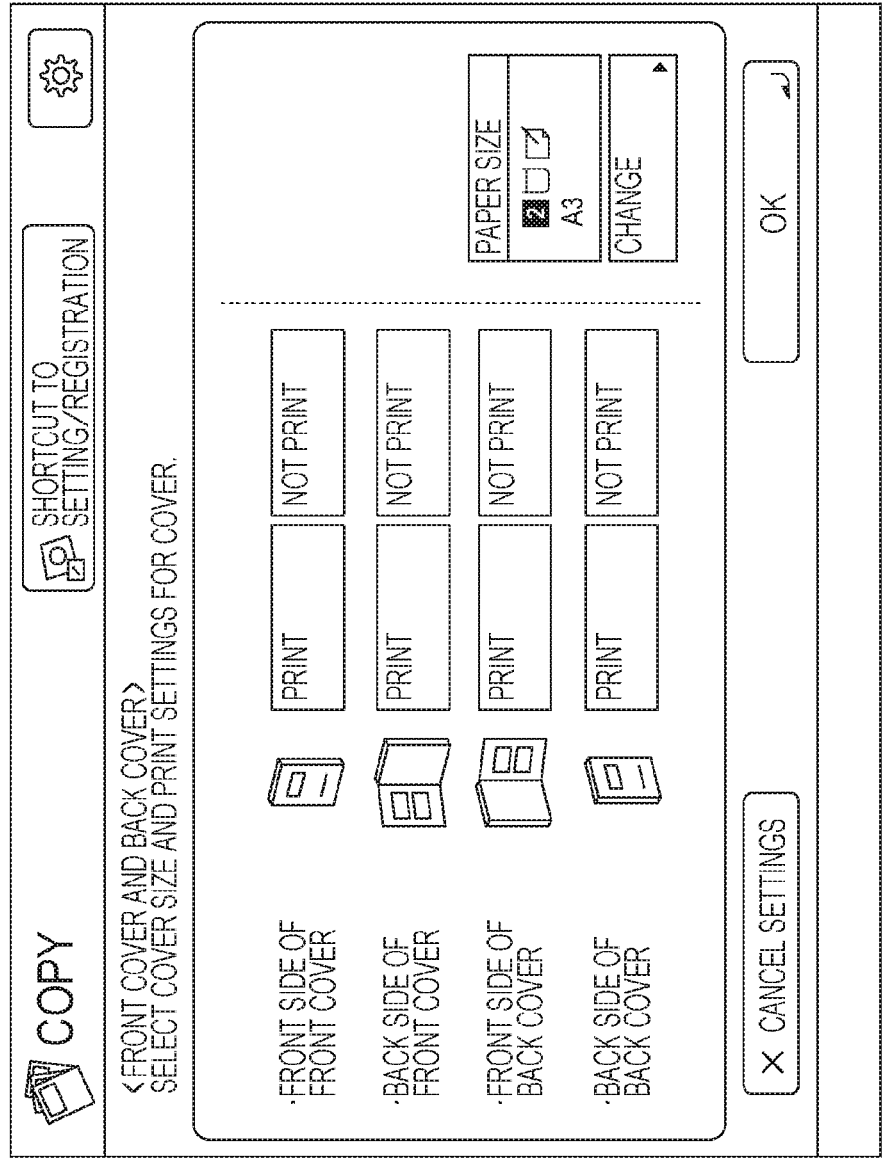

In a case where, as illustrated in FIGS. 12A to 12C, the setting for performing double-sided printing on a cover sheet is defined previously, the CPU 402 may shade a row 2701 corresponding to the cassette 353 storing paper of cardboard 3 on the sheet selection screen 2601 so as to inhibit a user from selecting it. Because double-sided printing is not allowed to perform on cardboard 4 either, the CPU 402 may shade a row corresponding to the deck 354 storing paper of cardboard 4 on the screen illustrated in FIGS. 12A to 12C so as to inhibit a user from selecting it.

FIGS. 9A to 9F are schematic diagrams illustrating an example of a screen transition of a binding setting screen to be displayed on the display unit 505 in a case where a user defines a setting for discharging a leftward book bound product to the saddle-stitch bookbinding tray 331.

A portal screen 2001 is a binding portal screen to be displayed on the display unit 505. On the portal screen 2001, a "FOLD+SADDLE STITCH" key 2102 is highlighted. This indicates that a book bound product is to be discharged to the saddle-stitch bookbinding tray 331.

If the CPU 402 detects on the portal screen 2001 that a "COVER" key 2103 has been pressed, a setting screen 2002 is displayed for setting a print position on a cover sheet.

If the CPU 402 detects on the setting screen 2002 that the "CHANGE" key 2104 has been pressed, a sheet selection screen 2003 is displayed. On the sheet selection screen 2003, a row 2105 corresponding to the deck 354 storing paper having a size of A3 and a name of "cardboard 4 (257 to 300 g/m2)" is highlighted to indicate that it is selected as paper to be used for a cover sheet to be attached to a book bound product.

If the CPU 402 detects on the sheet selection screen 2003 that the "OK" key 2106 has been pressed, a setting screen 2004 is displayed for setting a print position on a cover sheet. Here, "PRINT" keys 2107 and 2108 highlighted as on the setting screen 2004 indicate that printing is to be performed on the outer side of a cover sheet of "cardboard 4 (257 to 300 g/m2)". However, because double-sided printing and inversing cannot be executed on cardboard 4 as in the paper management table illustrated in FIG. 7, a cover sheet having an image printed on its outer side may not be added to the body.

If the CPU 402 detects on the setting screen 2004 that the "OK" key 2109 has been pressed, a binding portal screen 2005 is displayed, and a "COVER" key 2110 is highlighted. This indicates that the setting for attaching a cover sheet to a book bound product has completed. The CPU 402 holds the settings received through the screens illustrated in FIGS. 9A to 9F in the DRAM 406.

If the start key 506 is pressed with the portal screen 2005 displayed, the CPU 402 provides a display warning 2006 that binding using cardboard 4 as a cover sheet is not allowed to be set based on the settings stored in the DRAM 406 and the paper management table illustrated in FIG. 7.

On the portal screen 2005, if the CPU 402 detects that "OK" key 2111 has been pressed, it may be controlled so as to provide the display warning 2006 based on the settings stored in the DRAM 406 and the paper management table illustrated in FIG. 7.

Figure 13A:
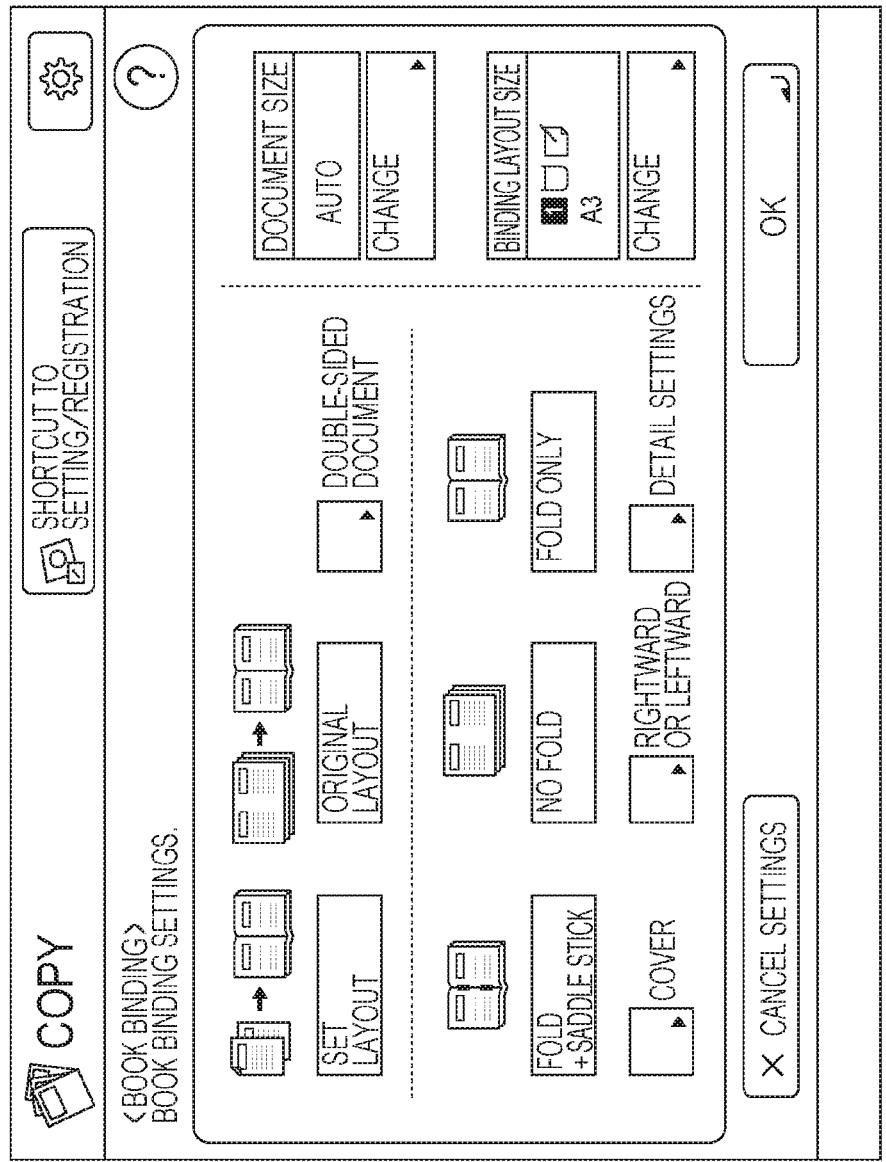
Figure 13B:
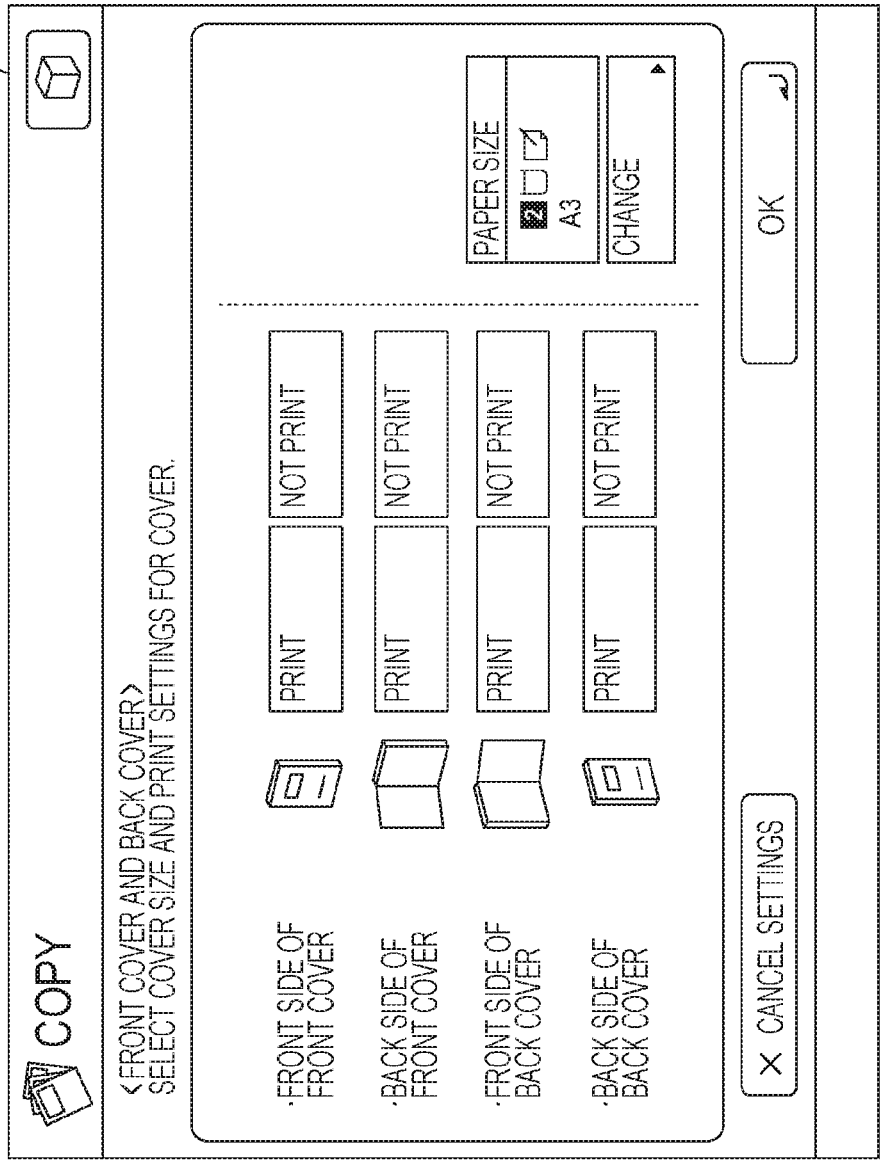

In a case where, as illustrated in FIGS. 13A to 13C, the setting for performing printing on the outer side of a cover sheet is defined previously, the CPU 402 may shade a row 2901 corresponding to the deck 354 storing paper of cardboard 4 on the sheet selection screen 2801 so as to inhibit a user from selecting it. Because cardboard 3 can be inversed, the CPU 402 may display, on the screens illustrated in FIGS. 13A to 13C, the row corresponding to the cassette 353 storing paper of cardboard 3 as being selectable by a user.

While FIGS. 8A to 9F illustrate control examples in a case where a user defines settings for discharging a leftward book bound product to the saddle-stitch bookbinding tray 331, FIGS. 10A to 10F and FIGS. 11A to 11F illustrate control examples in a case where a user defines setting for discharging a leftward book bound product to the stacking tray 328.

FIGS. 10A to 10F are schematic diagrams illustrating an example of a screen transition of a binding setting screen displayed on the display unit 505 in a case where a user defines settings for discharging a leftward book bound product to the stacking tray 328.

A portal screen 1401 is a screen to be displayed on the display unit 505 for setting binding. On the portal screen 1401, a "NO FOLD" key 1502 is highlighted which indicates that a book bound product is to be discharged to the stacking tray 328.

If the CPU 402 detects on the portal screen 1401 that a "COVER" key 1503 has been pressed, a setting screen 1402 is displayed on which a print position of a cover sheet is set.

If the CPU 402 detects on the setting screen 1402 that a "CHANGE" key 1504 has been pressed, a sheet selection screen 1403 is displayed. On the sheet selection screen 1403, a row 1505 corresponding to the cassette 353 storing sheets of a paper type having a size of A3 and a name "CARDBOARD 3 (221 to 256 g/m2)" so as to indicate the paper type is selected to be used as a cover sheet to be attached to the book bound product.

If the CPU 402 detects on the sheet selection screen 1403 that the "OK" key 1906 has been pressed, a setting screen 1404 is display where a print position on a cover sheet is set. In a case where all of the "PRINT" keys 1507 to 1510 are selected and are highlighted as illustrated on the setting screen 1404, double-sided printing on a cover sheet by using "cardboard 3 (221 to 256 g/m2)" is set here. However, double-sided printing may not be executed on "cardboard 3 (221 to 256 g/m2)" as illustrated in the paper management table illustrated in FIG. 7.

If the CPU 402 detects that the "OK" key 1511 has been pressed on the setting screen 1404, the binding portal screen 1405 is displayed where the "COVER" key 1512 is highlighted indicating that the setting for covering a book bound product has completed. The CPU 402 holds the settings received through the screens illustrated in FIGS. 10A to 10F in the DRAM 406.

If the start key 506 is pressed with the portal screen 1405 displayed, the CPU 402 provides a display warning 1406 that binding using cardboard 3 as a cover sheet is not allowed to be set based on the settings stored in the DRAM 406 and the paper management table illustrated in FIG. 7.

On the portal screen 1405, if the CPU 402 detects that "OK" key 1513 has been pressed, it may be controlled so as to provide the display warning 1406 based on the settings stored in the DRAM 406 and the paper management table illustrated in FIG. 7.

Figure 14A:
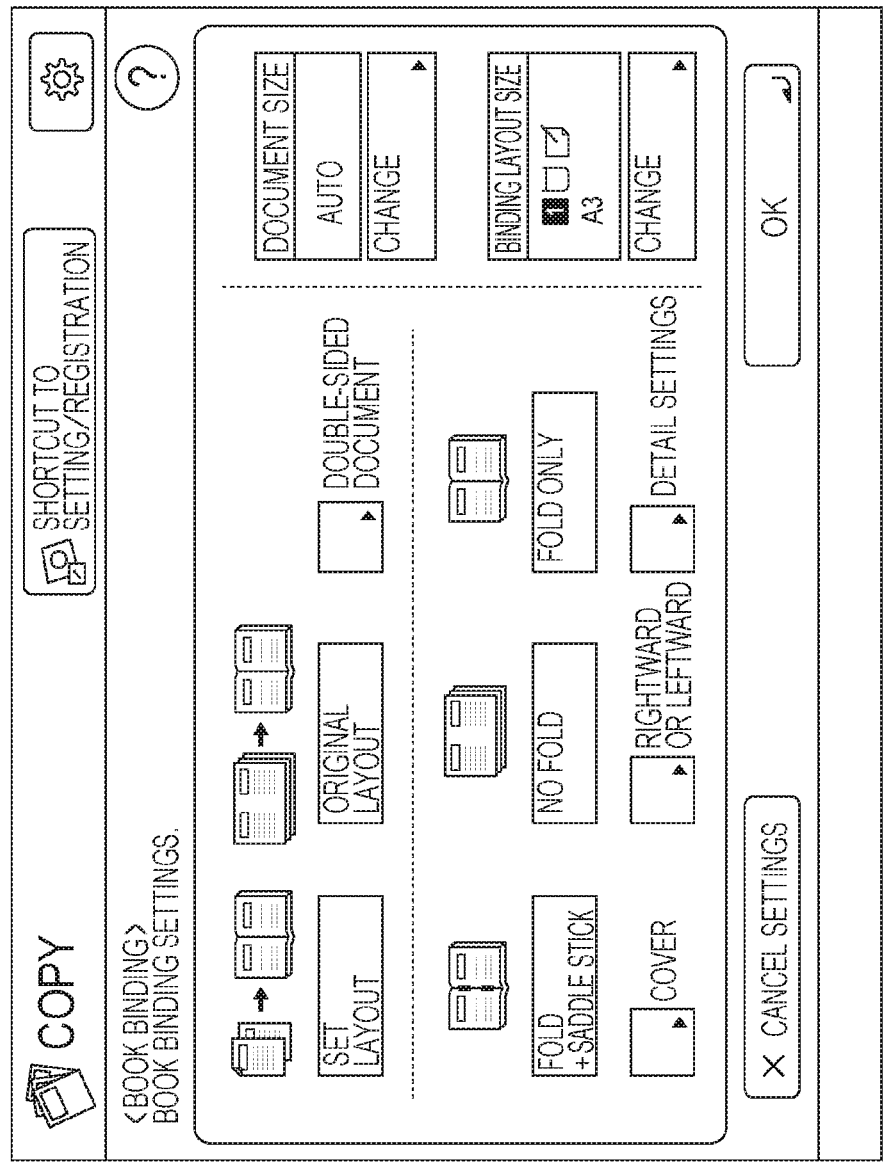
FIGS. 14A to 14C are diagrams for describing screens according to the embodiment.
Figure 14B:
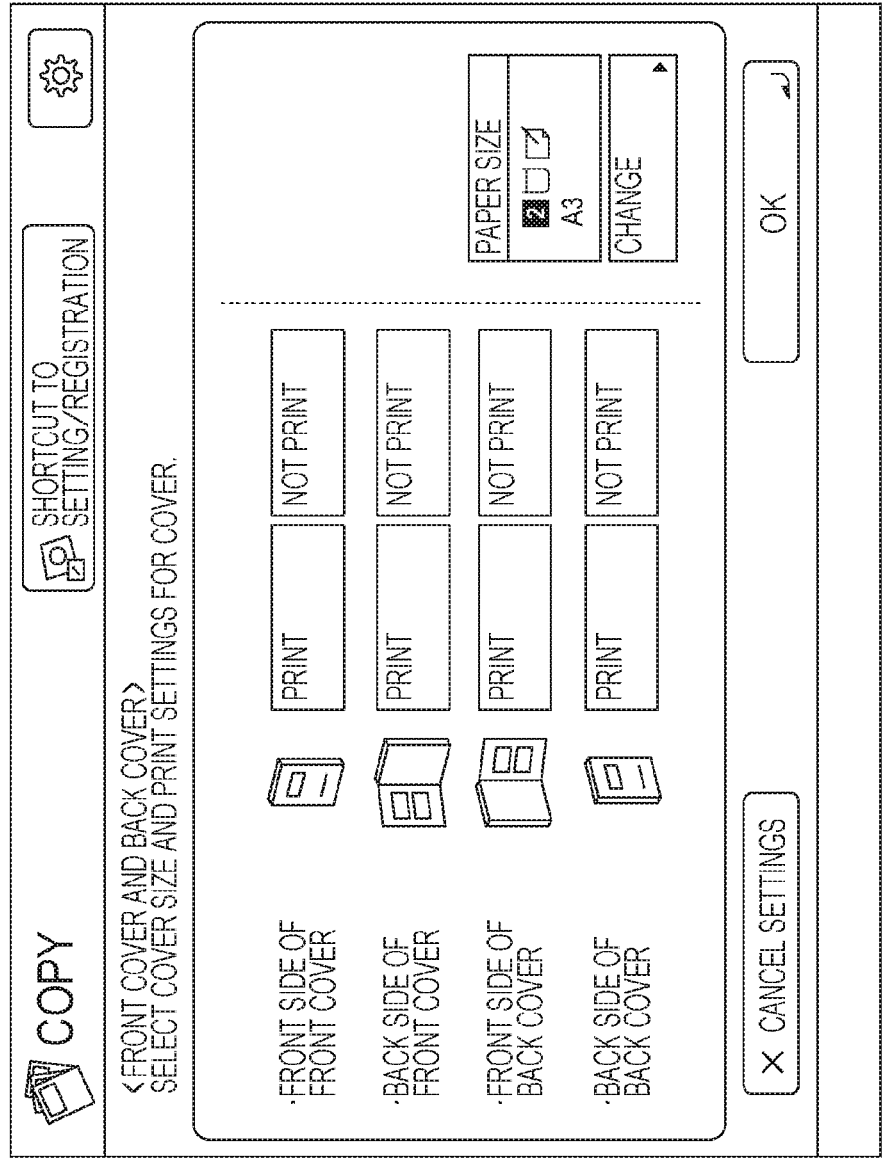
Figure 14C:

In a case where, as illustrated in FIGS. 14A to 14C, the setting for performing double-sided printing on a cover sheet is defined previously, a row 2301 corresponding to the cassette 353 storing paper of cardboard 3 may be shaded on the sheet selection screen 2201 so as to inhibit a user from selecting it. Because double-sided printing is not allowed to perform on cardboard 4 either, the CPU 402 may shade a row corresponding to the deck 354 storing paper of cardboard 4 on the screen illustrated in FIGS. 14A to 14C so as to inhibit a user from selecting it.

FIGS. 11A to 11F are schematic diagrams illustrating an example of a screen transition of a binding setting screen to be displayed on the display unit 505 in a case where a user defines a setting for discharging a leftward book bound product to the stacking tray 328.

A portal screen 1601 is a screen to be displayed on the display unit 505 for setting binding. On the portal screen 1601, a "NO FOLD" key 1702 is highlighted, which indicates that a book bound product is to be discharged to the stacking tray 328.

If the CPU 402 detects on the portal screen 1601 that a "COVER" key 1703 has been pressed, a setting screen 1602 is displayed for setting a print position on a cover sheet.

If the CPU 402 detects on the setting screen 1602 that the "CHANGE" key 1704 has been pressed, a sheet selection screen 1603 is displayed. On the sheet selection screen 1603, a row 1705 corresponding to the deck 354 storing paper having a size of A3 and a name of "cardboard 4 (257 to 300 g/m2)" is highlighted to indicate that it is selected as paper to be used for a cover sheet to be attached to a book bound product.

If the CPU 402 detects on the sheet selection screen 1603 that the "OK" key 1706 has been pressed, a setting screen 1604 is displayed for setting a print position on a cover sheet. Here, "PRINT" keys 1707 and 1708 highlighted as on the setting screen 1604 indicate that printing is to be performed on the inner side of a cover sheet of "cardboard 4 (257 to 300 g/m2)". However, because double-sided printing and inversing cannot be executed on cardboard 4 as in the paper management table illustrated in FIG. 7, a cover sheet having an image printed on its inner side may not be added to the body.

If the CPU 402 detects on the setting screen 1604 that the "OK" key 1709 has been pressed, a binding portal screen 1605 is displayed, and a "COVER" key 1710 is highlighted, which indicates that the setting for attaching a cover sheet to a book bound product has completed. The CPU 402 holds the settings received through the screens illustrated in FIGS. 11A to 11F in the DRAM 406.

If the start key 506 is pressed with the portal screen 1605 displayed, the CPU 402 provides a display warning 1606 that binding using cardboard 4 as a cover sheet is not allowed to be set based on the settings stored in the DRAM 406 and the paper management table illustrated in FIG. 7.

On the portal screen 1605, if the CPU 402 detects that "OK" key 1711 has been pressed, it may be controlled so as to provide the display warning 1606 based on the settings stored in the DRAM 406 and the paper management table illustrated in FIG. 7.

Figure 15A:
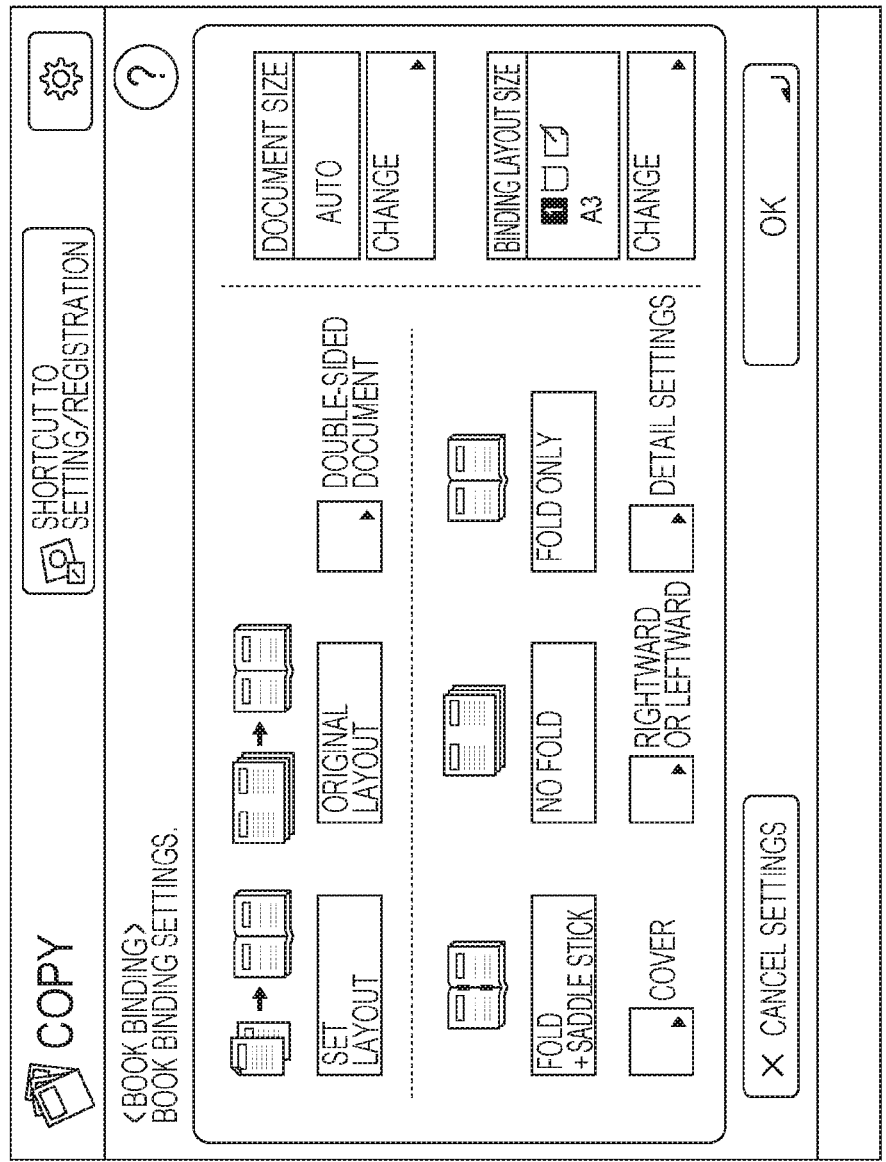
FIGS. 15A to 15C are diagrams for describing screens according to the embodiment.
Figure 15B:
Figure 15C:
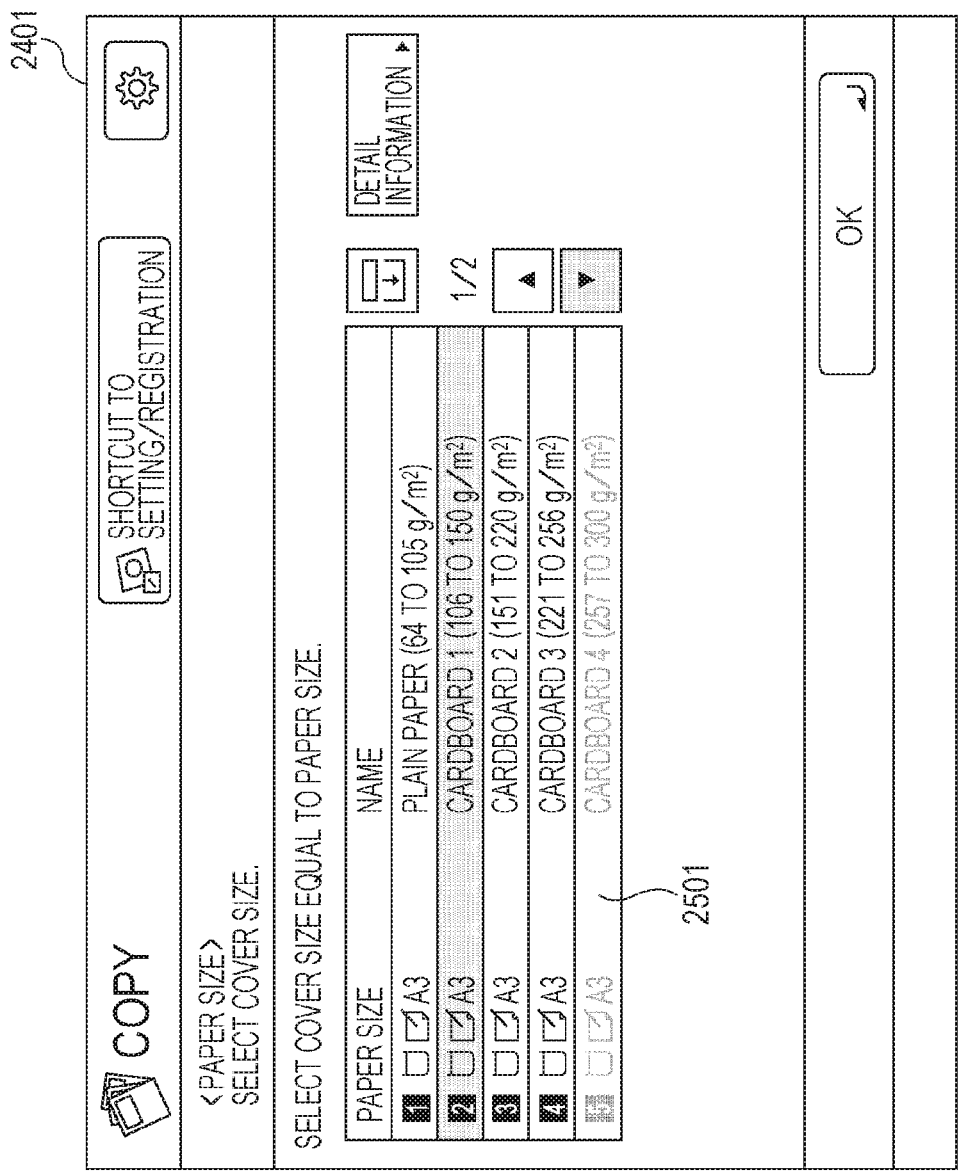

In a case where, as illustrated in FIGS. 15A to 15C, the setting for performing printing on the inner side of a cover sheet is defined previously, the CPU 402 may control so as to shade a row 2501 corresponding to the deck 354 storing paper of cardboard 4 on the sheet selection screen 2401 to inhibit a user from selecting it. Because cardboard 3 can be inversed, the CPU 402 may display, on the screens illustrated in FIGS. 15A to 15C, the row corresponding to the cassette 353 storing paper of cardboard 3 as being selectable by a user.

Next, image layouts and printing results in a case where a binding layout process is executed and the printing result is discharged to the stacking tray 328 and in a case where a saddle stitch bookbinding process is executed and the printing result is discharged to the saddle-stitch bookbinding tray 331 will be described more specifically with reference to FIGS. 16A and 16B to FIGS. 19A and 19B.

FIG. 16A is a diagram for explaining how pages of images of a document are to be laid out in a case where a binding layout process which attaches a cover sheet not requiring printing to a leftward book bound product is executed and the resulting book bound product is discharged to the stacking tray 328. For the discharge to the stacking tray 328, the images 3231 of pages of a document may be laid out to images 3232, for example, and be held in the DRAM 406. When the layout processing completes, printing is performed in order from the image of the sheet corresponding to the innermost page of the book bound product to the image of the sheet corresponding to the outermost page of the book bound product. In order to acquire the layout of the images 3232, the CPU 402 prints in order of the front side of the first sheet (body), the back side of the first sheet (body), the front side of the second sheet (body), the back side of the second sheet (body), the front side of the third sheet (body), and the back side of the third sheet (body). The CPU 402 feeds the fourth sheet (cover sheet) at last. The conveyance rollers 31 to 35 are caused to discharge the printed sheets to the stacking tray 328. FIG. 16A illustrates the discharged printing result.

FIG. 16B is a diagram for explaining how pages of original images are to be laid out in a case where a binding layout process which attaches a cover sheet having undergone double-sided printing to a leftward book bound product is executed and the resulting book bound product is discharged to the stacking tray 328. For the discharge to the stacking tray 328, images 3241 of pages of a document may be laid out to images 3242, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3242, the CPU 402 controls the printing in the following order. That is, the CPU 402 controls so as to print in order of the front side of the first sheet (body), the back side of the first sheet (body), the front side of the second sheet (body), the back side of the second sheet (body), the front side of the third sheet (body), the back side of the third sheet (body), the front side of the fourth sheet (cover sheet), and the back side of the fourth sheet (cover sheet). The conveyance rollers 31 to 35 are caused to discharge the printed sheets to the stacking tray 328. FIG. 16B illustrates the discharged printing result.

Figure 17A:
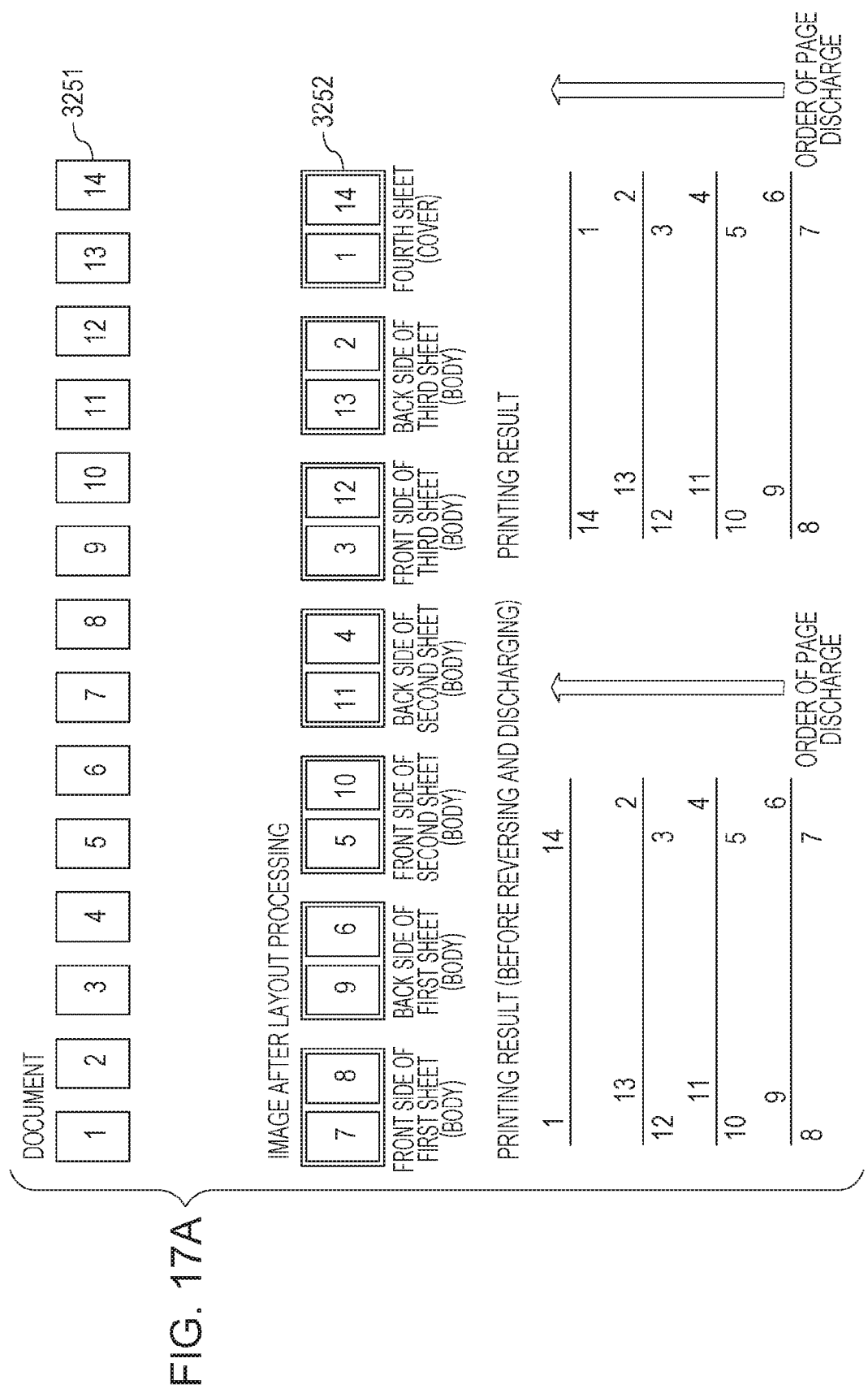

FIG. 17A is a diagram for explaining how pages of original images are to be laid out in a case where a binding layout process which attaches a cover sheet having an inner side printed to a leftward book bound product is executed and the resulting book bound product is discharged to the stacking tray 328. For the discharge to the stacking tray 328, the images 3251 of pages of a document may be laid out to images 3252, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3252, the CPU 402 controls so as to print in the following order. That is, the CPU 402 controls so as to print in order of the front side of the first sheet (body), the back side of the first sheet (body), the front side of the second sheet (body), the back side of the second sheet (body), the front side of the third sheet (body), and the back side of the third sheet (body). The CPU 402 prints the fourth sheet (cover sheet) at last. Here, in a case where a sheet on which double-sided printing is not executable such as cardboard 3 in the paper management table in FIG. 7 is used as the cover sheet of the book bound product, the sheet is switched back through a conveying path under the flapper 326 illustrated in FIG. 1. Thus, the sheet is reversed and discharged to the sheet discharge port 325 with its printed side facing down. The conveyance rollers 31 to 35 are caused to discharge the printed sheets to the stacking tray 328. FIG. 17A illustrates the discharged printing result. In other words, discharging a sheet on which double-sided printing is not executable like cardboard 3 in the paper management table in FIG. 7 to the stacking tray 328 allows printing to be performed on the back side of the cover sheet and the front side of the back cover.

FIG. 17B is a diagram for explaining how pages of original images are to be laid out in a case where a binding layout process which attaches a cover sheet having an outer side printed to a leftward book bound product is executed and the resulting book bound product is discharged to the stacking tray 328. For the discharge to the stacking tray 328, the images 3261 of pages of a document may be laid out to images 3262, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3262, the CPU 402 controls so as to print in the following order. That is, the CPU 402 prints in order of the front side of the first sheet (body), the back side of the first sheet (body), the front side of the second sheet (body), the back side of the second sheet (body), the front side of the third sheet (body), and the back side of the third sheet (body). The CPU 402 then controls so as to print the fourth sheet (cover sheet) at last. Here, in a case where a sheet on which double-sided printing is not executable such as cardboard 3 and cardboard 4 in the paper management table in FIG. 7 is used as the cover sheet of the book bound product, the sheet is discharged through a conveying path above the flapper 326 illustrated in FIG. 1. Thus, the sheet is discharged to the sheet discharge port 325 with its printed side facing up. The conveyance rollers 31 to 35 are caused to discharge the printed sheets to the stacking tray 328. FIG. 17B illustrates the discharged printing result. In other words, discharging a sheet on which double-sided printing is not executable like cardboard 3 and cardboard 4 in the paper management table in FIG. 7 to the stacking tray 328 allows printing to be performed on the front side of the cover sheet and the back side of the back cover.

FIG. 18A is a diagram for explaining how pages of original images are to be laid out in a case where a saddle stitch bookbinding process which attaches a cover sheet not requiring printing to a leftward book bound product is executed and the resulting book bound product is discharged to the saddle-stitch bookbinding tray 331. For the discharge to the saddle-stitch bookbinding tray 331, the images 3271 of pages of a document may be laid out to images 3272, for example, and be held in the DRAM 406. When the layout processing completes, printing is performed in order from the image of the sheet corresponding to the innermost page of the book bound product to the image of the sheet corresponding to the outermost page of the book bound product. In order to acquire the layout of the images 3272, the CPU 402 controls so as to print in the following order. That is, the printing is executed in the order of the front side of the first sheet (body), the back side of the first sheet (body), the front side of the second sheet (body), the back side of the second sheet (body), the front side of the third sheet (body), and the back side of the third sheet (body). The CPU 402 feeds the fourth sheet (cover sheet) at last. After the printed sheets are conveyed by the conveyance rollers 31, 37, and 38 until the rear end of the sheets reach a rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 18A illustrates the discharged printing result.

Figure 18B:
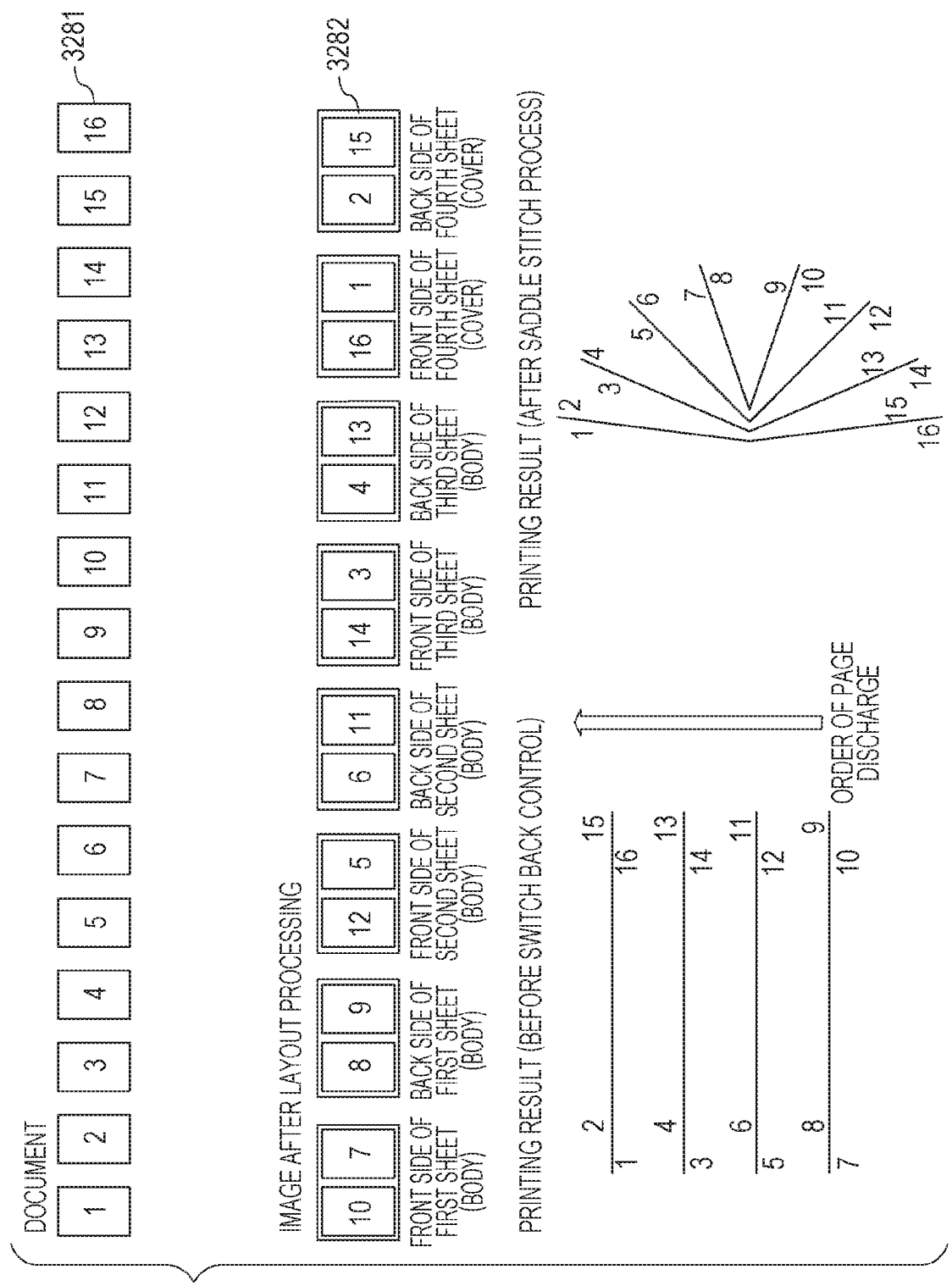

FIG. 18B is a diagram for explaining how pages of original images are to be laid out in a case where a saddle stitch bookbinding process which attaches a cover sheet having undergone double-sided printing to a leftward book bound product is executed and the resulting book bound product is discharged to the saddle-stitch bookbinding tray 331. For the discharge to the saddle-stitch bookbinding tray 331, images 3281 of pages of a document may be laid out to images 3282, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3282, the CPU 402 controls the printing in the following order. That is, the CPU 402 controls so as to print in the order of the front side of the first sheet (body), the back side of the first sheet (body), the front side of the second sheet (body), the back side of the second sheet (body), the front side of the third sheet (body), the back side of the third sheet (body), the front side of the fourth sheet (cover sheet), and the back side of the fourth sheet (cover sheet). After the printed sheets are conveyed by the conveyance rollers 31, 37 and 38 until the rear end of the sheets reach the rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 18B illustrates the discharged printing result.

Figure 19A:
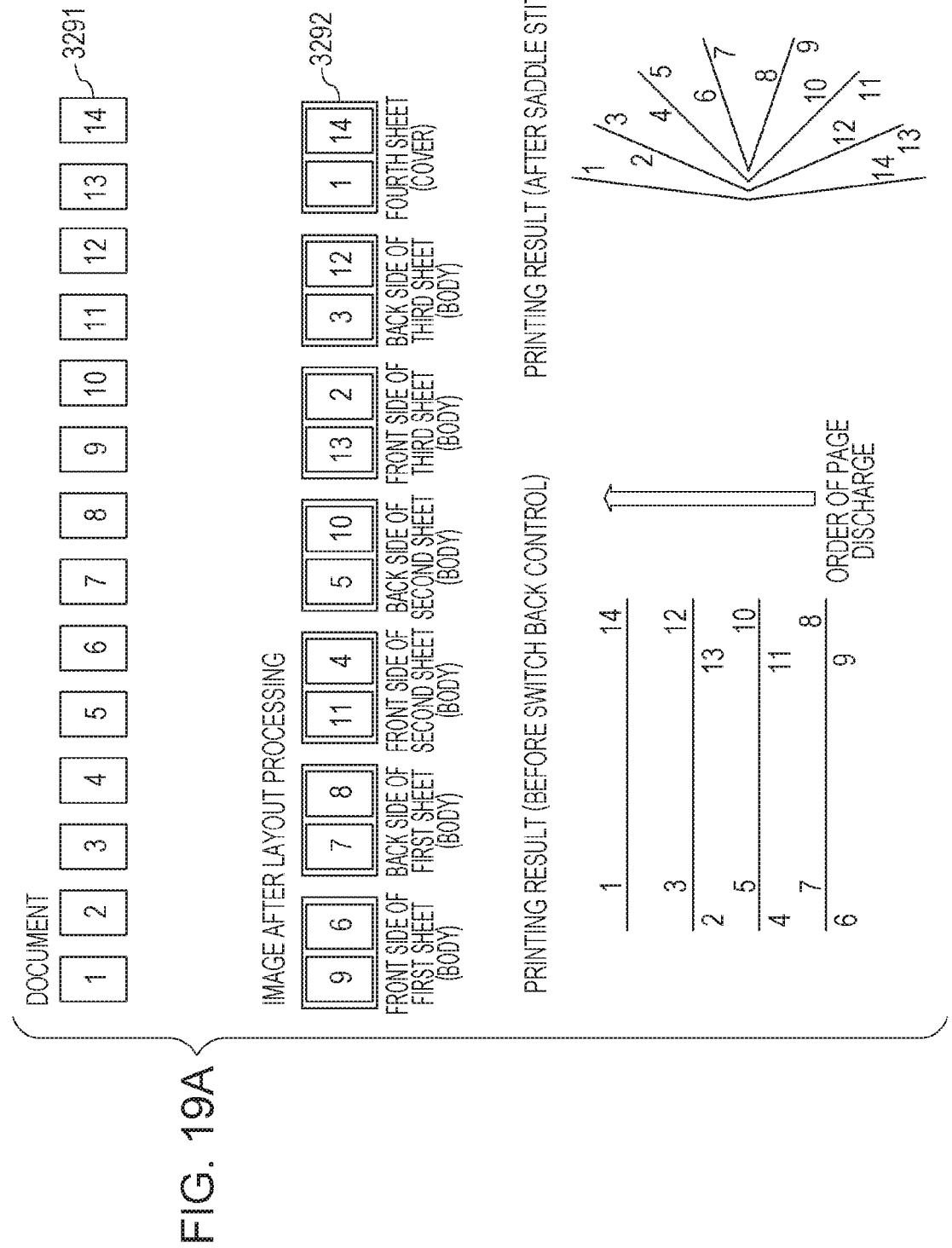

FIG. 19A is a diagram for explaining how pages of original images are to be laid out in a case where a saddle stitch bookbinding process which attaches a cover sheet having an inner side printed to a leftward book bound product is executed and the resulting book bound product is discharged to the saddle-stitch bookbinding tray 331. For the discharge to the saddle-stitch bookbinding tray 331, the images 3291 of pages of a document may be laid out to images 3292, for example, and be held in the DRAM 406. When the layout processing completes, printing is performed in order from the image of the sheet corresponding to the innermost page of the book bound product to the image of the sheet corresponding to the cover sheet of the book bound product. With the layout of the images 3292, the CPU 402 prints in the order of the front side of the first sheet (body), the back side of the first sheet (body), the front side of the second sheet (body), the back side of the second sheet (body), the front side of the third sheet (body), and the back side of the third sheet (body). The CPU 402 prints the fourth sheet (cover sheet) at last. Here, in a case where a sheet on which double-sided printing is not executable such as cardboard 3 and cardboard 4 in the paper management table in FIG. 7 is used as the cover sheet of the book bound product, the sheet is discharged with its printed side facing up through the conveying path above the flapper 326 illustrated in FIG. 1. After the printed sheets are conveyed by the conveyance rollers 31, 37, and 38 until the rear end of the sheets reach the rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 19A illustrates the discharged printing result. In other words, discharging a sheet on which double-sided printing is not executable like cardboard 3 and cardboard 4 in the paper management table in FIG. 7 to the saddle-stitch bookbinding tray 331 allows printing to be performed on the back side of the cover sheet and the front side of the back cover.

FIG. 19B is a diagram for explaining how pages of original images are to be laid out in a case where a saddle stitch bookbinding process which attaches a cover sheet having an outer side printed to a leftward book bound product is executed and the resulting book bound product is discharged to the saddle-stitch bookbinding tray 331. For the discharge to the saddle-stitch bookbinding tray 331, the image 3301 of pages of a document may be laid out to images 3302, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3302, the CPU 402 prints in the order of the front side of the first sheet (body), the back side of the first sheet (body), the front side of the second sheet (body), the back side of the second sheet (body), the front side of the third sheet (body), and the back side of the third sheet (body). The CPU 402 then controls so as to print the fourth sheet (cover sheet) at last. Here, in a case where a sheet on which double-sided printing is not executable such as cardboard 3 in the paper management table in FIG. 7 is used as the cover sheet of the book bound product, the sheet is switched back through a conveying path under the flapper 326 illustrated in FIG. 1. Thus, the sheet is reversed and discharged to the sheet discharge port 325 with its printed side facing down. After the printed sheets are conveyed by the conveyance rollers 31, 37, and 38 until the rear end of the sheets reach a rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 19B illustrates the discharged printing result. In other words, discharging a sheet on which double-sided printing is not executable like cardboard 3 in the paper management table in FIG. 7 to the saddle-stitch bookbinding tray 331 allows printing to be performed on the front side of the cover sheet and the back side of the back cover.

In a case where a cover sheet having an inner side printed is attached to a leftward book bound product, the processing for acquiring the book bound product discharged to the stacking tray 328 and the processing for acquiring the book bound product discharged to the saddle-stitch bookbinding tray 331 only differ in the presence/absence of the binding process and the folding process, as illustrated in FIG. 17A and FIG. 19A. In a case where a cover sheet having an outer side printed is attached to a leftward book bound product, the processing for acquiring the book bound product discharged to the stacking tray 328 and the processing for acquiring the book bound product discharged to the saddle-stitch bookbinding tray 331 only differ in the presence/absence of the binding process and the folding process, as illustrated in FIG. 17B and FIG. 19B.

Next, a control procedure to be performed by the CPU 402 according to the first embodiment will be described with reference to FIGS. 20A to 22B. The CPU 402 reads out and executes a program stored in the ROM 404 to execute steps in the flowcharts in FIGS. 20A to 22B.

Figure 20A:
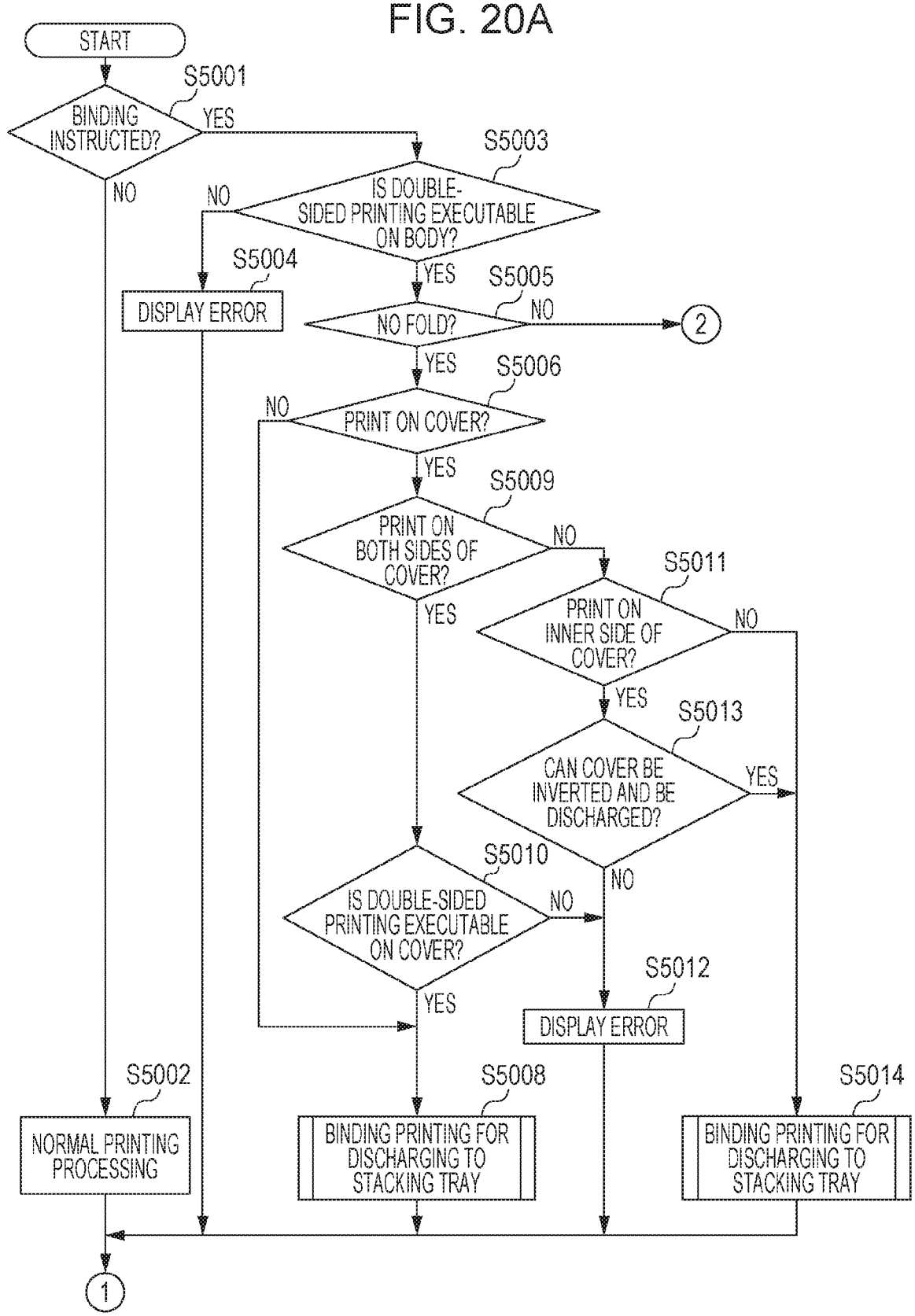
FIGS. 20A and 20B illustrate a flowchart for describing a control example according to the first embodiment of the present invention.
Figure 20B:
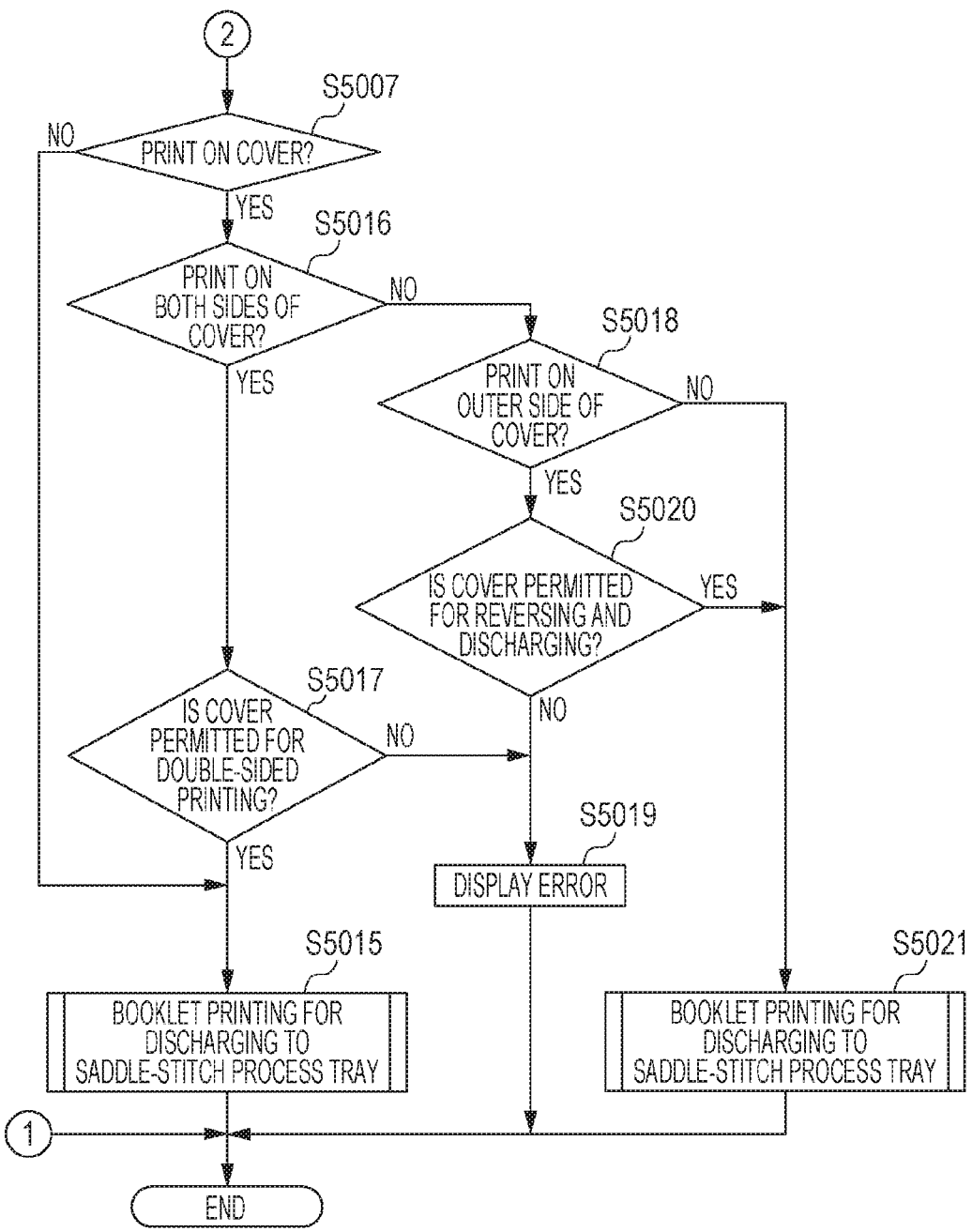

First, in response to a job execution request through the start key 506, the CPU 402 starts processing in the flowchart in FIGS. 20A and 20B. For example, in response to a copy job execution request for printing images of a document read by a scanner unit in the printer unit, the CPU 402 performs the processing in the flowchart scanner 301 after all images of the document are read. In response to a print job execution request for printing, in the printer unit, images received from an external PC, the CPU 402 performs the processing in the flowchart after all images are received from the PC.

First, in S5001 (where S stands for step), the CPU 402 determines whether a binding process is designated or not. If it is determined that a binding process is designated, the CPU 402 advances the processing to S5003. If not, the CPU 402 advances the processing to S5002. Note that, before S5001, the CPU 402 may determine whether the sheet processing apparatus 315 in connection with the image formation apparatus. In this case, if it is determined that the sheet processing apparatus 315 is in connection with the image formation apparatus, the CPU 402 advances the processing to S5001. If it is determined that the sheet processing apparatus 315 is not in connection with the image formation apparatus, the CPU 402 may advance the processing to S5002.

In S5002, the CPU 402 executes normal print processing based on settings received from a user. Then, the processing ends. For example, printing is performed by the image formation apparatus, and the resulting sheets are discharged without executing post-processing by the sheet processing apparatus 315.

On the other hand, when processing moves from S5001 to S5003, the CPU 402 determines whether double-sided printing is executable on the sheets designated to use for the body of a book bound product or not. If it is determined that double-sided printing is not executable on the sheets designated to use for the body of the book bound product, the CPU 402 advances the processing to S5004. On the other hand, if it is determined that double-sided printing is executable on the sheets designated to use for the body of the book bound product, the CPU 402 advances the processing to S5005.

Figure 23:
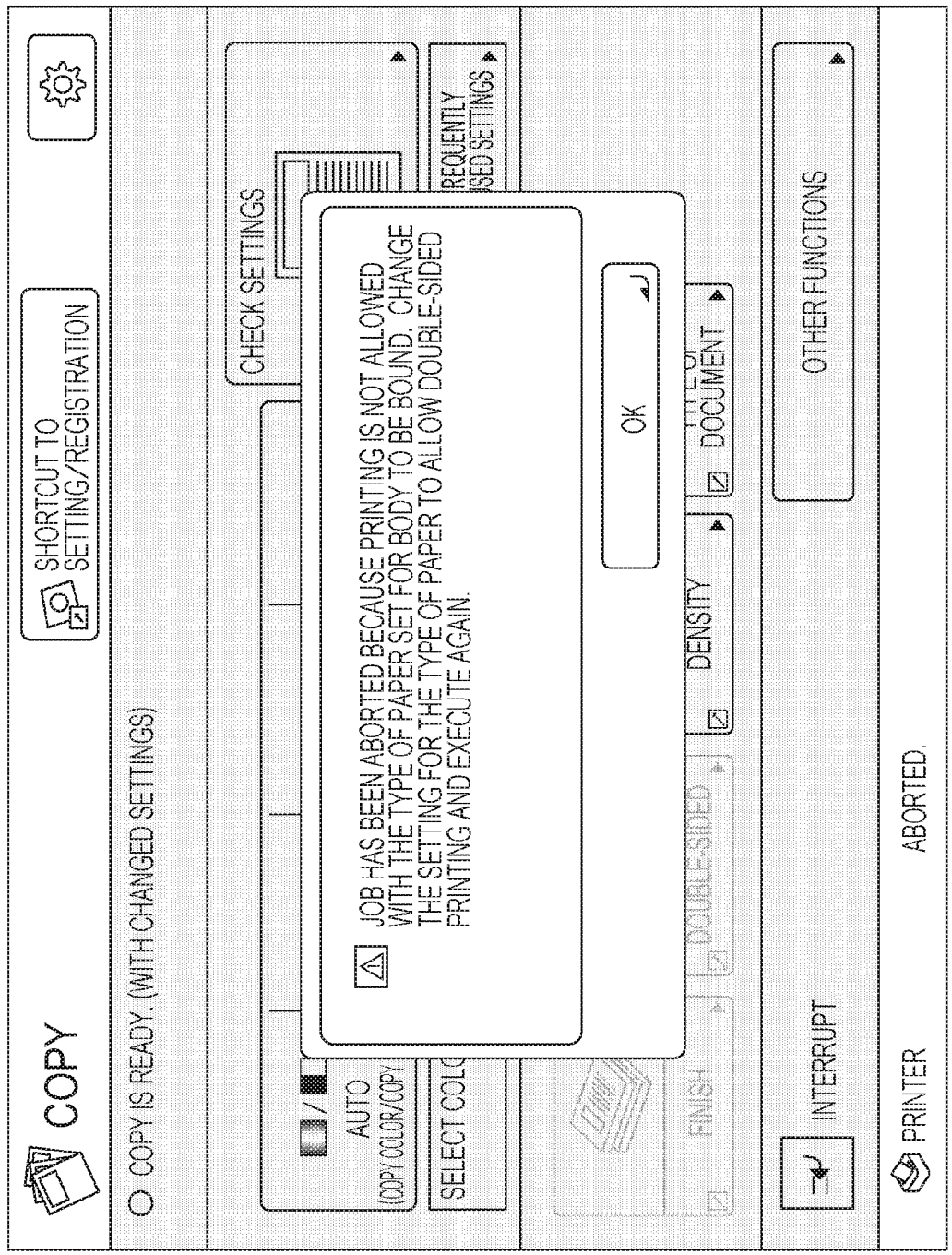
FIG. 23 is a diagram for describing a screen according to the embodiment.

In S5004, the CPU 402 performs processing for forcibly aborting the job. Then, an error message illustrated in FIG. 23 is displayed on the display unit 505. Then, the processing ends.

On the other hand, in S5005, the CPU 402 determines whether a binding layout process with no folding is designated or not is determined.

As described above, the following three forms of binding are available. That is,
Form 1: FOLD+SADDLE STITCH (saddle stitch book binding process)
Form 2: FOLD ONLY (center-folding and binding process)
Form 3: NO FOLD (binding layout process) The binding layout process with no folding corresponds to Form 3 and may be designated by using a "NO FOLD" key on the portal screen. On the other hand, FORM 1 and FORM 2 correspond to binding layout processes including folding. FORM 1 may be designated by using the "FOLD+SADDLE STITCH" key. FORM 2 may be designated by using "FOLD ONLY" key.

If it is determined that a binding layout process with no folding is designated, the CPU 402 advances the processing to S5006. On the other hand, if it is determined that a binding layout process including folding is designated, the CPU 402 advances the processing to S5007.

In S5006, the CPU 402 determines whether cover sheet printing is designated or not. If it is determined that cover sheet printing is designated, the CPU 402 moves the processing to S5009. If not, the CPU 402 advances the processing to S5008.

Figure 21A:
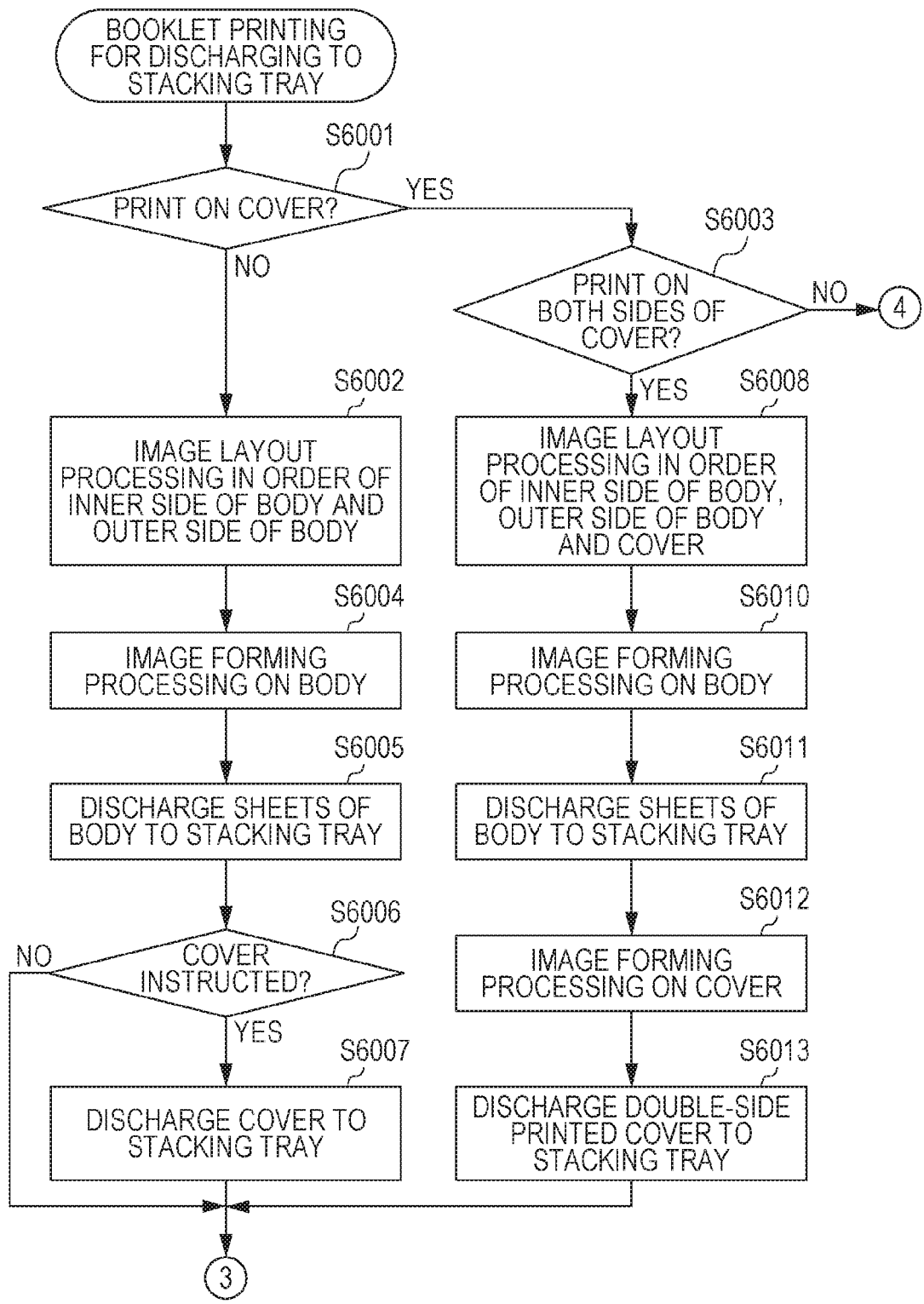

In S5008, the CPU 402 executes booklet print processing illustrated in FIGS. 21A and 21B which discharges sheets to the stacking tray. Then, the processing ends.

On the other hand, in S5009, the CPU 402 determines whether double-sided printing is designated for the cover sheet or not. If it is determined that double-sided printing designated for the cover sheet, the CPU 402 advances the processing to S5010. If not, the CPU 402 advances the processing to S5011.

In S5010, the CPU 402 determines whether double-sided printing is executable on the cover sheet to be attached to the book bound product or not based on the paper type designated to use for the cover sheet and the paper management table illustrated in FIG. 7. If it is determined that double-sided printing is not executable on the sheet, the CPU 402 advances the processing to S5012. If it is determined that double-sided printing is executable on the sheet, the CPU 402 advances the processing to S5008.

Figure 24:
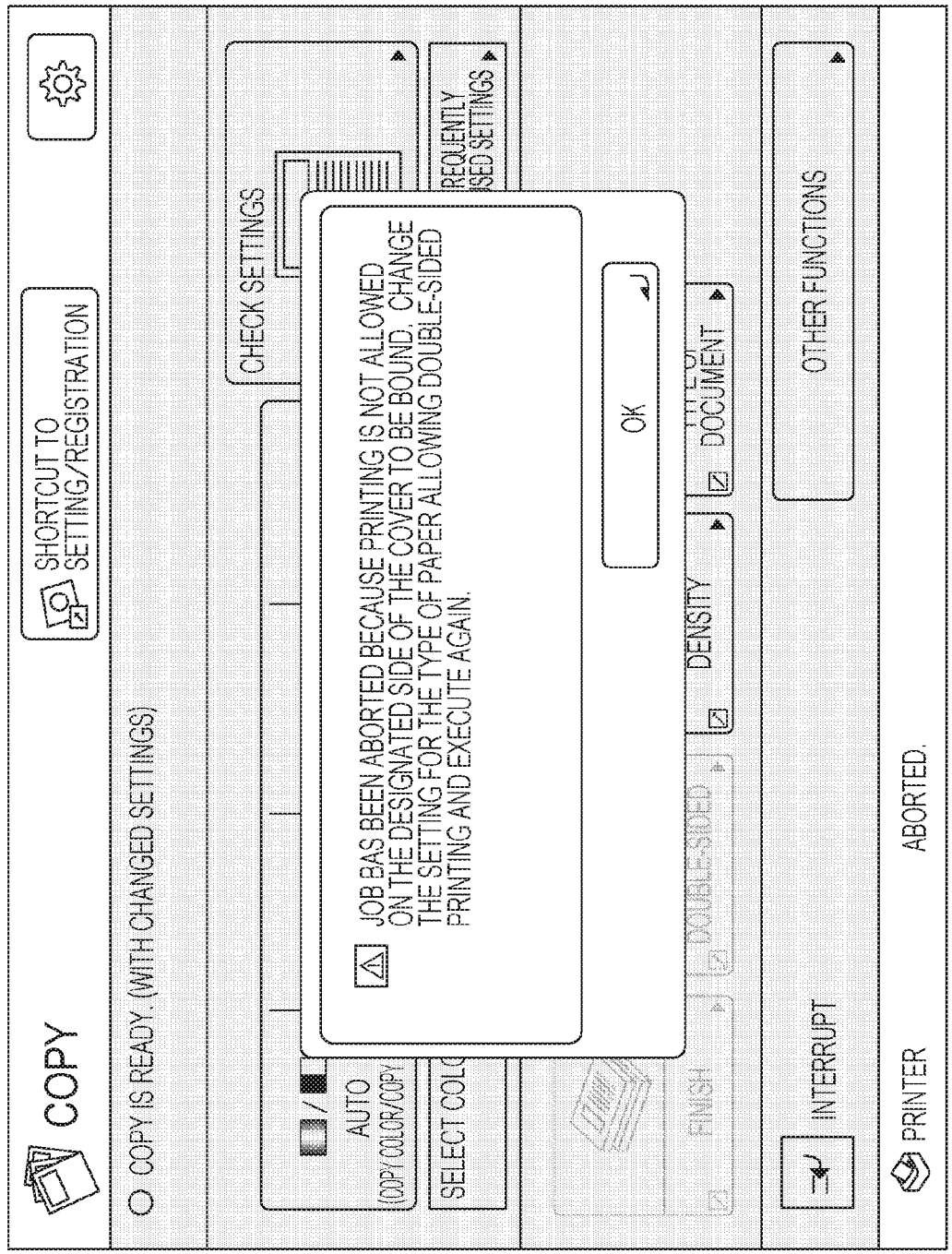
FIG. 24 is a diagram for describing a screen according to the embodiment.

In S5012, the CPU 402 performs processing for forcibly aborting the job. Then, an error message illustrated in FIG. 24 is displayed on the display unit 505. Then, the processing ends.

On the other hand, in S5011 after S5009, the CPU 402 determines whether printing on the inner side of the cover sheet is designated or not. If it is determined that printing on the inner side of the cover sheet is designated, the CPU 402 advances the processing to S5013. If it is determined printing on the inner side of the cover sheet is not designated, the CPU 402 advances the processing to S5014.

In S5014, the CPU 402 executes booklet print processing illustrated in FIGS. 21A and 21B which discharges sheets to the stacking tray. Then, the processing ends.

On the other hand, in S5013, the CPU 402 determines whether the sheet for the cover sheet to be attached to the book bound product can be inverted and be discharged or not. If not, the CPU 402 advances the processing to S5012. If so, the CPU 402 advances the processing to S5014.

On the other hand, in S5007, the CPU 402 determines whether printing on the cover sheet is designated or not. If so, the CPU 402 advances the processing to S5016. If not, the CPU 402 advances the processing to S5015.

Figure 22A:
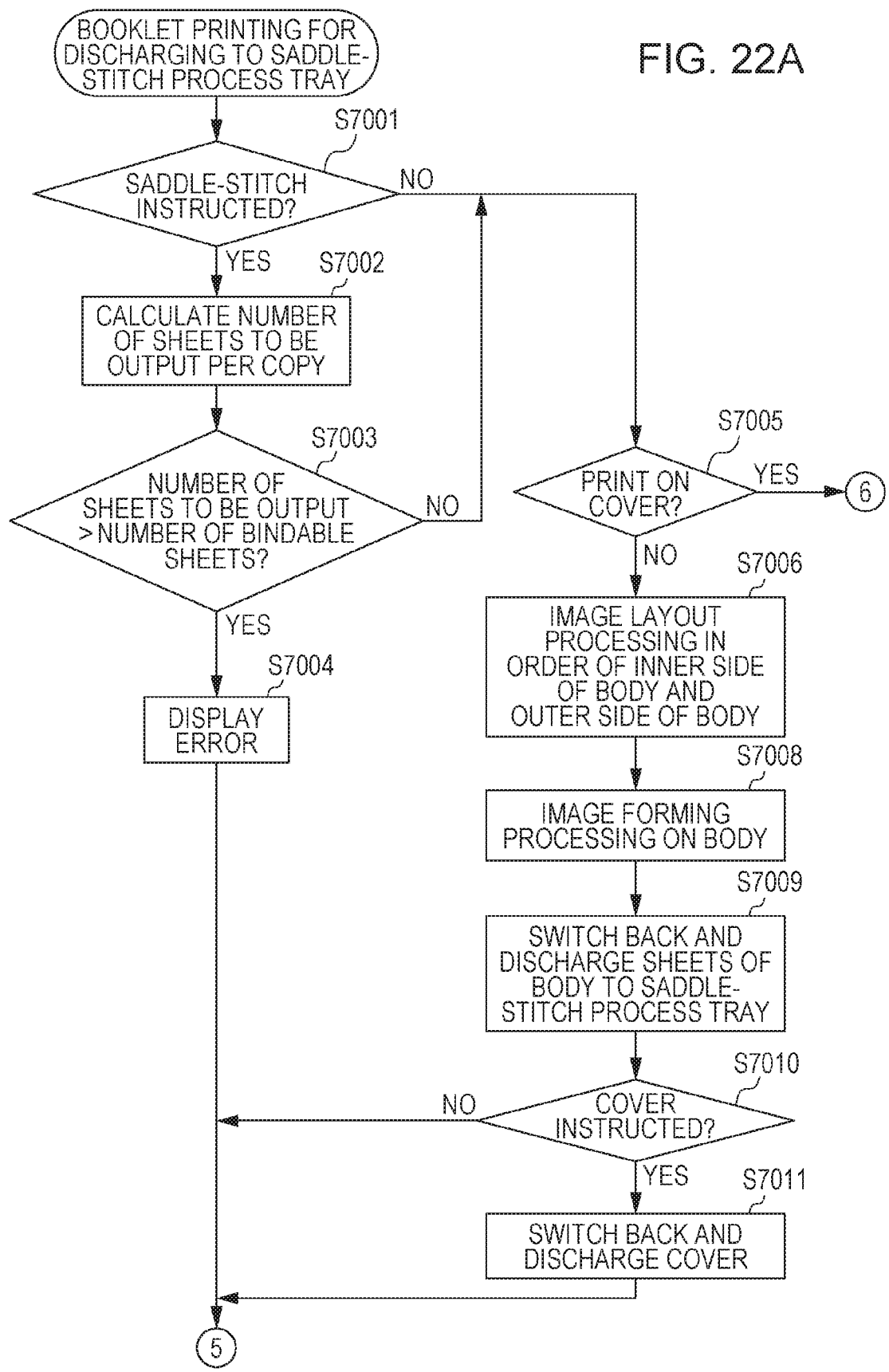
FIGS. 22A and 22B illustrate a flowchart for describing a control example according to the first embodiment of the present invention.
Figure 22B:
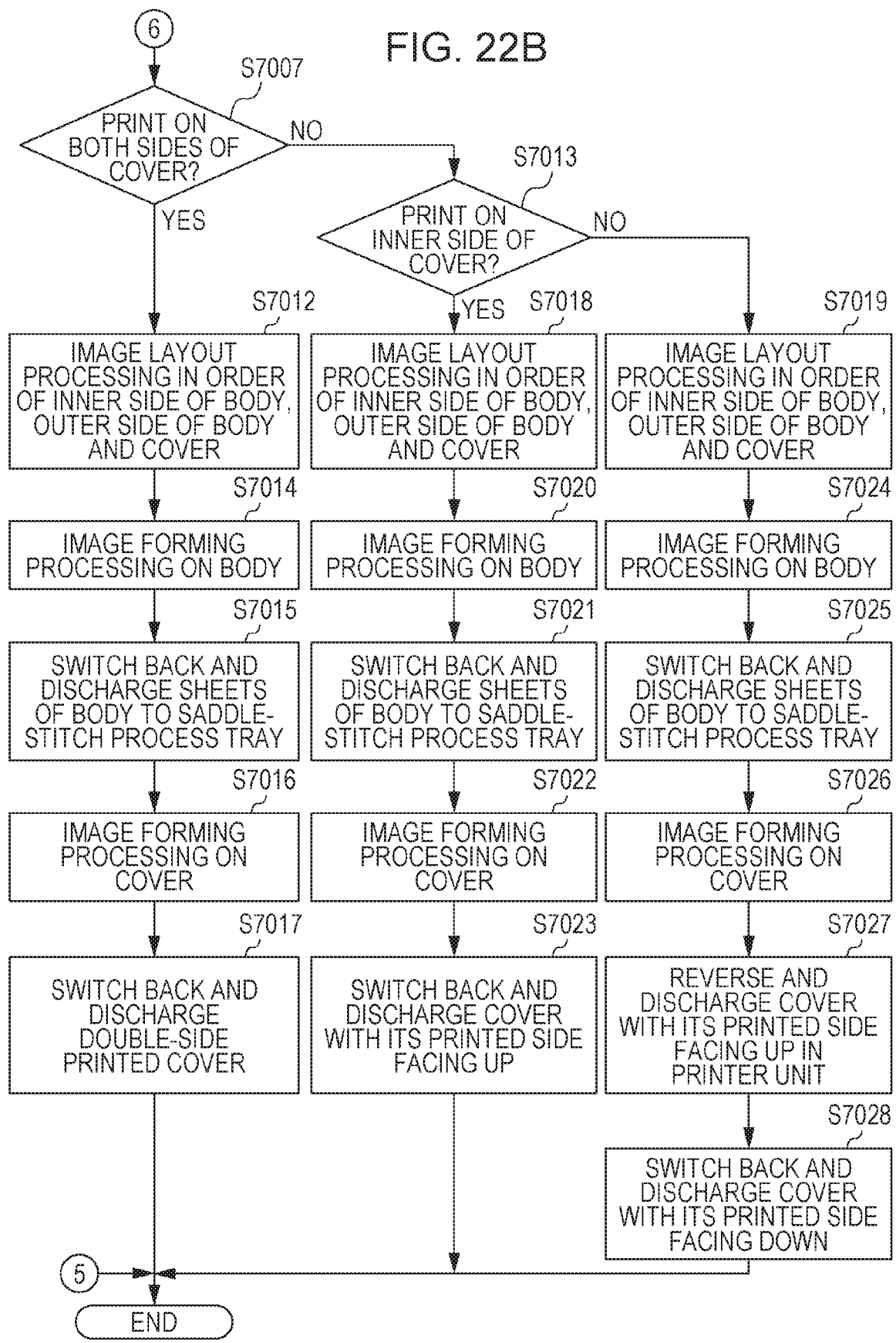

In S5015, the CPU 402 executes booklet printing processing illustrated in FIGS. 22A and 22B which discharges sheets to the binding processing tray. Then, the processing ends.

On the other hand, in S5016, the CPU 402 determines whether double-sided printing is designated for the cover sheet or not. If it is determined that double-sided printing designated for the cover sheet, the CPU 402 advances the processing to S5017. If not, the CPU 402 advances the processing to S5018.

In S5017, the CPU 402 determines whether double-sided printing is executable on the cover sheet to be attached to the book bound product or not. If it is determined that double-sided printing is not executable on the sheet, the CPU 402 advances the processing to S5019. If it is determined that double-sided printing is executable on the sheet, the CPU 402 advances the processing to S5015.

In S5019, the CPU 402 performs processing for forcibly aborting the job. Then, an error message illustrated in FIG. 24 is displayed on the display unit 505. Then, the processing ends.

On the other hand, in S5018, the CPU 402 determines whether printing on the outer side of the cover sheet is designated or not. If it is determined that printing on the outer side of the cover sheet is designated, the CPU 402 advances the processing to S5020. If it is determined that printing on the outer side of the cover sheet is not designated, the CPU 402 advances the processing to S5021.

In S5021, the CPU 402 executes booklet printing processing illustrated in FIGS. 22A and 22B which discharges sheets to the binding processing tray. Then, the processing ends.

On the other hand, in S5020, the CPU 402 determines whether the sheet for the cover sheet to be attached to the book bound product can be inverted and ne discharged or not. If not, the CPU 402 advances the processing to S5019. If so, the CPU 402 advances the processing to S5021.

FIGS. 21A and 21B illustrate a flowchart describing the booklet printing processing procedure in S5008 and S5014 in FIG. 20A which discharges sheets to a stacking tray.

First, in S6001, the CPU 402 determines whether printing on the cover sheet is designated or not. If so, the CPU 402 advances the processing to S6003. If not, the CPU 402 advances the processing to S6002.

In S6002, the CPU 402 lays out pages by the method as illustrated in FIG. 16A and advances the processing to S6004.

In S6004, the CPU 402 performs image formation processing on sheets corresponding to the body and advances the processing to S6005.

In S6005, the CPU 402 controls so as to discharge the sheets corresponding to the body to the stacking tray 328 without executing a binding process and a folding process and advances the processing to S6006.

In S6006, the CPU 402 determines whether attachment of a cover sheet is designated or not. If it is determined that cover sheet is designated to attach, the CPU 402 advances the processing to S6007. If not, the processing ends.

In S6007, the CPU 402 controls so as to discharge the sheets corresponding to the cover sheet to the stacking tray 328 without executing a binding process and a folding process. Then, the processing ends.

On the other hand, in S6003 after S6002, the CPU 402 determines whether printing on both sides of the cover sheet is designated or not. If it is determined that printing on both sides of the cover sheet is designated, the CPU 402 advances the processing to S6008. If not, the CPU 402 advances the processing to S6009.

In S6008, the CPU 402 lays out pages by the method as illustrated in FIG. 16B and advances the processing to S6010.

In S6010, the CPU 402 performs image formation processing on sheets corresponding to the body and advances the processing to S6011.

In S6011, the CPU 402 controls so as to discharge the sheets corresponding to the body to the stacking tray 328 without executing a binding process and a folding process.

In S6012, the CPU 402 performs image formation processing on sheets corresponding to the cover sheet and advances the processing to S6013.

In S6013, the CPU 402 controls so as to discharge the sheets corresponding to the cover sheet to the stacking tray 328 without executing a binding process and a folding process. Then, the processing ends.

On the other hand, in S6009 after S6003, the CPU 402 determines whether printing on the inner side of the cover sheet is designated or not. If it is determined that printing on the inner side of the cover sheet is designated, the 402 advances the processing to S6014. If not, the CPU 402 advances the processing to S6015.

In S6014, the CPU 402 lays out pages by the method as illustrated in FIG. 17A, and advances the processing to S6016.

In S6016, the CPU 402 performs image formation processing on sheets corresponding to the body and advances the processing to S6017.

In S6017, the CPU 402 controls so as to discharge the sheets corresponding to the body to the stacking tray 328 without executing a binding process and a folding process.

In S6018, the CPU 402 performs image formation processing on sheets corresponding to the cover sheet and advances the processing to S6019.

In S6019, the CPU 402 switches back the sheet corresponding to the cover sheet through the conveying path under the flapper 326 illustrated in FIG. 1 so that the sheet may be inverted and be discharged to the sheet discharge port 325 with its printed side facing down and advances the processing to S6020.

In S6020, the CPU 402 controls so as to discharge the sheets corresponding to the cover sheet to the stacking tray 328 without executing a binding process and a folding process. Then, the processing ends.

On the other hand, in S6015, the CPU 402 lays out pages by the method as illustrated in FIG. 17B and advances the processing to S6021.

In S6021, the CPU 402 performs image formation processing on sheets corresponding to the body and advances the processing to S6022.

In S6022, the CPU 402 controls so as to discharge the sheets corresponding to the body to the stacking tray 328 without executing a binding process and a folding process.

In S6023, the CPU 402 performs image formation processing on sheets corresponding to the cover sheet and advances the processing to S6024.

In S6024, the CPU 402 discharges the sheet corresponding to the cover sheet through the conveying path above the flapper 326 illustrated in FIG. 1 so that the sheet may be discharged to the sheet discharge port 325 with its printed side facing up and discharges it to the stacking tray 328. Then, the processing ends.

FIGS. 22A and 22B illustrate a flowchart describing the booklet printing processing procedure in S5015 and S5021 in FIG. 20B which discharges sheets to a binding processing tray.

First, in S7001, the CPU 402 determines whether a saddle stitch process is designated or not. If it is determined that a saddle stitch process is designated, the CPU 402 advances the processing to S7002. If not, the CPU 402 advances the processing to S7005.

In S7002, the CPU 402 calculates the number of output sheets for one copy of the resulting book bound product and advances the processing to S7003. In a case where images of two pages are laid out in one page as illustrated in FIG. 18A, the number of output sheets per copy may be calculated by an expression that (the total number of pages+3)/4.

In S7003, the CPU 402 determines whether the number of output sheets per copy is higher than the number of sheets which can undergo saddle stitch processing to be performed by the sheet processing apparatus 315. The number of sheets which can undergo saddle stitch processing to be performed by the sheet processing apparatus 315 is stored in the ROM 404 as capability information of the sheet processing apparatus 315. If it is higher than the number of sheets which can undergo saddle stitch processing, the CPU 402 advances the processing to S7004. If not, the CPU 402 advances the processing to S7005.

Figure 25:
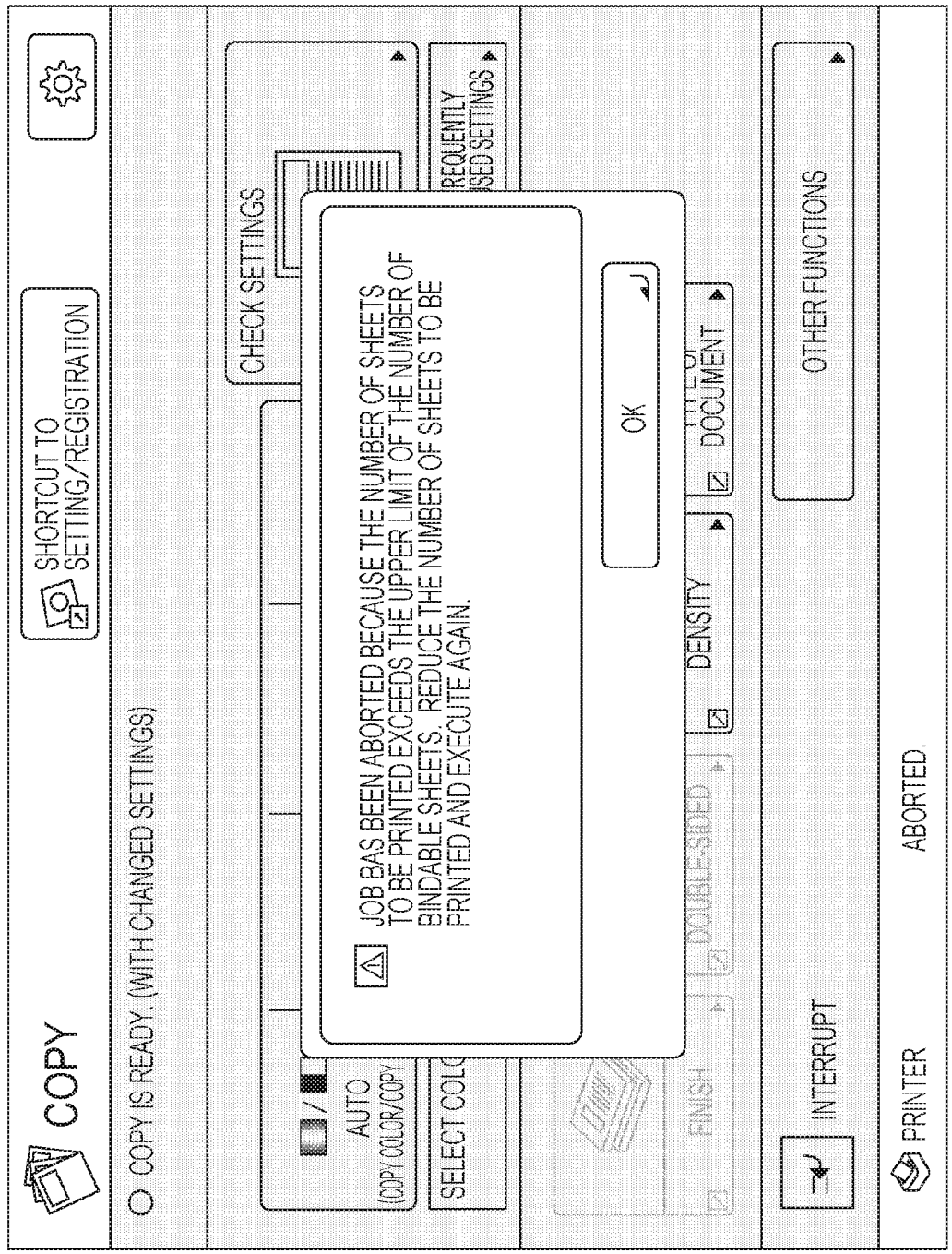
FIG. 25 is a diagram for describing a screen according to the embodiment.

In S7004, the CPU 402 performs processing for forcibly aborting the job. Then, an error pop-up message illustrated in FIG. 25 is displayed on the display unit 505. Then, the processing ends. The example has been described above that if it is determined in S7003 that the number of output sheets per copy is higher than the number of sheets which can undergo saddle stitch processing, the CPU 402 advances the processing to S7004 and that an error pop-up message illustrated in FIG. 25 is then displayed on the display unit 505. However, the present invention is not limited thereto. If it is determined in S7003 that the number of output sheets per copy is higher than the number of sheets which can undergo saddle stitch processing, the CPU 402 may advance the processing to S6001 in FIG. 21A and may execute the booklet printing processing procedure which discharges the sheets to the stacking tray.

On the other hand, in S7005, the CPU 402 determines whether printing on the cover sheet is designated or not. If so, the CPU 402 advances the processing to S7007. If not, the CPU 402 advances the processing to S7006.

In S7006, the CPU 402 lays out pages by the method as illustrated in FIG. 18A and advances the processing to S7008.

In S7008, the CPU 402 performs image formation processing on sheets corresponding to the body and advances the processing to S7009.

In S7009, the CPU 402 controls so as to switch back the sheets corresponding to the body through the conveyance rollers 37 and 38 and then store them within the conveying path 41.

In S7010, the CPU 402 determines whether attachment of a cover sheet is designated or not. If it is determined that cover sheet is designated to attach, the CPU 402 advances the processing to S7011. If not, the processing ends.

In S7011, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S7007, the CPU 402 determines whether printing on both sides of the cover sheet is designated or not. If it is determined that printing on both sides of the cover sheet is designated, the CPU 402 advances the processing to S7012. If not, the CPU 402 advances the processing to S7013.

In S7012, the CPU 402 lays out pages by the method as illustrated in FIG. 18B and advances the processing to S7014.

In S7014, the CPU 402 performs image formation processing on sheets corresponding to the body and advances the processing to S7015.

In S7015, the CPU 402 controls so as to switch back the sheets corresponding to the body through the conveyance rollers 37 and 38 and then store them within the conveying path 41.

In S7016, the CPU 402 performs image formation processing on sheets corresponding to the cover sheet and advances the processing to S7017.

In S7017, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S7013, the CPU 402 determines whether printing on the inner side of the cover sheet is designated or not. If it is determined that printing on the inner side of the cover sheet is designated, the CPU 402 advances the processing to S7018. If it is determined printing on the inner side of the cover sheet is not designated, the CPU 402 advances the processing to S7019.

In S7018, the CPU 402 lays out pages by the method as illustrated in FIG. 19A, and advances the processing to S7020.

In S7020, the CPU 402 performs image formation processing on sheets corresponding to the body and advances the processing to S7021.

In S7021, the CPU 402 controls so as to switch back the sheets corresponding to the body through the conveyance rollers 37 and 38 and then store them within the conveying path 41.

In S7022, the CPU 402 performs image formation processing on sheets corresponding to the cover sheet and advances the processing to S7023.

In S7023, the CPU 402 switches back the sheet corresponding to the cover sheet through the conveying path above the flapper 326 illustrated in FIG. 1 so that the sheet may be discharged to the sheet discharge port 325 with its printed side facing up. After that, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S7019, the CPU 402 lays out pages by the method as illustrated in FIG. 19B and advances the processing to S7024.

In S7024, the CPU 402 performs image formation processing on sheets corresponding to the body and advances the processing to S7025.

In S7025, the CPU 402 controls so as to switch back the sheets corresponding to the body through the conveyance rollers 37 and 38 and then store them within the conveying path 41.

In S7026, the CPU 402 performs image formation processing on sheets corresponding to the cover sheet and advances the processing to S7027.

In S7027, the CPU 402 switches back the sheet corresponding to the cover sheet through the conveying path under the flapper 326 illustrated in FIG. 1 so that the sheet may be inverted and be discharged to the sheet discharge port 325 with its printed side facing down and advances the processing to S7028.

In S7028, the CPU 402 switches back the sheet corresponding to the cover sheet through the conveyance rollers 37 and 38 and then stores it within the conveying path 41. The CPU 402 controls so as to perform a binding process and a folding process and discharge the saddle-stitch bookbinding tray 331. The processing ends then.

As described above, in a case where a sheet on which double-sided printing is unexecutable is used as a cover sheet of a book bound product, the sheet is discharged to a sheet processing apparatus having a switch-back mechanism so that its printed side may face down. Thus, a book bound product with a cover sheet having an image printed on its outer side may be acquired in the binding processing tray.

In a case where a sheet which cannot be inverted and be discharged is discharged to the binding processing tray as a cover sheet of a book bound product, it may be controlled so as to inhibit printing on the outer side of the cover sheet. This may prevent a problem that a consumable product such as a sheet and a toner is consumed wastefully due to improper printing of an image on an inner side of the cover sheet.

Second Embodiment

An example of a printing apparatus according to a second embodiment of the present invention will be described next. A sheet processing apparatus according to the second embodiment has the same configuration as that in FIGS. 2A to 2E, and a controller included in an image formation apparatus also has the same hardware configuration as that in FIG. 3. The operating unit 501 has the same configuration as the configuration illustrated in FIG. 4. The procedure to be performed by a user for designating paper to be used in a book bound product is the same as the procedure with the screen transition illustrated in FIGS. 5A to 5F. The procedure for instructing to attach a cover sheet to a book bound product having undergone a saddle stitch bookbinding process, a center-folding and binding process or binding layout process is the same as the procedure with the screen transition illustrated in FIGS. 6A to 6E.

Figure 26:
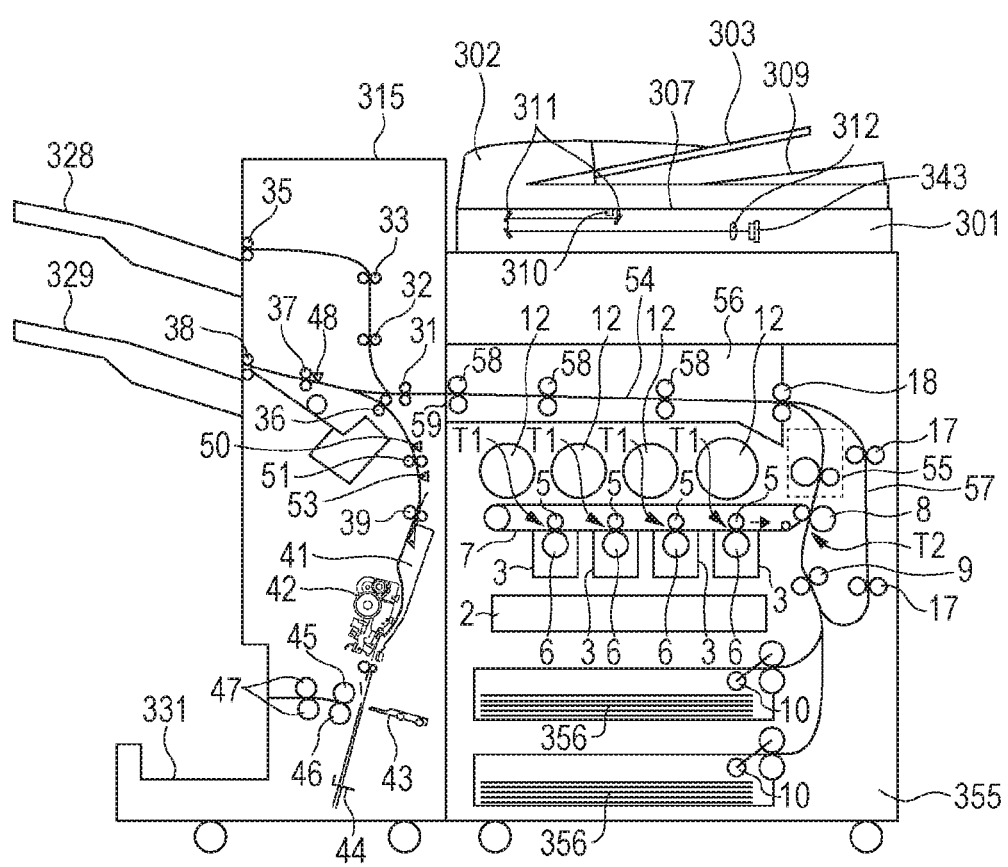
FIG. 26 is a section view illustrating a configuration of a print system including an image formation apparatus and a sheet processing apparatus according to a second embodiment of the present invention.

FIG. 26 illustrates a configuration of a print system including an image formation apparatus and a sheet processing apparatus, which is an example of a printing apparatus according to the second embodiment of the present invention.

Referring to FIG. 26, a substantially half of the image formation apparatus has a U shape in front view, and a relay unit 56 which is a sheet conveyer is provided within a space enclosed by the U-shape. The relay unit 56 internally includes a conveying path 54. The image formation apparatus is connected to the sheet processing apparatus 315 through the conveying path 54 within the relay unit 56 and is capable of conveying sheets to the sheet processing apparatus 315. Because the sheet processing apparatus 315 has the same configuration as in the first embodiment, common numbers refer to parts which are substantially common to those in the first embodiment in FIGS. 1 and 26 and, and detail description will be omitted.

The image formation apparatus is of what is called a tandem type in which four photoconductive drums 6 being image bearing members for bearing toner images of respective colors Yellow, Magenta, Cyan, and Black are aligned in a direction of travel of an intermediate transfer belt 7 being an intermediate transfer unit. This image formation apparatus as described above includes a scanner 301, an ADF 302, and a print engine 355. Because the scanner 301 has the same configuration as that in the first embodiment, common numbers refer to parts which are substantially common to those in the first embodiment in FIGS. 1 and 26 and, and detail description will be omitted.

Print operations to be performed by the printer 355 will be described.

The printer 355 includes process cartridges 3 for colors, an exposure unit 2 which irradiates laser beams to the photoconductive drums 6, the intermediate transfer belt 7, a primary transfer roller 5 as a primary transfer unit, a secondary transfer roller 8 as a secondary transfer unit, and a fixing unit 55. Each of the process cartridges 3 has the photoconductive drum 6 and a charger, a developing device and a cleaner, not illustrated, arranged around the photoconductive drum 6. The intermediate transfer belt 7 is stretched by a plurality of stretch rollers and placed adjacently to the process cartridges 3 and in contact with the photoconductive drums 6. The intermediate transfer belt 7 travels in the direction indicated by the arrow in FIG. 26 with the drive to rotate of one roller (driving roller) of the plurality of stretch rollers connected to a motor, not illustrated. The primary transfer roller 5 is placed at a position where it faces the photoconductive drums 6 across the intermediate transfer belt 7. In the direction of travel of the intermediate transfer belt 7, the secondary transfer roller 8 is provided in contact with the intermediate transfer belt 7 in a downstream of the process cartridges 3, and the secondary transfer roller 8 and the intermediate transfer belt 7 constitute a secondary transfer unit T2. The exposure unit 2 is provided on the opposite side of the intermediate transfer belt 7 across the process cartridges 3 and is configured to irradiate laser beams to the photoconductive drums 6 based on information read by the scanner 301 or externally received information. According to this embodiment, toner bottles 12 is provided for supplying toners of respective colors to developing devices in the respective process cartridges 3. The fixing unit 55 is provided in a downstream of the secondary transfer unit T2 and is configured to heat and press a printing material bearing a toner image to fix the toner image to the printing material. The printer 355 has a plurality of cassettes 356 each storing sheets and is configured to pick up a sheet from one of the cassettes 356, convey the sheet to the secondary transfer unit T2 and fixing unit 55 and output the sheet having undergone the fixing process to the relay unit 56. The printer 355 has a reverse conveying mechanism which inverts and conveys a sheet on which double-sided printing is to be performed.

The image formation apparatus configured as described above may perform an image formation process as follows.

First, surfaces of the photoconductive drums 6 for respective colors are electrostatically charged by a charger and are exposed by the exposure unit 2 to form latent images on the photoconductive drums 6. Each of the latent images is developed by the developing device so that a toner image is formed on the photoconductive drum 6. The toner images formed on the photoconductive drums 6 come to a primary transfer unit T1 in contact with the photoconductive drums 6 and the intermediate transfer belt 7. In the primary transfer unit T1, a primary transfer bias is applied to the primary transfer rollers 5 so that the toner images on the photoconductive drums 6 are sequentially transferred to the intermediate transfer belt 7. Thus, a full-color toner image is formed on the intermediate transfer belt 7. The toner image is conveyed to the secondary transfer unit T2 when the intermediate transfer belt 7 travels.

On the other hand, a sheet supplied from one of the cassettes 356 is conveyed to the secondary transfer unit T2. In other words, sheets are fed one by one by a pickup roller 10 from one of the cassettes 356 and are conveyed to the secondary transfer unit T2 by timing to the toner image on the intermediate transfer belt 7 with a registration roller 9. In the secondary transfer unit T2, a secondary transfer bias is applied to the secondary transfer roller 8 so that the toner image on the intermediate transfer belt 7 can be secondary transferred to a sheet. After that, the sheet to which the toner image has been transferred is conveyed to the fixing unit 55 and is heated and pressed so that the toners may melt and mix and the toner image is fixed to the sheet as a print image. The sheet on which the image is fixed is discharged to the relay unit 56 with its printed side facing down through a discharge roller 18 provided in a downstream of the fixing unit 55. The sheet discharged to the relay unit 56 is discharged by a rotating conveyance roller pair 58 to the sheet discharge port 59 to the sheet processing apparatus 315.

Next, in order to perform double-sided printing, a sheet having undergone the fixing process is discharged to the relay unit 56 with its printed side facing down and is switched back and is conveyed by an internal structure of the relay unit 56. Then, an reverse conveyance roller 17 conveys the sheet to a conveying path 57 for double-sided printing and is supplied to the secondary transfer unit T2 again. An image is transferred to the sheet in the secondary transfer unit T2, and the sheet to which the image has been transferred is discharged to the relay unit 56 by the discharge roller 18 through the fixing unit 55. After that, the sheet discharged to the relay unit 56 is discharged to the sheet discharge port 59 to the sheet processing apparatus 315 by the rotating conveyance roller pair 58.

Various settings may be defined as illustrated in FIGS. 5A to 6E. However, due to the structure of the sheet processing apparatus 315 illustrated in FIG. 26, a book bound product which satisfies the settings may not be output.

More specifically, the sheet processing apparatus 315 switches back both of the body and the cover sheet of a book bound product and stores the sheets with a stopper within the conveying path 41.

The sheet to be used as a cover sheet undergoes image printing after the printing on the body and then is added to the body. In a case where the sheet to be used as the cover sheet is a sheet allowing double-sided printing through the conveying path 57 for double-sided printing, the image formation apparatus is allowed to print an image on a desired surface as in the body.

On the other hand, in a case where a sheet to be used as the cover sheet does not allow double-sided printing through the conveying path 330 for double-sided printing, the surface on which an image has been formed lastly of the sheet comes to the outer side of the book bound product. In other words, such a sheet allows an image to be printed only on the outer side of the book bound product. It is desirable if a user intends to print an image on the outer side of the cover sheet of the book bound product. However, the book bound product acquired in that case is different from the book bound product intended by the user in a case where the user intends to print an image on the inner side of the cover sheet of the book bound product. Some types of paper cannot pass through the conveying path 57 for double-sided printing, and there is a limitation that an image is not allowed to be printed on both of the front side and back side of the sheet.

In consideration of such limitations and based on the set type of paper for a cover sheet and the set side of the sheet for printing an image, the image formation apparatus according to this embodiment performs the following control. More specifically, the image formation apparatus displays a warning in a case where an unexecutable setting is defined while the image formation apparatus generates a book bound product based on defined settings if the settings are executable.

A procedure for controlling such that printing is inhibited from starting with unexecutable settings based on a paper management table illustrated in FIG. 27 will be described with reference to screens illustrated in FIGS. 8A to 8F and FIGS. 10A to 10F, FIGS. 12A to 12C and FIGS. 14A to 14C. The paper management table in FIG. 27 is stored in HD 440.

The paper management table defines each paper type with respect to whether it allows double-sided printing performed by the printer 355 or not or whether it is usable as a cover sheet to be attached to a book bound product. The paper management table manages a plurality of paper types usable for printing including plain paper, cardboard 1, cardboard 2, cardboard 3, and cardboard 4. These paper types have different basis weights on which whether it is double-side printable or not and whether it is usable as a cover sheet are dependent. Therefore, the paper management table manages each of the paper types with respect to whether it is double-side printable or not and whether it is usable as a cover sheet. It should be noted that the paper types to be managed are not limited to those paper types above and that other paper types such as recycled paper and coated paper. A paper type may be registered by a user through the operating unit 501. In a case where a paper type is registered, the CPU 402 may prompt to further register the basis weight, whether it is double-side printable or not and whether it is usable as a cover sheet.

As illustrated in FIG. 27, sheets corresponding to plain paper, cardboard 1, and cardboard 2 are all double-side printable, are reversible to discharge, and are usable as a cover sheet to be attached to a book bound product. On the other hand, sheets corresponding to cardboard 3 and cardboard 4 do not allow printing images on their both sides. Therefore, control may be required so as to inhibit printing images on both size of a cover sheet to be attached to a book bound product. For sheets corresponding to cardboard 3 and cardboard 4, control may be required so as to inhibit printing an image on an outer side of a cover sheet to be attached to a book bound product to discharge it to the stacking tray 328. For sheets corresponding to cardboard 3 and cardboard 4, control may be required so as to inhibit printing an image on an inner side of a cover sheet to be attached to a book bound product to discharge it to the saddle-stitch bookbinding tray 331.

FIGS. 8A to 8F are schematic diagrams illustrating an example of a screen transition of a binding setting screen displayed on the display unit 505 in a case where a user defines settings for discharging a leftward book bound product to the saddle-stitch bookbinding tray 331.

A portal screen 1801 is a binding portal screen to be displayed on the display unit 505. On the portal screen 1801, a "FOLD+SADDLE STITCH" key 1902 is highlighted which indicates that a book bound product is to be discharged to the saddle-stitch bookbinding tray 331.

If the CPU 402 detects on the portal screen 1801 that a "COVER" key 1903 has been pressed, a setting screen 1802 is displayed on which a print position of a cover sheet is set.

If the CPU 402 detects on the setting screen 1802 that a "CHANGE" key 1904 has been pressed, a sheet selection screen 1803 is displayed. On the sheet selection screen 1803, a row 1905 corresponding to the cassette 356 storing sheets of a paper type having a size of A3 and a name "CARDBOARD 3 (221 to 256 g/m2)" so as to indicate the paper type is selected to be used as a cover sheet to be attached to the book bound product.

If the CPU 402 detects on the sheet selection screen 1803 that the "OK" key 1906 has been pressed, a setting screen 1804 is display where a print position on a cover sheet is set. In a case where all of the "PRINT" keys 1907 to 1910 are selected and are highlighted as illustrated on the setting screen 1804, double-sided printing on a cover sheet by using "cardboard 3 (221 to 256 g/m2)" is set here. However, double-sided printing may not be executed on "cardboard 3 (221 to 256 g/m2)" as illustrated in the paper management table illustrated in FIG. 27.

If the CPU 402 detects that the "OK" key 1911 has been pressed on the setting screen 1804, the binding portal screen 1805 is displayed where the "COVER" key 1912 is highlighted indicating that the setting for covering a book bound product has completed. The CPU 402 holds the settings received through the screens illustrated in FIGS. 8A to 8F in the DRAM 406.

If the start key 506 is pressed with the portal screen 1805 displayed, the CPU 402 provides a display warning 1806 that binding using cardboard 3 as a cover sheet is not allowed to be set based on the settings stored in the DRAM 406 and the paper management table illustrated in FIG. 27.

On the portal screen 1805, if the CPU 402 detects that "OK" key 1913 has been pressed, it may be controlled so as to provide the display warning 1806 based on the settings stored in the DRAM 406 and the paper management table illustrated in FIG. 27.

In a case where, as illustrated in FIGS. 12A to 12C, the setting for performing double-sided printing on a cover sheet is defined previously, the CPU 402 may shade a row 2701 corresponding to the cassette 356 storing paper of cardboard 3 on the sheet selection screen 2601 so as to inhibit a user from selecting it. Because double-sided printing is not allowed to perform on cardboard 4 either, the CPU 402 may shade a row corresponding to the cassette 356 storing paper of cardboard 4 on the screen illustrated in FIGS. 12A to 12C so as to inhibit a user from selecting it.

Figure 8D:
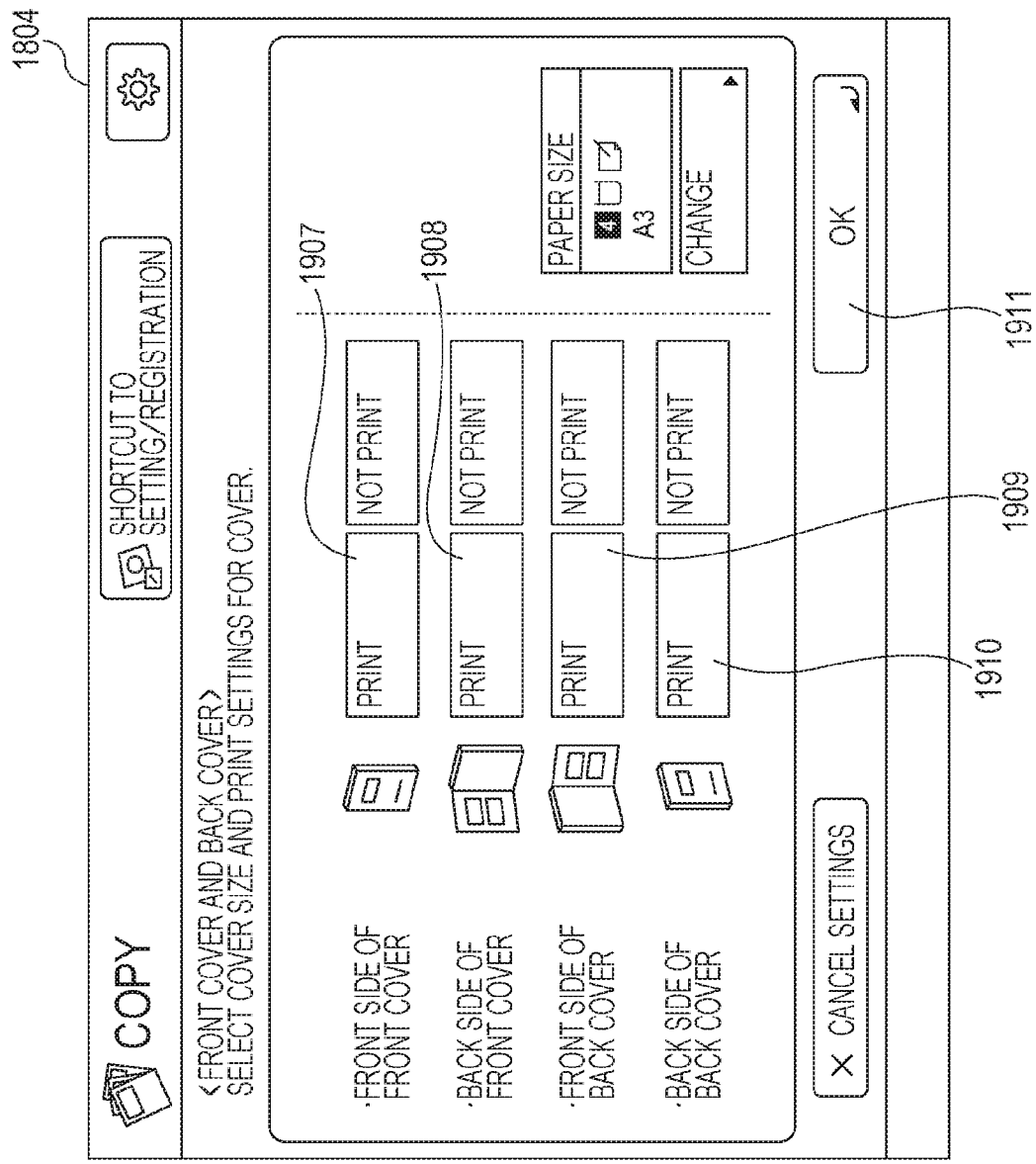
Figure 8E:
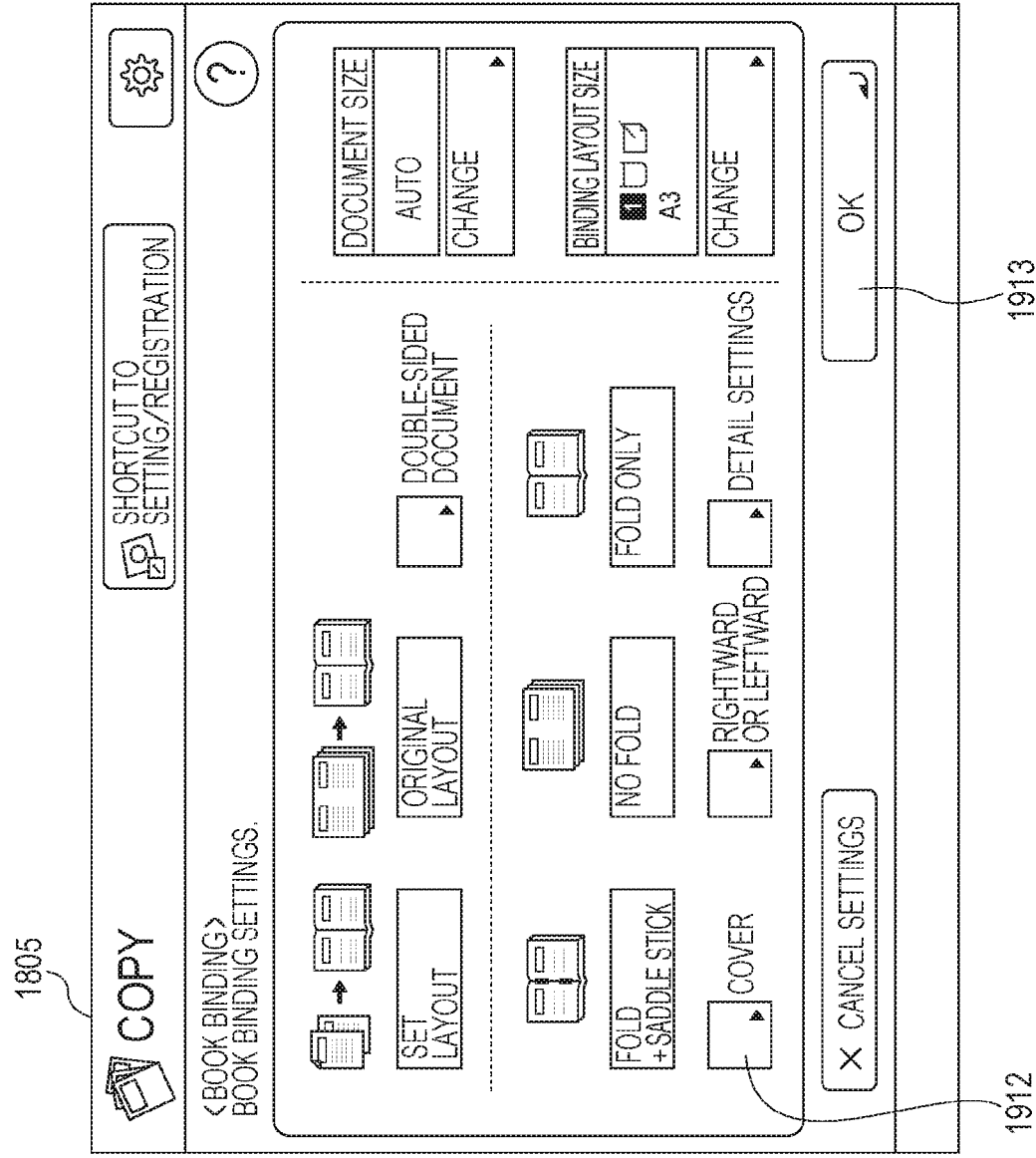
Figure 8F:
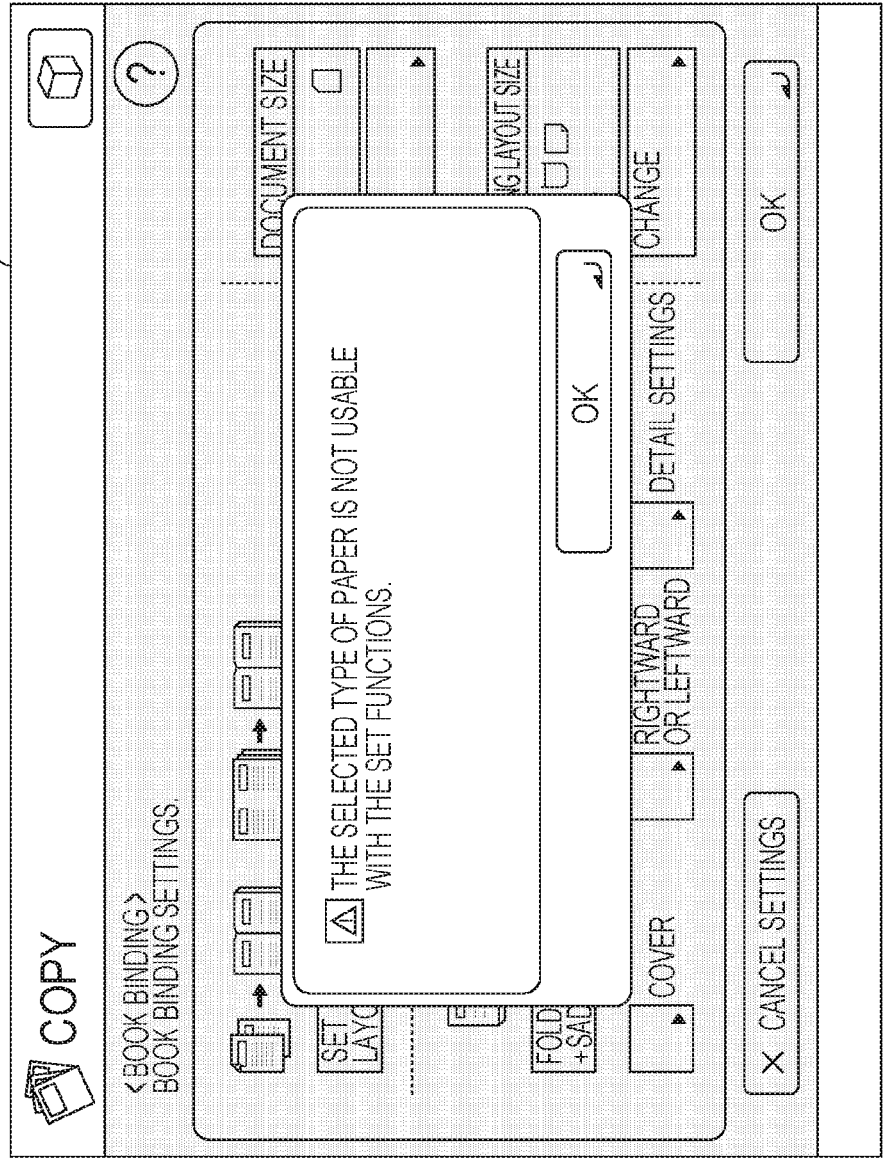
Figure 9D:
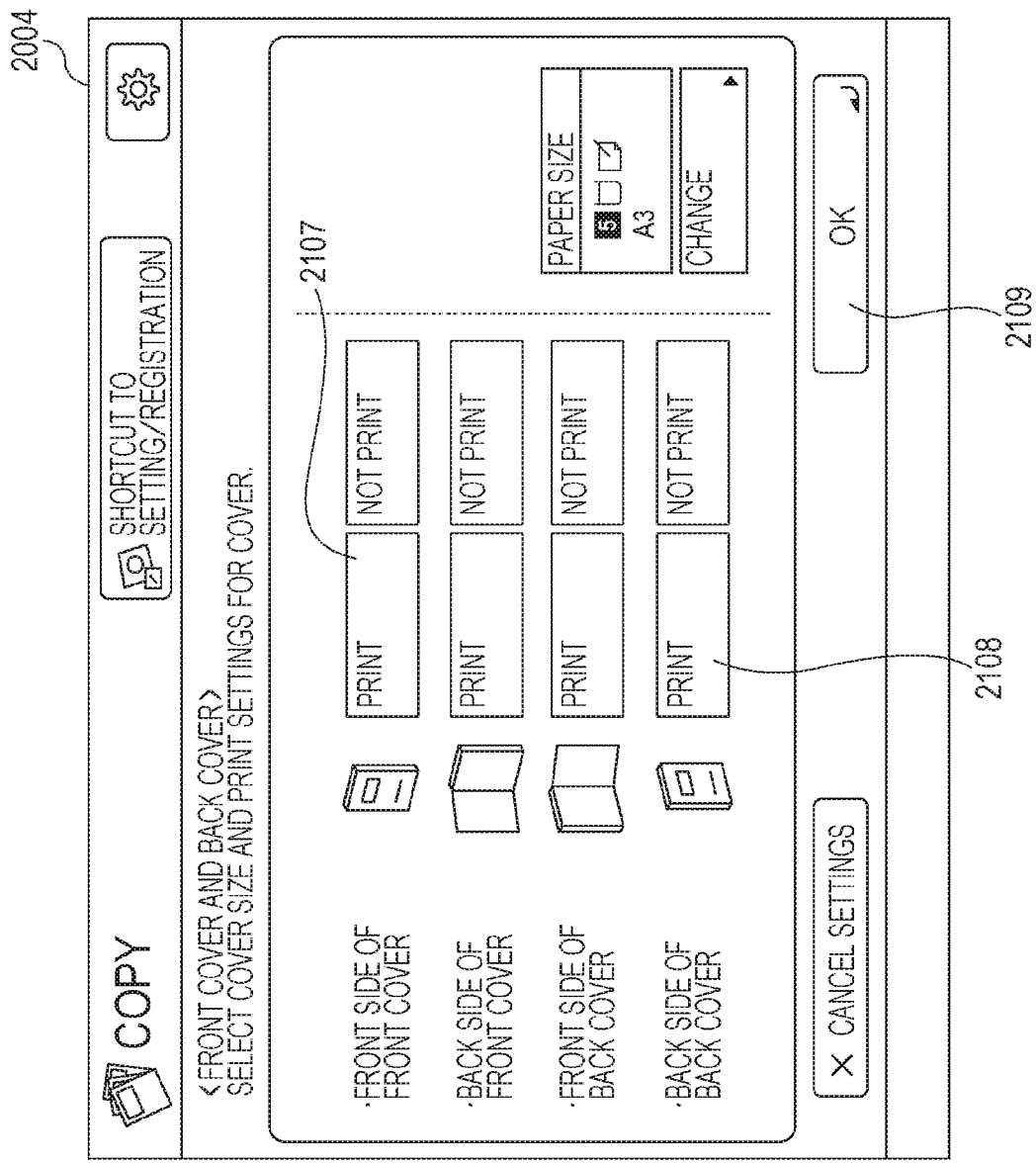
Figure 9E:
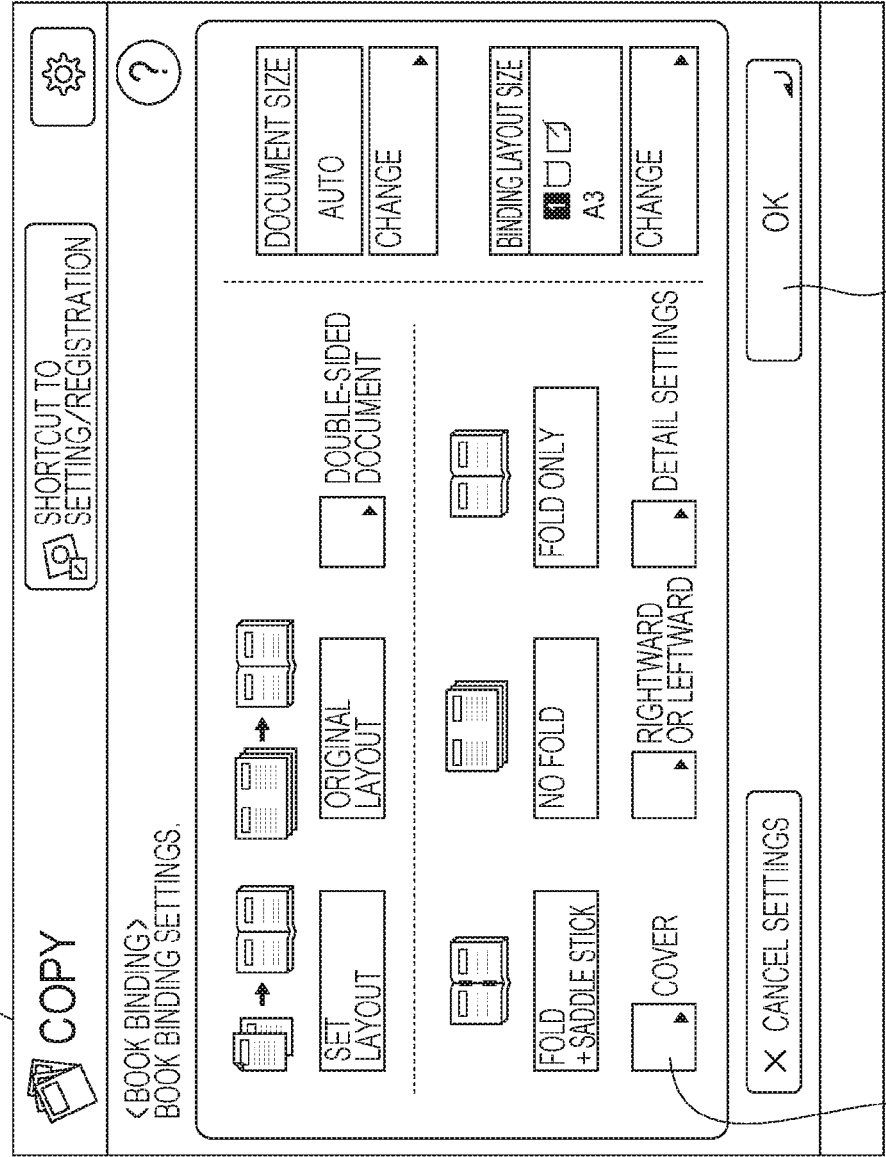
Figure 9F:
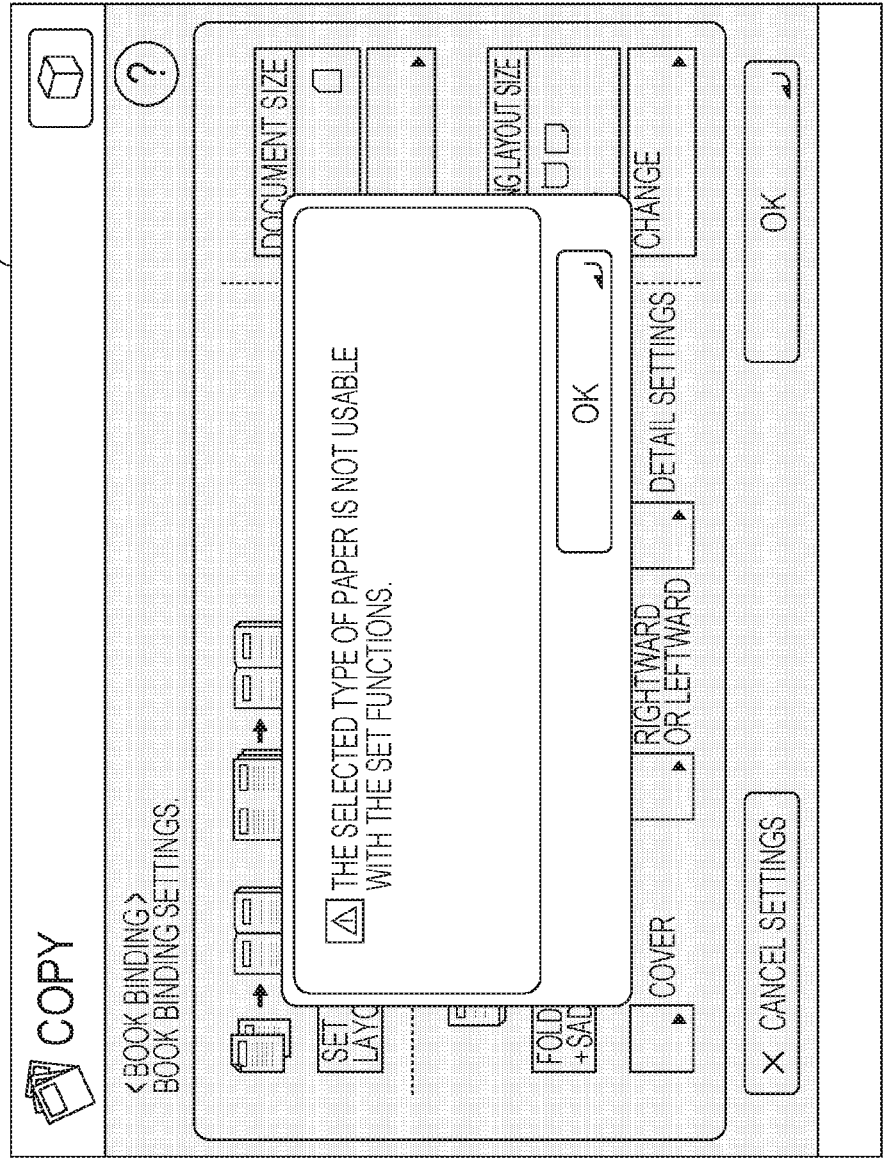

On the other hand, referring to FIG. 8D, "PRINT" keys 1908 and 1909 highlighted as on the setting screen 1894 indicate that printing is to be performed on the inner side of a cover sheet of "cardboard 3 (221 to 256 g/m2)". However, because double-sided printing and inversing cannot be executed on cardboard 3 as in the paper management table illustrated in FIG. 27, a cover sheet having an image printed on its inner side may not be added to the body.

If the CPU 402 detects on the setting screen 1804 that the "OK" key 1911 has been pressed, a binding portal screen 1805 is displayed, and a "COVER" key 1912 is highlighted. This indicates that the setting for attaching a cover sheet to a book bound product has completed. The CPU 402 holds the settings received through the screens illustrated in FIGS. 8A to 8F in the DRAM 406.

If the start key 506 is pressed with the portal screen 1805 displayed, the CPU 402 provides a display warning 1806 that binding using cardboard 3 as a cover sheet is not allowed to be set based on the settings stored in the DRAM 406 and the paper management table illustrated in FIG. 27.

On the portal screen 1805, if the CPU 402 detects that "OK" key 1913 has been pressed, it may be controlled so as to provide the display warning 1806 based on the settings stored in the DRAM 406 and the paper management table illustrated in FIG. 27.

In a case where, as illustrated in FIGS. 12A to 12C, the setting for performing printing on the inner side of a cover sheet is defined previously, the CPU 402 may shade a row 2701 corresponding to the cassette 356 storing paper of cardboard 3 on the sheet selection screen 2601 so as to inhibit a user from selecting it. Because double-sided printing is also not performed on cardboard 4, the CPU 402 may shade, on the screens illustrated in FIGS. 12A to 12C, the row corresponding to the cassette 356 storing paper of cardboard 4 to inhibit selection by a user.

While FIGS. 8A to 8F illustrate control examples in a case where a user defines settings for discharging a leftward book bound product to the saddle-stitch bookbinding tray 331, FIGS. 10A to 10F illustrate control examples in a case where a user defines setting for discharging a leftward book bound product to the stacking tray 328.

FIGS. 10A to 10F are schematic diagrams illustrating an example of a screen transition of a binding setting screen displayed on the display unit 505 in a case where a user defines settings for discharging a leftward book bound product to the stacking tray 328.

A portal screen 1401 is a screen to be displayed on the display unit 505 for setting binding. On the portal screen 1401, a "NO FOLD" key 1502 is highlighted which indicates that a book bound product is to be discharged to the stacking tray 328.

If the CPU 402 detects on the portal screen 1401 that a "COVER" key 1503 has been pressed, a setting screen 1402 is displayed on which a print position of a cover sheet is set.

If the CPU 402 detects on the setting screen 1402 that a "CHANGE" key 1504 has been pressed, a sheet selection screen 1403 is displayed. On the sheet selection screen 1403, a row 1505 corresponding to the cassette 356 storing sheets of a paper type having a size of A3 and a name "CARD-BOARD 3 (221 to 256 g/m2)" so as to indicate the paper type is selected to be used as a cover sheet to be attached to the book bound product.

If the CPU 402 detects on the sheet selection screen 1403 that the "OK" key 1906 has been pressed, a setting screen 1404 is display where a print position on a cover sheet is set. In a case where all of the "PRINT" keys 1507 to 1510 are selected and are highlighted as illustrated on the setting screen 1404, double-sided printing on a cover sheet by using "cardboard 3 (221 to 256 g/m2)" is set here. However, double-sided printing may not be executed on "cardboard 3 (221 to 256 g/m2)" as illustrated in the paper management table illustrated in FIG. 27.

If the CPU 402 detects that the "OK" key 1511 has been pressed on the setting screen 1404, the binding portal screen 1405 is displayed where the "COVER" key 1512 is highlighted indicating that the setting for covering a book bound product has completed. The CPU 402 holds the settings received through the screens illustrated in FIGS. 10A to 10F in the DRAM 406.

If the start key 506 is pressed with the portal screen 1405 displayed, the CPU 402 provides a display warning 1406 that binding using cardboard 3 as a cover sheet is not allowed to be set based on the settings stored in the DRAM 406 and the paper management table illustrated in FIG. 27.

On the portal screen 1405, if the CPU 402 detects that "OK" key 1513 has been pressed, it may be controlled so as to provide the display warning 1406 based on the settings stored in the DRAM 406 and the paper management table illustrated in FIG. 27.

In a case where, as illustrated in FIGS. 14A to 14C, the setting for performing double-sided printing on a cover sheet is defined previously, a row 2301 corresponding to the cassette 356 storing paper of cardboard 3 may be shaded on the sheet selection screen 2201 so as to inhibit a user from selecting it. Because double-sided printing is not allowed to perform on cardboard 4 either, the CPU 402 may shade a row corresponding to the cassette 356 storing paper of cardboard 4 on the screen illustrated in FIGS. 14A to 14C so as to inhibit a user from selecting it.

Figure 10A:
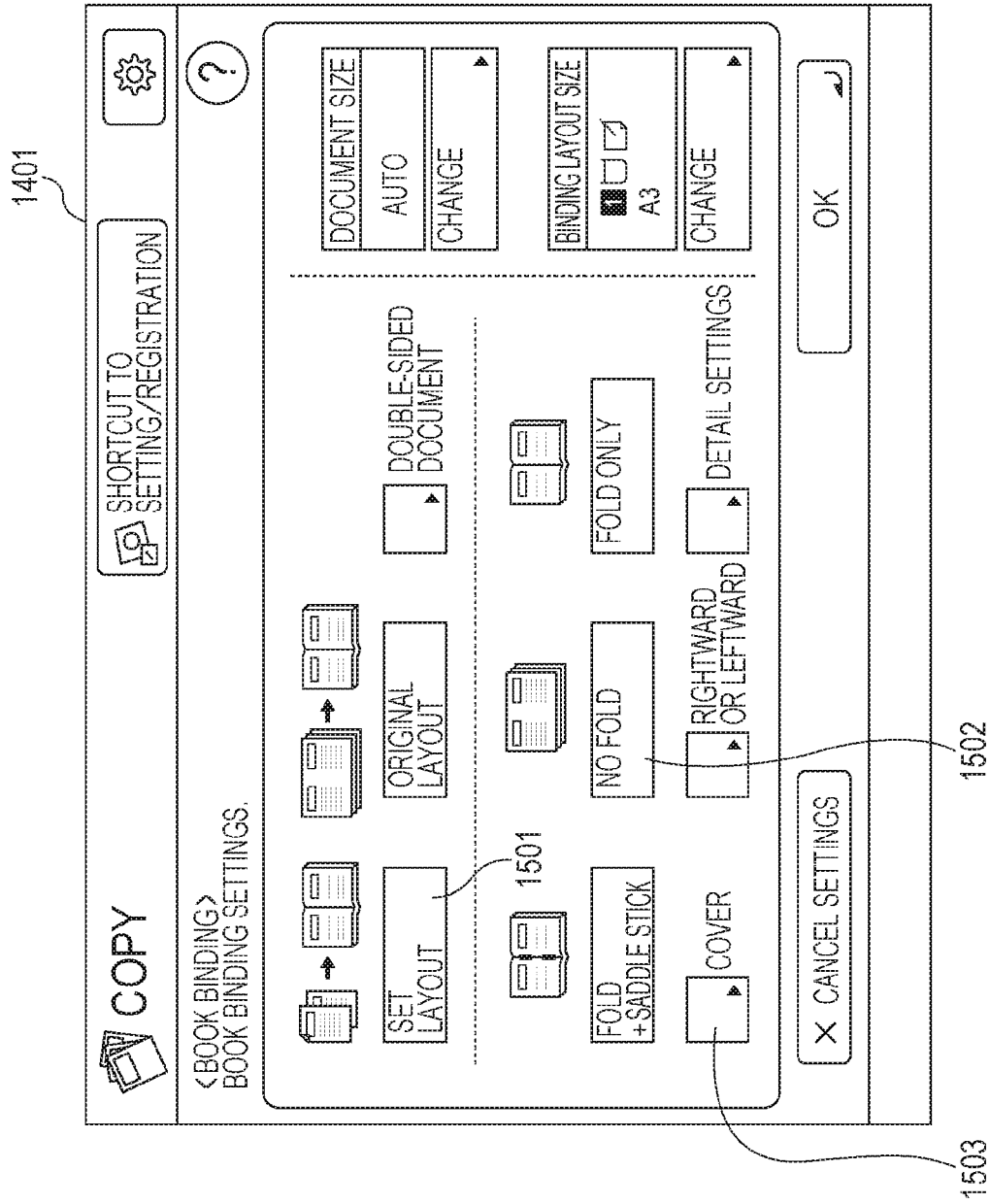
Figure 10B:
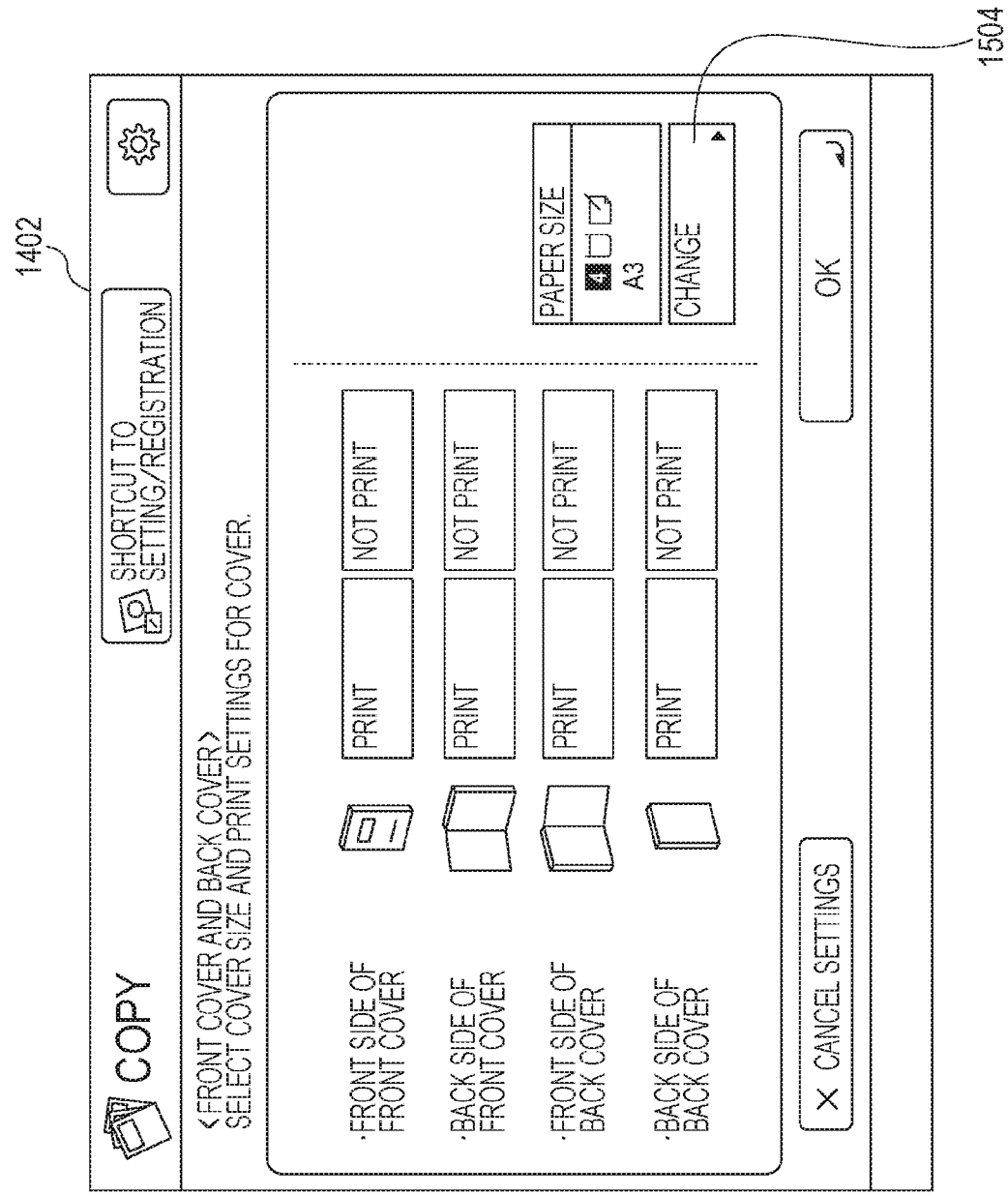
Figure 10F:
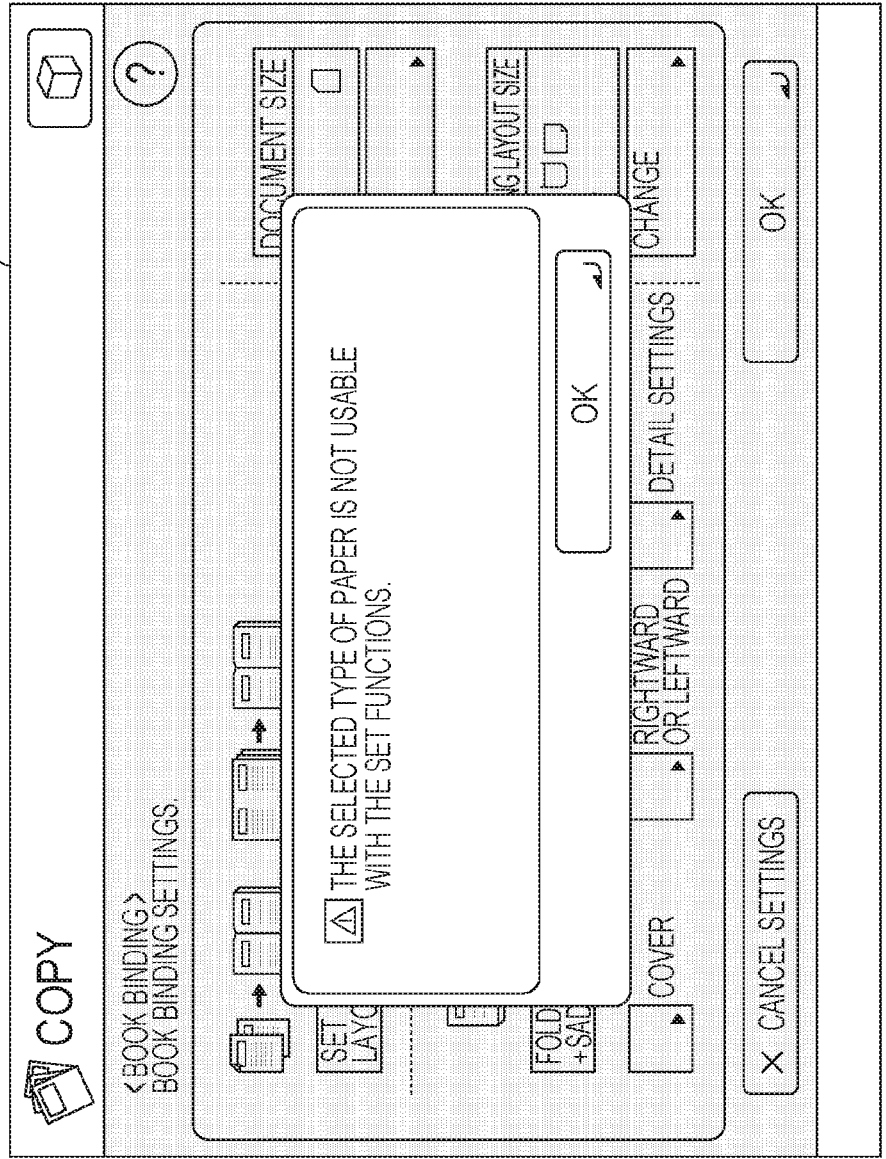
Figure 11B:
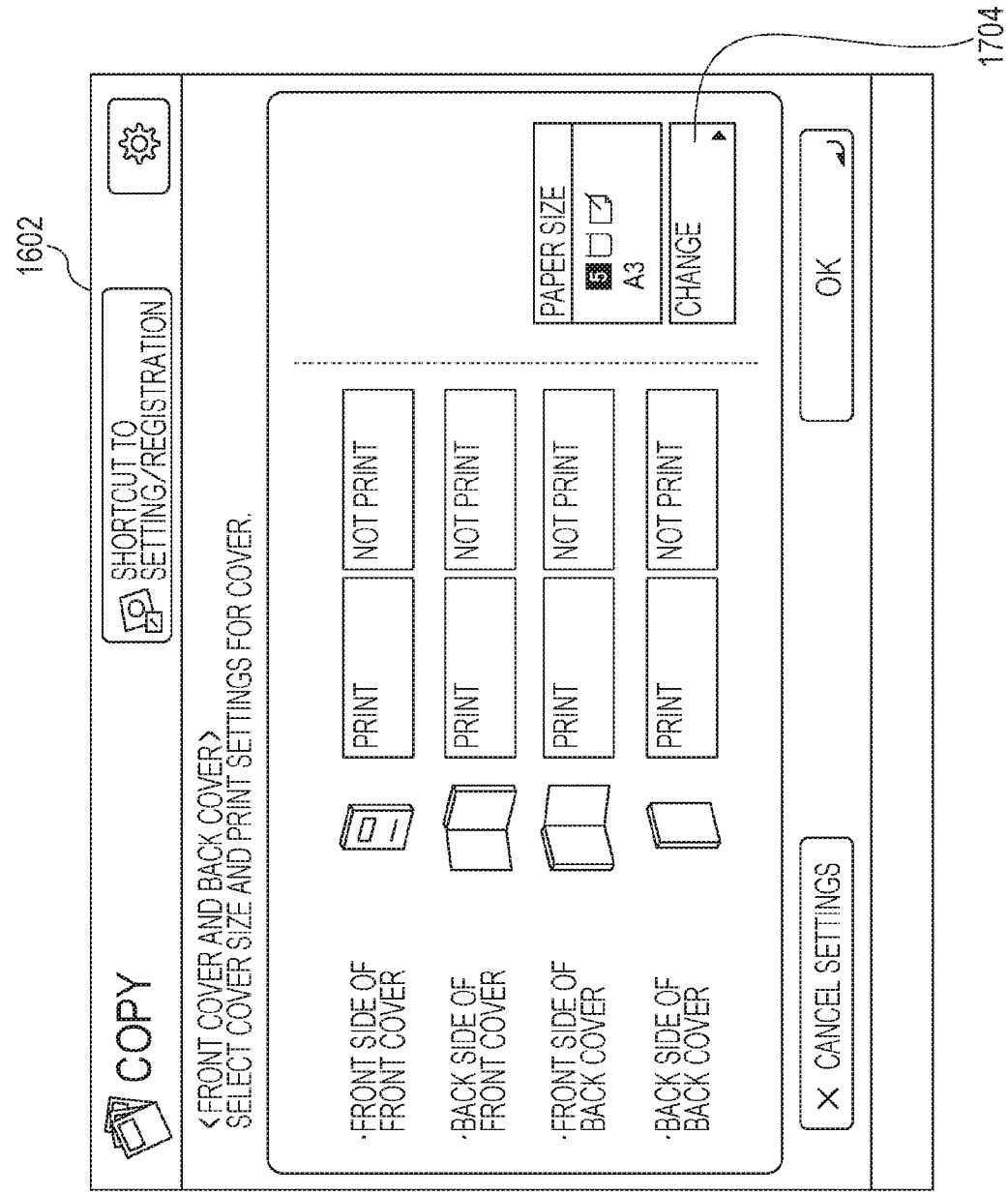
Figure 11C:
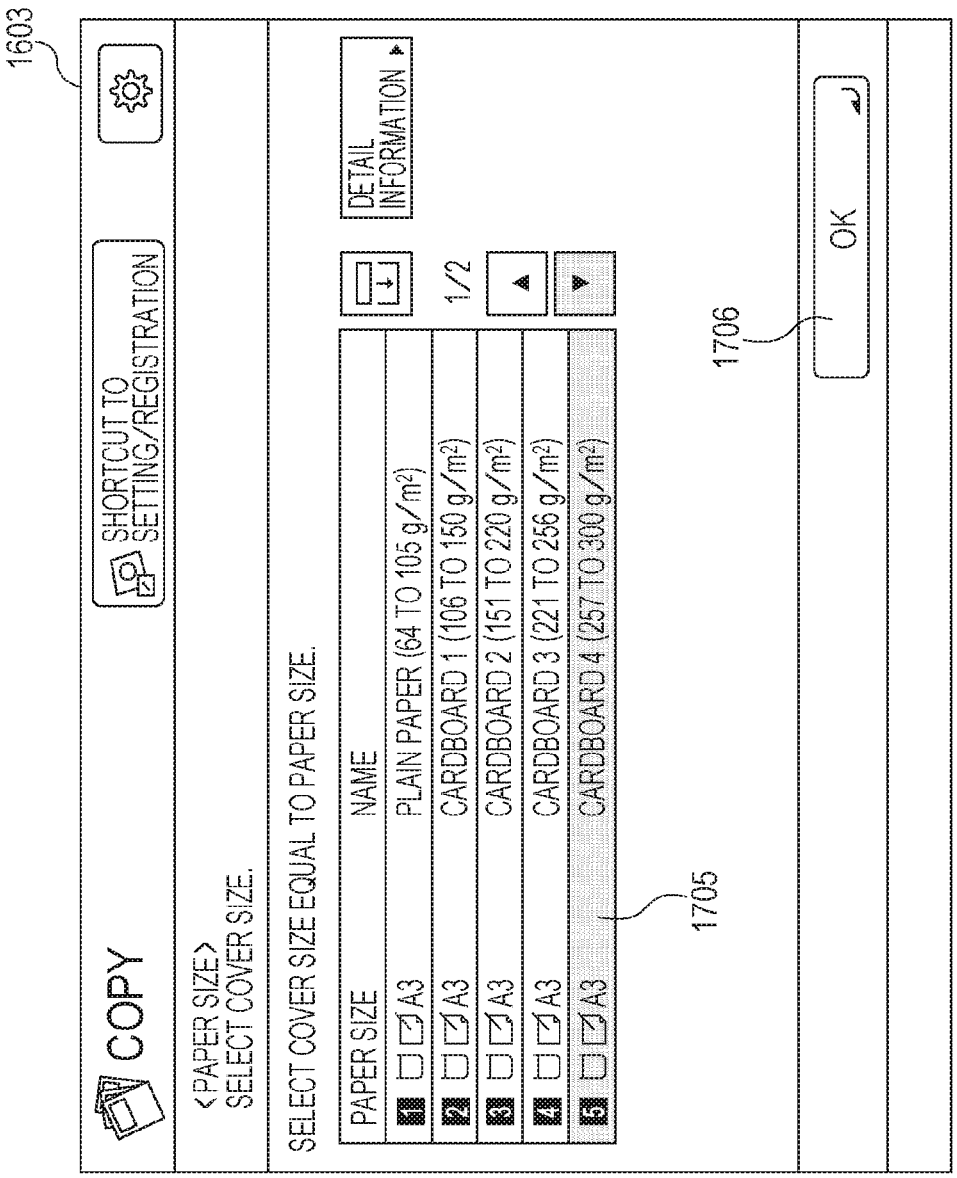
Figure 11D:
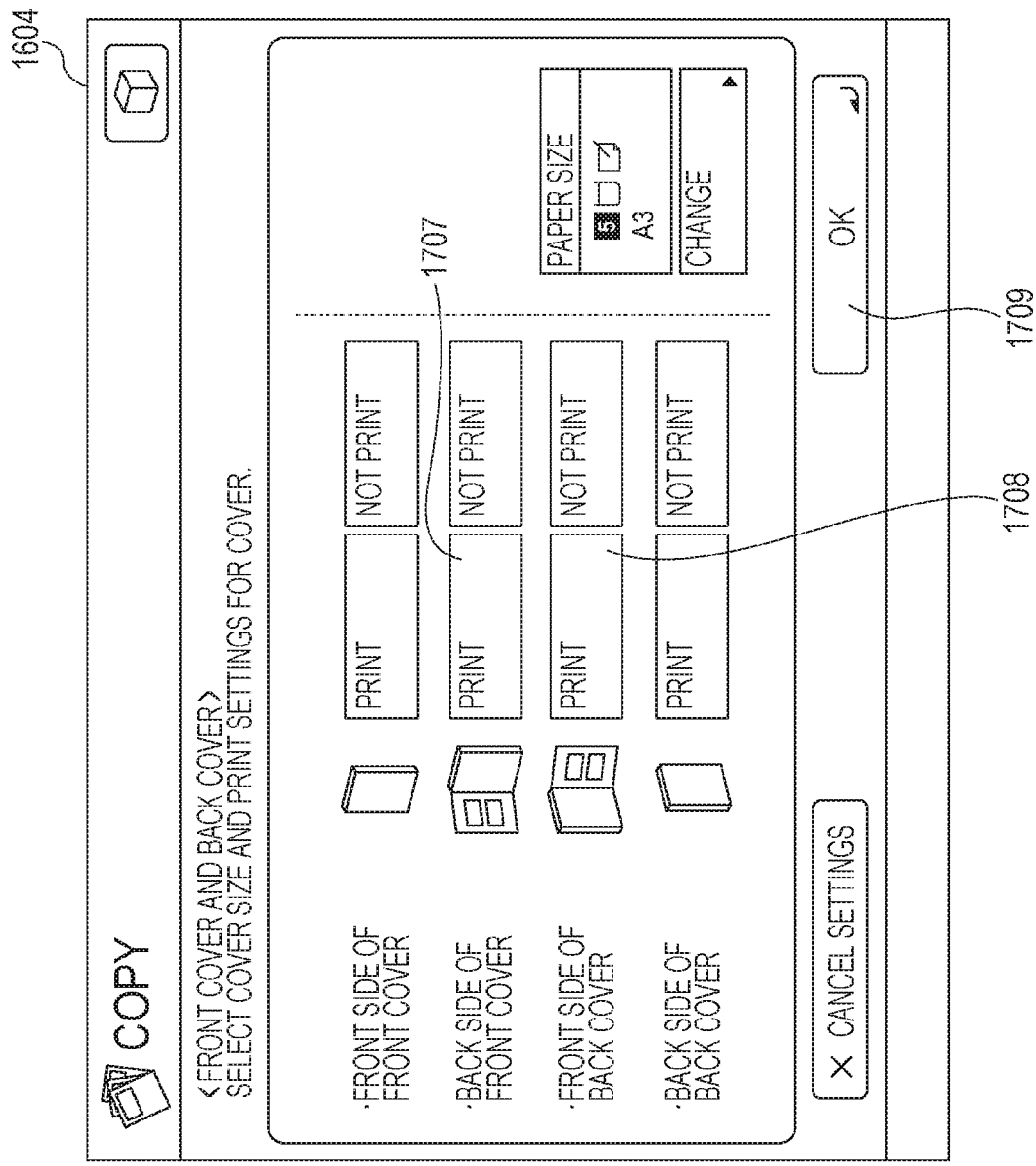
Figure 11E:
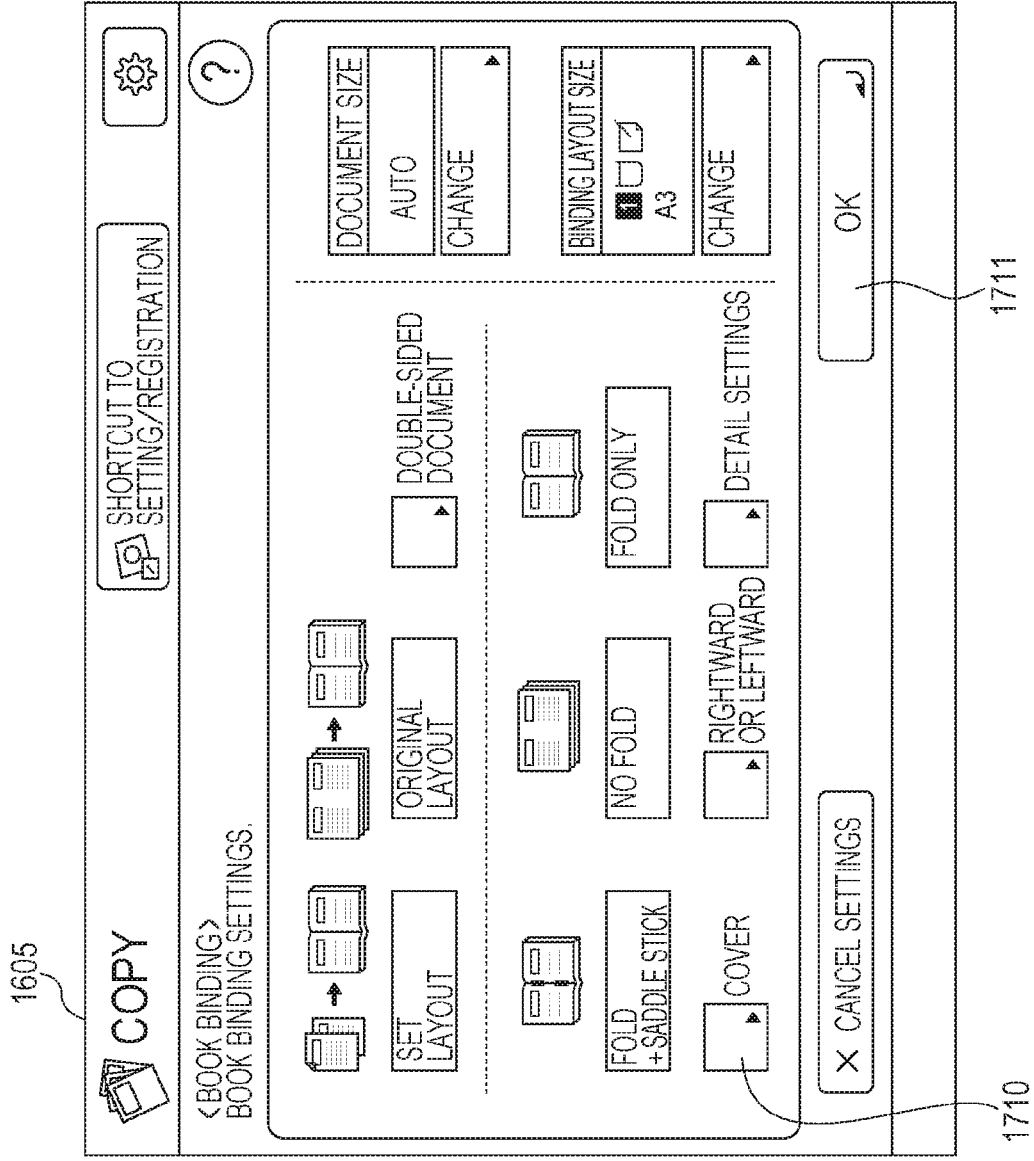
Figure 11F:
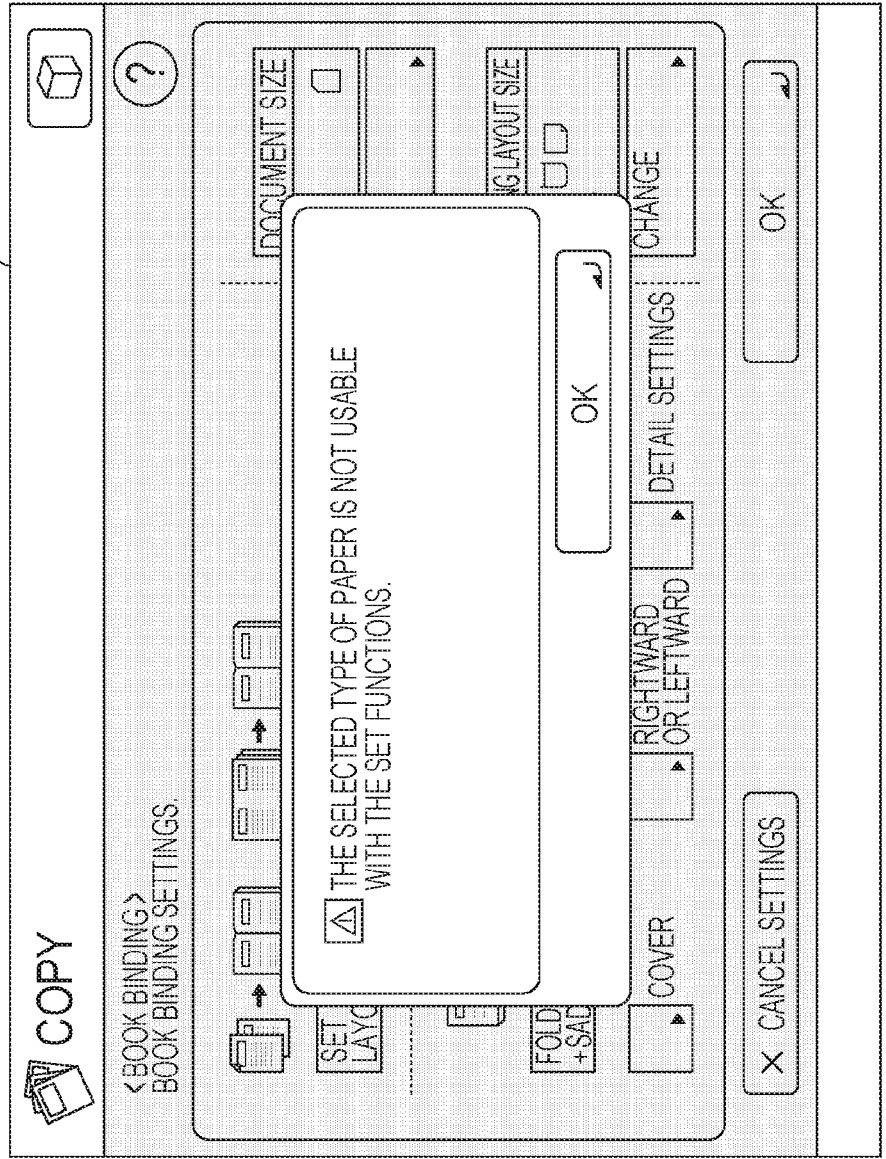

On the other hand, referring to FIGS. 10A to 10C, "PRINT" keys 1507 and 1510 highlighted as on the setting screen 1604 indicate that printing is to be performed on the outer side of a cover sheet of "cardboard 3 (221 to 256 g/m2)". However, because double-sided printing cannot be executed on cardboard 3 as in the paper management table illustrated in FIG. 27, a cover sheet having an image printed on its outer side may not be added to the body.

If the CPU 402 detects on the setting screen 1404 that the "OK" key 1511 has been pressed, a binding portal screen 1405 is displayed, and a "COVER" key 1512 is highlighted, which indicates that the setting for attaching a cover sheet to a book bound product has completed. The CPU 402 holds the settings received through the screens illustrated in FIGS. 10A to 10F in the DRAM 406.

If the start key 506 is pressed with the portal screen 1405 displayed, the CPU 402 provides a display warning 1406 that binding using cardboard 3 as a cover sheet is not allowed to be set based on the settings stored in the DRAM 406 and the paper management table illustrated in FIG. 27.

On the portal screen 1405, if the CPU 402 detects that "OK" key 1513 has been pressed, it may be controlled so as to provide the display warning 1406 based on the settings stored in the DRAM 406 and the paper management table illustrated in FIG. 27.

In a case where, as illustrated in FIGS. 14A to 14C, the setting for performing printing on the outer side of a cover sheet is defined previously, the CPU 402 may control so as to shade a row 2301 corresponding to the cassette 356 storing paper of cardboard 3 on the sheet selection screen 2201 to inhibit a user from selecting it. Because double-sided printing is unexecutable on cardboard 4, the CPU 402 may shade, on the screens illustrated in FIGS. 14A to 14C, the row corresponding to the cassette 356 storing paper of cardboard 4 to inhibit selection by a user.

Next, image layouts and printing results in a case where a binding layout process is executed and the printing result is discharged to the stacking tray 328 and in a case where a saddle stitch bookbinding process is executed and the printing result is discharged to the saddle-stitch bookbinding tray 331 will be described more specifically with reference to FIGS. 28A to 31B.

FIG. 28A is a diagram for explaining how pages of original images are to be laid out in a case where a binding layout process which attaches a cover sheet not requiring printing to a leftward book bound product is executed and the resulting book bound product is discharged to the stacking tray 328. For the discharge to the stacking tray 328, the images 3331 of pages of a document may be laid out to images 3312, for example, and be held in the DRAM 406. When the layout processing completes, printing is performed in order from the image of the sheet corresponding to the innermost page of the book bound product to the image of the sheet corresponding to the outermost page of the book bound product. In order to acquire the layout of the images 3312, the CPU 402 prints in order of the back side of the first sheet (body), the front side of the first sheet (body), the back side of the second sheet (body), the front side of the second sheet (body), the back side of the third sheet (body), the front side of the third sheet (body). The CPU 402 feeds the fourth sheet (cover sheet) at last. The conveyance rollers 31 to 35 are caused to discharge the printed sheets to the stacking tray 328. FIG. 28A illustrates the discharged printing result.

Figure 28B:
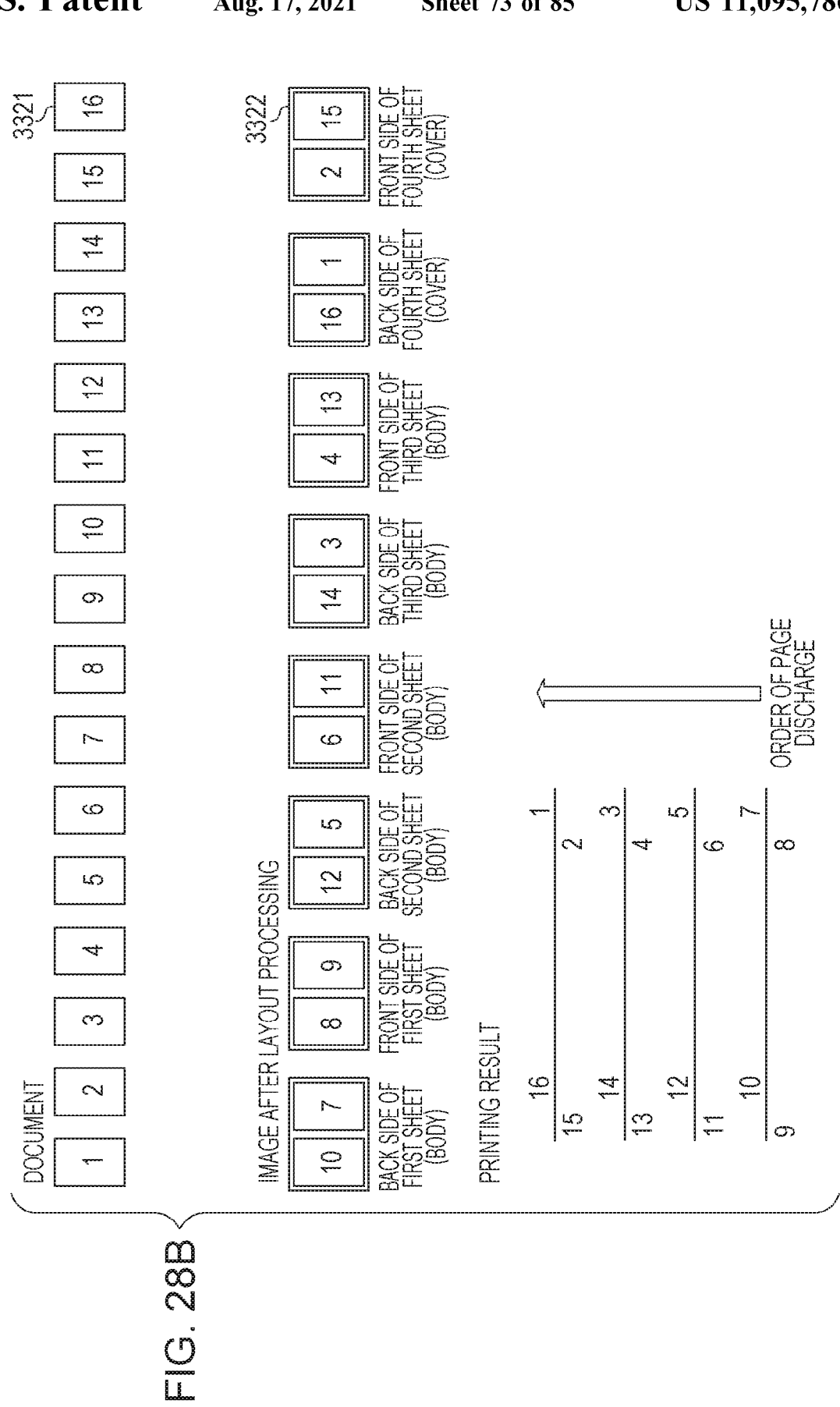

FIG. 28B is a diagram for explaining how pages of original images are to be laid out in a case where a binding layout process which attaches a cover sheet having undergone double-sided printing to a leftward book bound product is executed and the resulting book bound product is discharged to the stacking tray 328. For the discharge to the stacking tray 328, images 3321 of pages of a document may be laid out to images 3322, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3322, the CPU 402 controls the printing in the following order. That is, the CPU 402 controls so as to print in order of the back side of the first sheet (body), the front side of the first sheet (body), the back side of the second sheet (body), the front side of the second sheet (body), the back side of the third sheet (body), the front side of the third sheet (body), the back side of the fourth sheet (cover sheet), the front side of the fourth sheet (cover sheet). The conveyance rollers 31 to 35 are caused to discharge the printed sheets to the stacking tray 328. FIG. 28B illustrates the discharged printing result.

FIG. 29A is a diagram for explaining how pages of original images are to be laid out in a case where a binding layout process which attaches a cover sheet having an inner side printed to a leftward book bound product is executed and the resulting book bound product is discharged to the stacking tray 328. For the discharge to the stacking tray 328, the images 3331 of pages of a document may be laid out to images 3332, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3322, the CPU 402 controls so as to print in the following order. That is, the CPU 402 controls so as to print in order of the back side of the first sheet (body), the front side of the first sheet (body), the back side of the second sheet (body), the front side of the second sheet (body), the back side of the third sheet (body), the front side of the third sheet (body), the back side of the fourth sheet (cover sheet), the front side of the fourth sheet (cover sheet). The CPU 402 prints the fourth sheet (cover sheet) at last. Here, in a case where a sheet on which double-sided printing is not executable such as cardboard 3 and cardboard 4 in the paper management table in FIG. 27 is used as the cover sheet of the book bound product, the sheet is switched back through a conveying path 54 within the relay unit 56 illustrated in FIG. 26. Thus, the sheet is reversed and discharged to the sheet discharge port 59 with its printed side facing down. The conveyance rollers 31 to 35 are caused to discharge the printed sheets to the stacking tray 328. FIG. 29A illustrates the discharged printing result. In other words, discharging a sheet on which double-sided printing is not executable like cardboard 3 and cardboard 4 in the paper management table in FIG. 27 to the stacking tray 328 allows printing to be performed only on the back side of the cover sheet and the front side of the back cover.

FIG. 29B is a diagram for explaining how pages of original images are to be laid out in a case where a binding layout process which attaches a cover sheet having an outer side printed to a leftward book bound product is executed and the resulting book bound product is discharged to the stacking tray 328. For the discharge to the stacking tray 328, the images 3341 of pages of a document may be laid out to images 3342, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3342, the CPU 402 controls so as to print in the following order. That is, the CPU 402 prints in order of the back side of the first sheet (body), the front side of the first sheet (body), the back side of the second sheet (body), the front side of the second sheet (body), the back side of the third sheet (body), the front side of the third sheet (body), the back side of the fourth sheet (cover sheet), the front side of the fourth sheet (cover sheet). The conveyance rollers 31 to 35 are caused to discharge the printed sheets to the stacking tray 328. FIG. 29B illustrates the discharged printing result.

FIG. 30A is a diagram for explaining how pages of original images are to be laid out in a case where a saddle stitch bookbinding process which attaches a cover sheet not requiring printing to a leftward book bound product is executed and the resulting book bound product is discharged to the saddle-stitch bookbinding tray 331. For the discharge to the saddle-stitch bookbinding tray 331, the images 3351 of pages of a document may be laid out to images 3352, for example, and be held in the DRAM 406. When the layout processing completes, printing is performed in order from the image of the sheet corresponding to the innermost page of the book bound product to the image of the sheet corresponding to the outermost page of the book bound product. In order to acquire the layout of the images 3352, the CPU 402 controls so as to print in the following order. That is, the printing is executed in order of the back side of the first sheet (body), the front side of the first sheet (body), the back side of the second sheet (body), the front side of the second sheet (body), the back side of the third sheet (body), the front side of the third sheet (body). The CPU 402 feeds the fourth sheet (cover sheet) at last. After the printed sheets are conveyed by the conveyance rollers 31, 37, and 38 until the rear end of the sheets reach a rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 30A illustrates the discharged printing result.

FIG. 30B is a diagram for explaining how pages of original images are to be laid out in a case where a saddle stitch bookbinding process which attaches a cover sheet having undergone double-sided printing to a leftward book bound product is executed and the resulting book bound product is discharged to the saddle-stitch bookbinding tray 331. For the discharge to the saddle-stitch bookbinding tray 331, images 3361 of pages of a document may be laid out to images 3362, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3362, the CPU 402 controls the printing in the following order. That is, the CPU 402 controls so as to print in order of the back side of the first sheet (body), the front side of the first sheet (body), the back side of the second sheet (body), the front side of the second sheet (body), the back side of the third sheet (body), the front side of the third sheet (body), the back side of the fourth sheet (cover sheet), the front side of the fourth sheet (cover sheet). After the printed sheets are conveyed by the conveyance rollers 31, 37 and 38 until the rear end of the sheets reach the rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 30B illustrates the discharged printing result.

FIG. 31A is a diagram for explaining how pages of original images are to be laid out in a case where a saddle stitch bookbinding process which attaches a cover sheet having an inner side printed to a leftward book bound product is executed and the resulting book bound product is discharged to the saddle-stitch bookbinding tray 331. For the discharge to the saddle-stitch bookbinding tray 331, the images 3371 of pages of a document may be laid out to images 3372, for example, and be held in the DRAM 406. When the layout processing completes, printing is performed in order from the image of the sheet corresponding to the innermost page of the book bound product to the image of the sheet corresponding to the cover sheet of the book bound product. With the layout of the images 3372, the CPU 402 prints in order of the back side of the first sheet (body), the front side of the first sheet (body), the back side of the second sheet (body), the front side of the second sheet (body), the back side of the third sheet (body), the front side of the third sheet (body), the back side of the fourth sheet (cover sheet), the front side of the fourth sheet (cover sheet). After the printed sheets are conveyed by the conveyance rollers 31, 37, and 38 until the rear end of the sheets reach the rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 31A illustrates the discharged printing result.

Figure 31B:
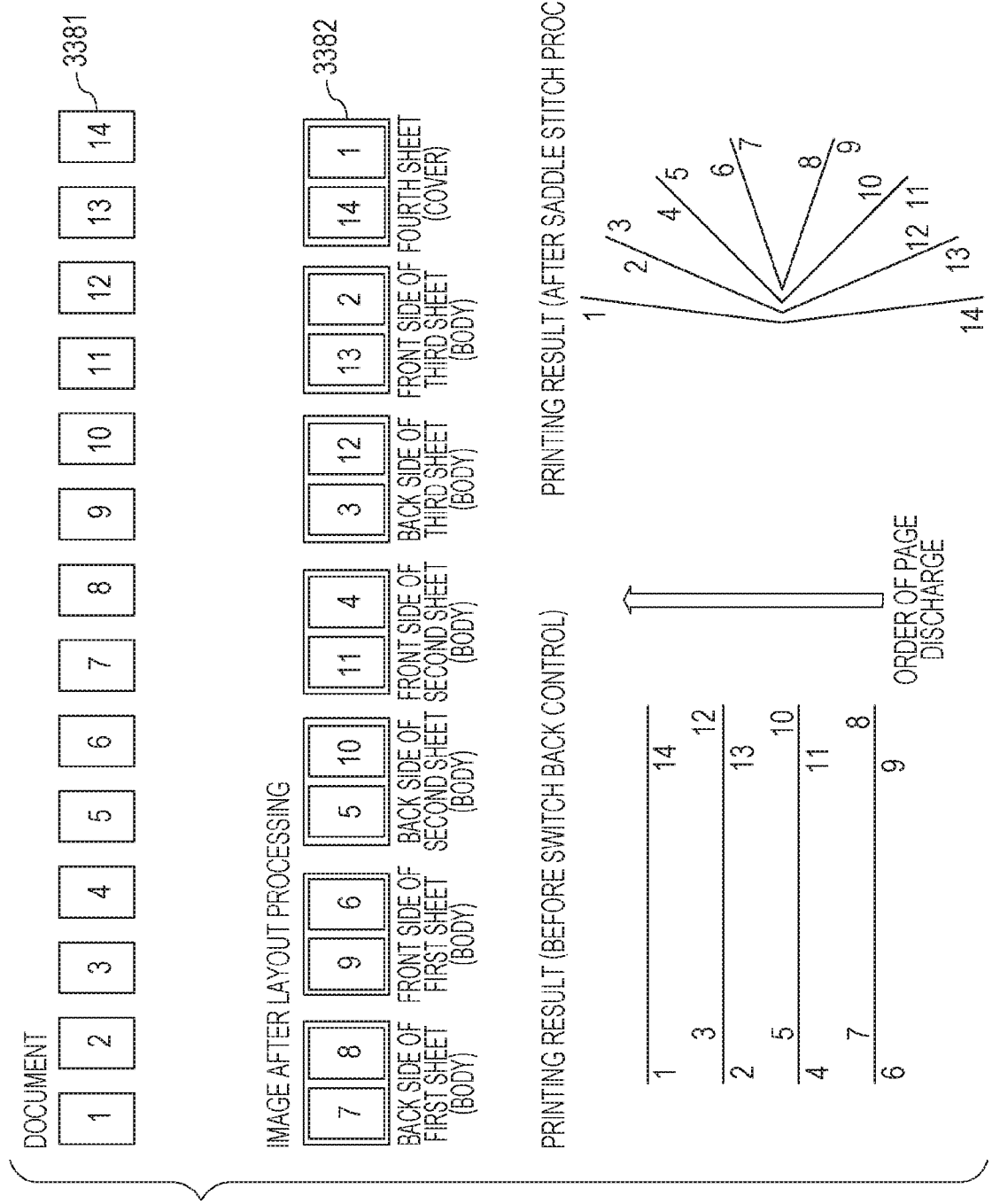

FIG. 31B is a diagram for explaining how pages of original images are to be laid out in a case where a saddle stitch bookbinding process which attaches a cover sheet having an outer side printed to a leftward book bound product is executed and the resulting book bound product is discharged to the saddle-stitch bookbinding tray 331. For the discharge to the saddle-stitch bookbinding tray 331, the image 3381 of pages of a document may be laid out to images 3382, for example, and be held in the DRAM 406. When the layout processing completes, printing is performed in order from the image of the sheet corresponding to the innermost page of the book bound product to the image of the sheet corresponding to the cover sheet of the book bound product. In order to acquire the layout of the images 3382, the CPU 402 prints in order of the back side of the first sheet (body), the front side of the first sheet (body), the back side of the second sheet (body), the front side of the second sheet (body), the back side of the third sheet (body), the front side of the third sheet (body). The CPU 402 then controls so as to print the fourth sheet (cover sheet) at last. Here, in a case where a sheet on which double-sided printing is not executable such as cardboard 3 and cardboard 4 in the paper management table in FIG. 27 is used as the cover sheet of the book bound product, the sheet is switched back through a conveying path 54 within the relay unit 56 illustrated in FIG. 26. Thus, the sheet is reversed and discharged to the sheet discharge port 59 with its printed side facing down. After the printed sheets are conveyed by the conveyance rollers 31, 37, and 38 until the rear end of the sheets reach a rear end sensor 48, the sheets are switched back by the reverse rotations of the conveyance rollers 37 and 38 and are sequentially stored within the conveying path 41. A binding process and then a folding process are executed on the sheets, and the resulting sheets are discharged to the saddle-stitch bookbinding tray 331. FIG. 31B illustrates the discharged printing result. In other words, discharging a sheet on which double-sided printing is not executable like cardboard 3 and cardboard 4 in the paper management table in FIG. 27 to the saddle-stitch bookbinding tray 331 allows printing to be performed only on the front side of the cover sheet and the back side of the back cover.

In a case where a cover sheet having an inner side printed is attached to a leftward book bound product, the processing for acquiring the book bound product discharged to the stacking tray 328 and the processing for acquiring the book bound product discharged to the saddle-stitch bookbinding tray 331 only differ in the presence/absence of the binding process and the folding process, as illustrated in FIG. 29A and FIG. 31A. In a case where a cover sheet having an outer side printed is attached to a leftward book bound product, the processing for acquiring the book bound product discharged to the stacking tray 328 and the processing for acquiring the book bound product discharged to the saddle-stitch bookbinding tray 331 only differ in the presence/absence of the binding process and the folding process, as illustrated in FIG. 29B and FIG. 31B.

Next, a control procedure to be performed by the CPU 402 according to the second embodiment will be described with reference to FIGS. 32A to 34B. The CPU 402 reads out and executes a program stored in the ROM 404 to execute steps in the flowcharts in FIGS. 32A to 34B.

Figure 32A:
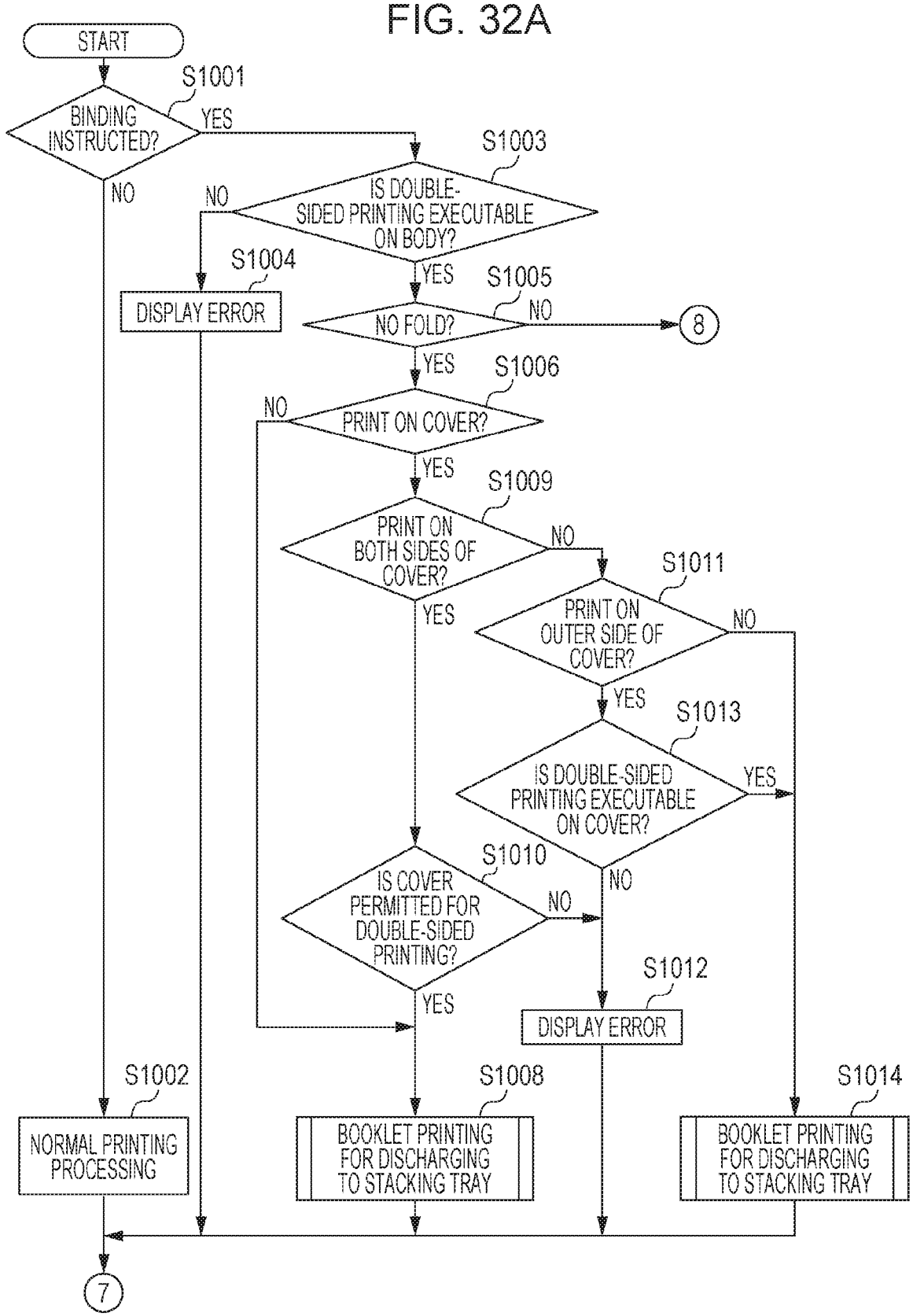
FIGS. 32A and 32B illustrate a flowchart for describing a control example according to the second embodiment of the present invention.
Figure 32B:
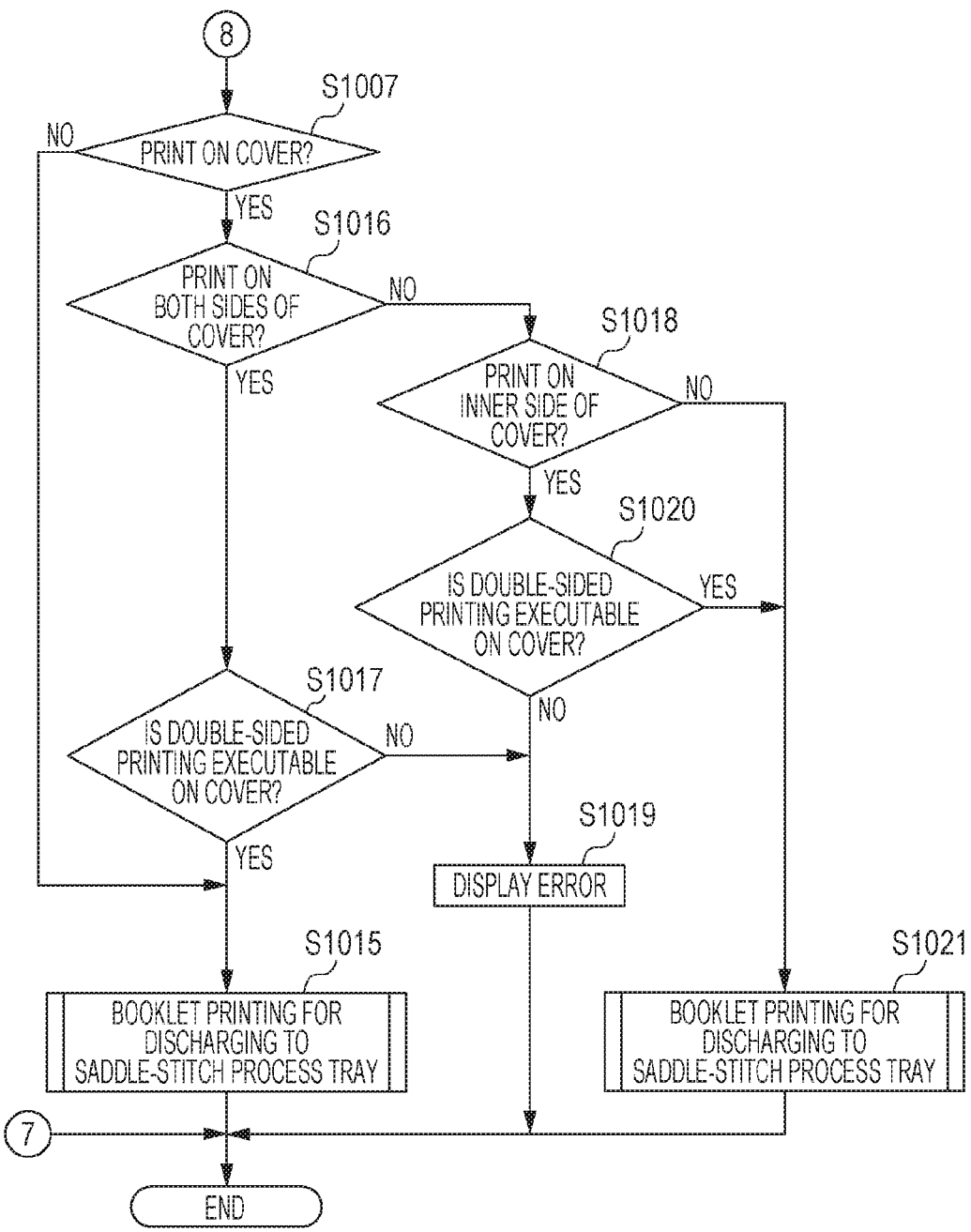

First, in response to a job execution request through the start key 506, the CPU 402 starts processing in the flowchart in FIGS. 32A and 32B. For example, in response to a copy job execution request for printing images of a document read by a scanner unit in the printer unit, the CPU 402 performs the processing in the flowchart scanner 301 after all images of the document are read. In response to a print job execution request for printing, in the printer unit, images received from an external PC, the CPU 402 performs the processing in the flowchart after all images are received from the PC.

First, in S1001 (where S stands for step), the CPU 402 determines whether a binding process is designated or not. If it is determined that a binding process is designated, the CPU 402 advances the processing to S1003. If not, the CPU 402 advances the processing to S1002. Note that, before S1001, the CPU 402 may determine whether the sheet processing apparatus 315 in connection with the image formation apparatus. In this case, if it is determined that the sheet processing apparatus 315 is in connection with the image formation apparatus, the CPU 402 advances the processing to S1001. If it is determined that the sheet processing apparatus 315 is not in connection with the image formation apparatus, the CPU 402 may advance the processing to S1002.

In S1002, the CPU 402 executes normal print processing based on settings received from a user. Then, the processing ends. For example, printing is performed by the image formation apparatus, and the resulting sheets are discharged without executing post-processing by the sheet processing apparatus 315.

On the other hand, when processing moves from S1001 to S1003, the CPU 402 determines whether double-sided printing is executable on the sheets designated to use for the body of a book bound product or not. If it is determined that double-sided printing is not executable on the sheets designated to use for the body of the book bound product, the CPU 402 advances the processing to S1004. On the other hand, if it is determined that double-sided printing is executable on the sheets designated to use for the body of the book bound product, the CPU 402 advances the processing to S1005.

In S1004, the CPU 402 performs processing for forcibly aborting the job. Then, an error message illustrated in FIG. 23 is displayed on the display unit 505. Then, the processing ends.

On the other hand, in S1005, the CPU 402 determines whether a binding layout process with no folding is designated or not is determined. If it is determined that a binding layout process with no folding is designated, the CPU 402 advances the processing to S1006. On the other hand, if it is determined that a binding layout process including folding is designated, the CPU 402 advances the processing to S1007.

In S1006, the CPU 402 determines whether cover sheet printing is designated or not. If it is determined that cover sheet printing is designated, the CPU 402 moves the processing to S1009. If not, the CPU 402 advances the processing to S1008.

Figure 33A:
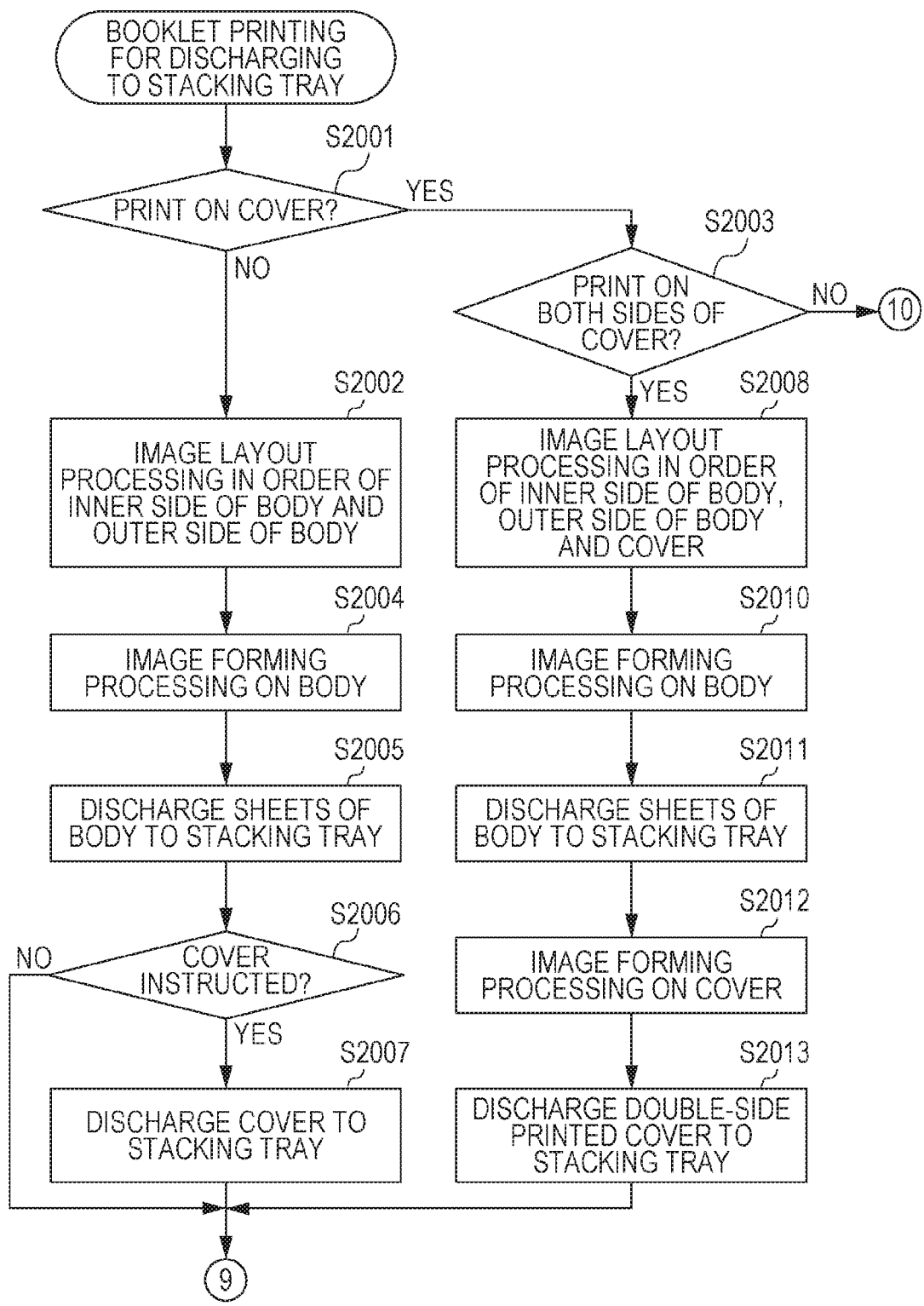
FIGS. 33A and 33B illustrate a flowchart for describing a control example according to the second embodiment of the present invention.
Figure 33B:
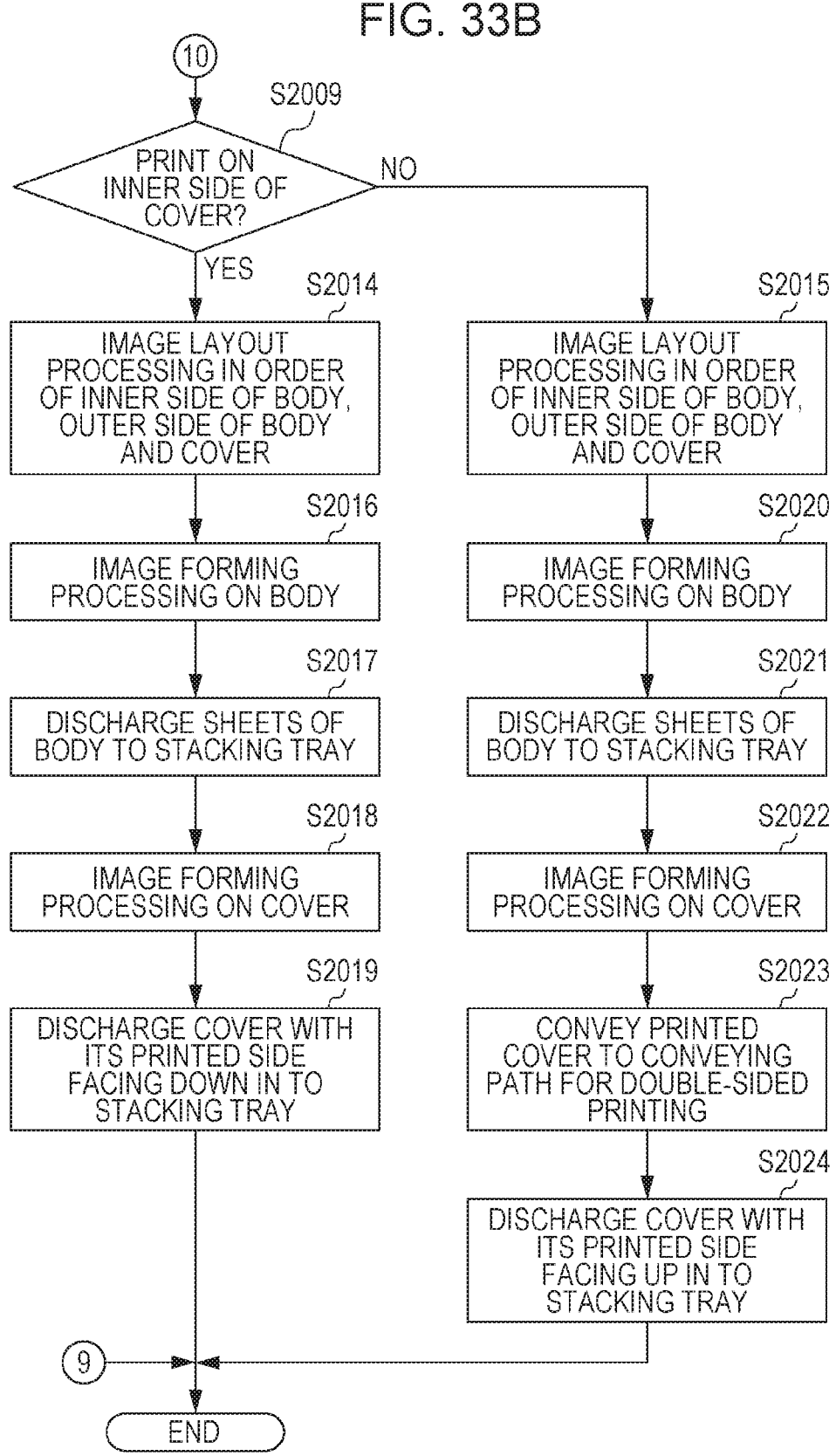

In S1008, the CPU 402 executes booklet print processing illustrated in FIGS. 33A and 33B which discharges sheets to the stacking tray. Then, the processing ends.

On the other hand, in S1009, the CPU 402 determines whether double-sided printing is designated for the cover sheet or not. If it is determined that double-sided printing designated for the cover sheet, the CPU 402 advances the processing to S1010. If not, the CPU 402 advances the processing to S1011.

In S1010, the CPU 402 determines whether double-sided printing is executable on the cover sheet to be attached to the book bound product or not based on the paper type designated to use for the cover sheet and the paper management table illustrated in FIG. 27. A sheet on which double-sided printing is executable can be inverted through the conveying path 57 for double-sided printing described with reference to FIG. 26. On the other hand, a sheet on which double-sided printing is unexecutable cannot be inverted through the conveying path 57 for double-sided printing described with reference to FIG. 26. If it is determined that double-sided printing is not executable on the sheet, the CPU 402 advances the processing to S1012. If it is determined that double-sided printing is executable on the sheet, the CPU 402 advances the processing to S1008.

In S1012, the CPU 402 performs processing for forcibly aborting the job. Then, an error message illustrated in FIG. 24 is displayed on the display unit 505. Then, the processing ends.

On the other hand, in S1011 after S1009, the CPU 402 determines whether printing on the outer side of the cover sheet is designated or not. If it is determined that printing on the outer side of the cover sheet is designated, the CPU 402 advances the processing to S1013. If it is determined printing on the outer side of the cover sheet is not designated, the CPU 402 advances the processing to S1014.

In S1014, the CPU 402 executes booklet print processing illustrated in FIGS. 33A and 33B which discharges sheets to the stacking tray. Then, the processing ends.

On the other hand, in S1013, the CPU 402 determines whether double-sided printing is executable on the sheet for the cover sheet to be attached to the book bound product. If not, the CPU 402 advances the processing to S1012. If so, the CPU 402 advances the processing to S1014.

On the other hand, in S1007, the CPU 402 determines whether printing on the cover sheet is designated or not. If so, the CPU 402 advances the processing to S1016. If not, the CPU 402 advances the processing to S1015.

Figure 34A:
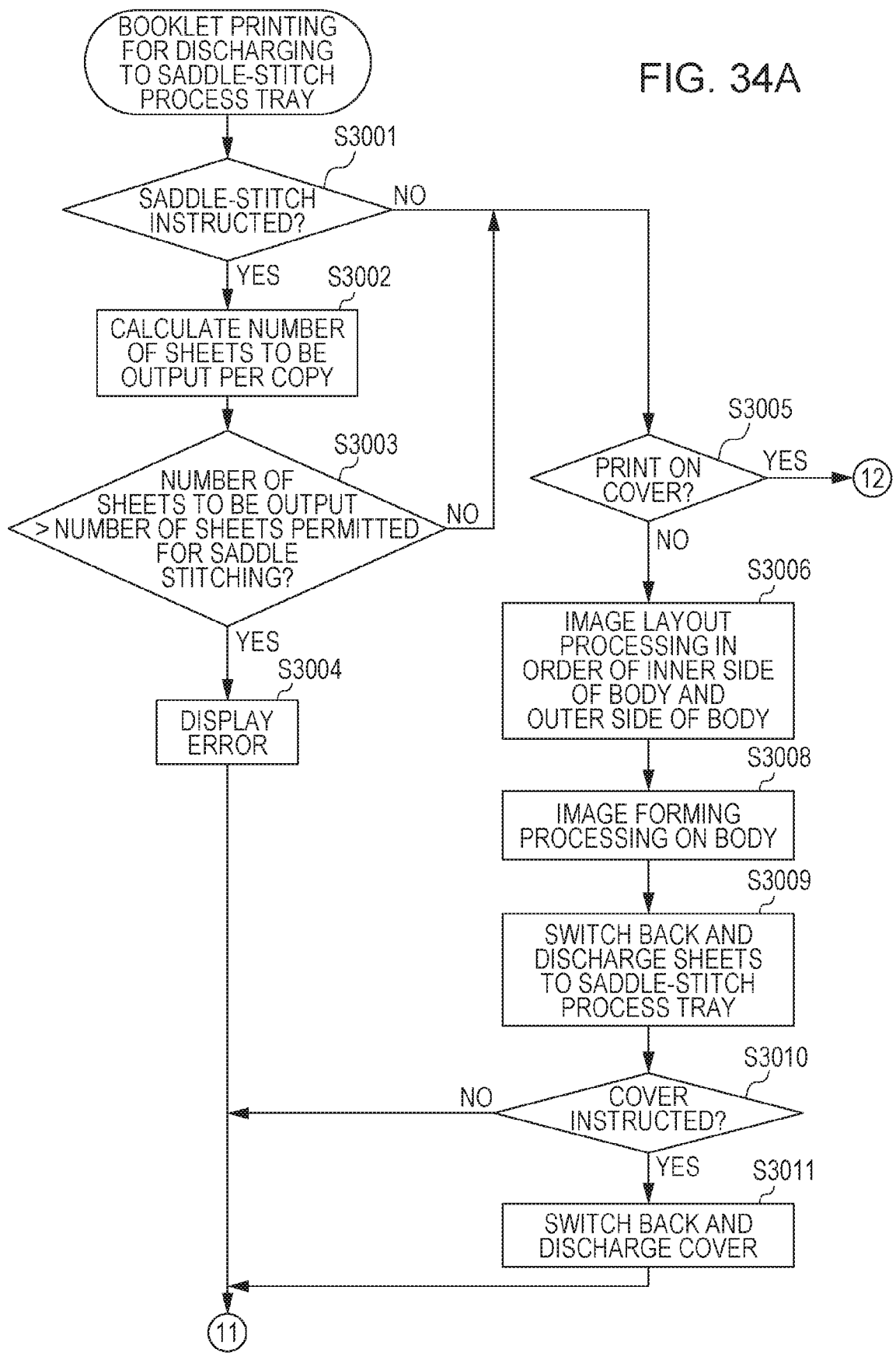
FIGS. 34A and 34B illustrate a flowchart for describing a control example according to the second embodiment of the present invention.
Figure 34B:
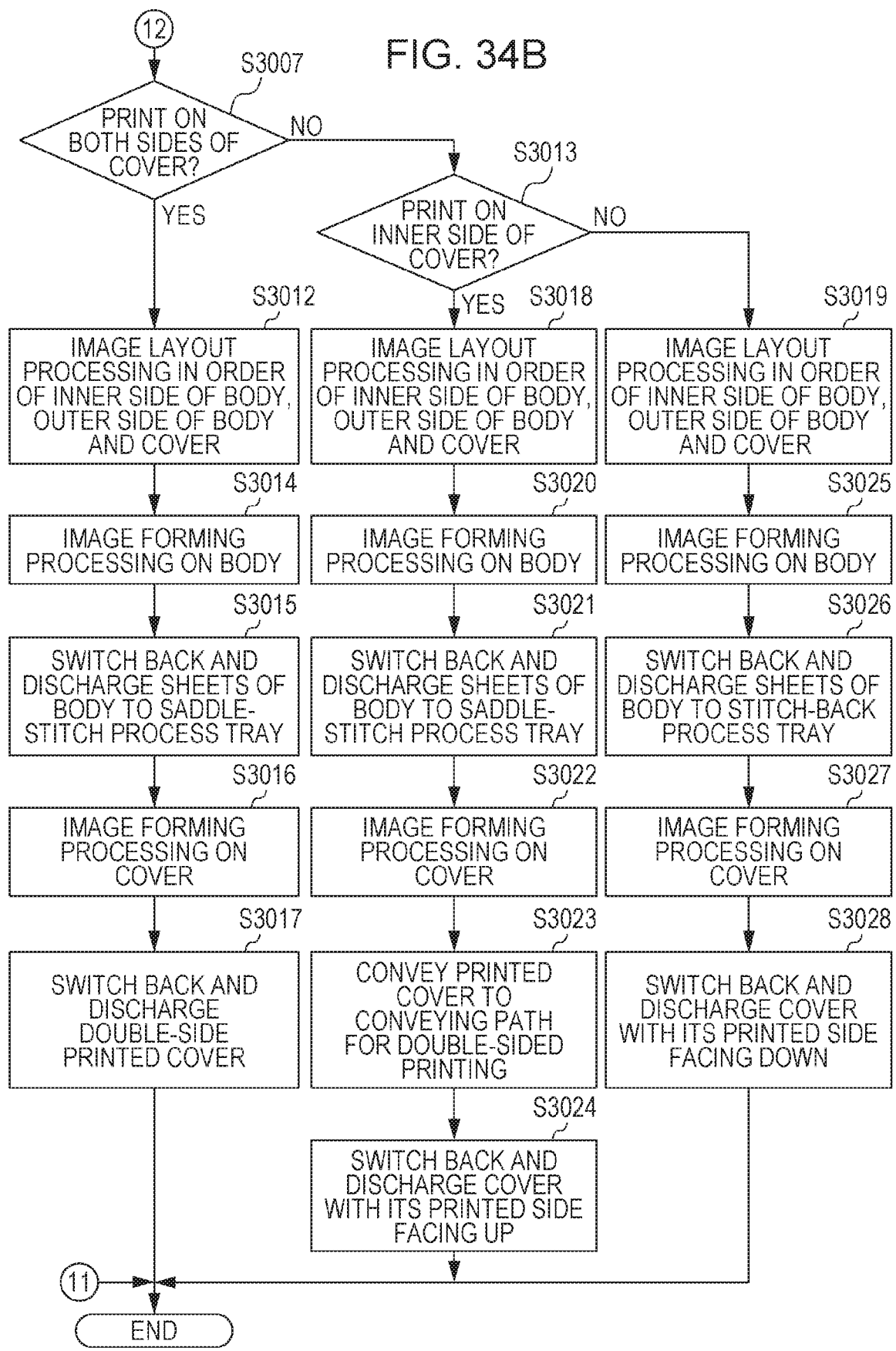

In S1015, the CPU 402 executes booklet printing processing illustrated in FIGS. 34A and 34B which discharges sheets to the binding processing tray. Then, the processing ends.

On the other hand, in S1016, the CPU 402 determines whether double-sided printing is designated for the cover sheet or not. If it is determined that double-sided printing designated for the cover sheet, the CPU 402 advances the processing to S1017. If not, the CPU 402 advances the processing to S1018.

In S1017, the CPU 402 determines whether double-sided printing is executable on the cover sheet to be attached to the book bound product or not. If it is determined that double-sided printing is not executable on the sheet, the CPU 402 advances the processing to S1019. If it is determined that double-sided printing is executable on the sheet, the CPU 402 advances the processing to S1015.

In S1019, the CPU 402 performs processing for forcibly aborting the job. Then, an error message illustrated in FIG. 24 is displayed on the display unit 505. Then, the processing ends.

On the other hand, in S1018, the CPU 402 determines whether printing on the outer side of the cover sheet is designated or not. If it is determined that printing on the inner side of the cover sheet is designated, the CPU 402 advances the processing to S1020. If it is determined that printing on the inner side of the cover sheet is not designated, the CPU 402 advances the processing to S1021.

In S1021, the CPU 402 executes booklet printing processing illustrated in FIGS. 34A and 34B which discharges sheets to the binding processing tray. Then, the processing ends.

On the other hand, in S1020, the CPU 402 determines whether double-sided printing is executable on the sheet for the cover sheet to be attached to the book bound product or not. If not, the CPU 402 advances the processing to S1019. If so, the CPU 402 advances the processing to S1021.

FIGS. 33A and 33B illustrate a flowchart describing the booklet printing processing procedure in S1008 and S1014 in FIG. 32A which discharges sheets to a stacking tray.

First, in S2001, the CPU 402 determines whether printing on the cover sheet is designated or not. If so, the CPU 402 advances the processing to S2003. If not, the CPU 402 advances the processing to S2002.

In S2002, the CPU 402 lays out pages by the method as illustrated in FIG. 28A and advances the processing to S2004.

In S2004, the CPU 402 performs image formation processing on sheets corresponding to the body and advances the processing to S2005.

In S2005, the CPU 402 controls so as to discharge the sheets corresponding to the body to the stacking tray 328 without executing a binding process and a folding process and advances the processing to S2006.

In S2006, the CPU 402 determines whether attachment of a cover sheet is designated or not. If it is determined that cover sheet is designated to attach, the CPU 402 advances the processing to S2007. If not, the processing ends.

In S2007, the CPU 402 controls so as to discharge the sheets corresponding to the cover sheet to the stacking tray 328 without executing a binding process and a folding process. Then, the processing ends.

On the other hand, in S2003 after S2002, the CPU 402 determines whether printing on both sides of the cover sheet is designated or not. If it is determined that printing on both sides of the cover sheet is designated, the CPU 402 advances the processing to S2008. If not, the CPU 402 advances the processing to S2009.

In S2008, the CPU 402 lays out pages by the method as illustrated in FIG. 28B and advances the processing to S2010.

In S2010, the CPU 402 performs image formation processing on sheets corresponding to the body and advances the processing to S2011.

In S2011, the CPU 402 controls so as to discharge the sheets corresponding to the body to the stacking tray 328 without executing a binding process and a folding process.

In S2012, the CPU 402 performs image formation processing on sheets corresponding to the cover sheet and advances the processing to S2013.

In S2013, the CPU 402 controls so as to discharge the sheets corresponding to the cover sheet to the stacking tray 328 without executing a binding process and a folding process. Then, the processing ends.

On the other hand, in S2009 after S2003, the CPU 402 determines whether printing on the inner side of the cover sheet is designated or not. If it is determined that printing on the inner side of the cover sheet is designated, the 402 advances the processing to S2014. If not, the CPU 402 advances the processing to S2015.

In S2014, the CPU 402 lays out pages by the method as illustrated in FIG. 29A, and advances the processing to S2016.

In S2016, the CPU 402 performs image formation processing on sheets corresponding to the body and advances the processing to S2017.

In S2017, the CPU 402 controls so as to discharge the sheets corresponding to the body to the stacking tray 328 without executing a binding process and a folding process.

In S2018, the CPU 402 performs image formation processing on sheets corresponding to the cover sheet and advances the processing to S2019.

In S2019, the CPU 402 discharges the sheet corresponding to the cover sheet to the sheet discharge port 59 with its printed side facing down without executing a binding process and a folding process. Then, the processing ends.

On the other hand, in S2015, the CPU 402 lays out pages by the method as illustrated in FIG. 29B and advances the processing to S2020.

In S2020, the CPU 402 performs image formation processing on sheets corresponding to the body and advances the processing to S2021.

In S2021, the CPU 402 controls so as to discharge the sheets corresponding to the body to the stacking tray 328 without executing a binding process and a folding process.

In S2022, the CPU 402 performs image formation processing on sheets corresponding to the cover sheet and advances the processing to S2023.

In S2023, the CPU 402 discharges the sheet after the fixing process with its printed side facing down to the relay unit 56 and is switched back by the internal structure of the relay unit 56 and is conveyed to the conveying path 57 for double-sided printing. The sheet again passes through the fixing unit 55, and the CPU 402 advances the processing to S2024.

In S2024, the CPU 402 controls so as to discharge the sheet corresponding to the cover sheet with its printed side facing down to the sheet discharge port 59 and discharge the sheet corresponding to the cover sheet without executing a binding process and a folding process to the stacking tray 328. Then, the processing ends.

FIGS. 34A and 34B illustrate a flowchart describing the booklet printing processing procedure in S1015 and S1021 in FIG. 32B which discharges sheets to a binding processing tray.

First, in S3001, the CPU 402 determines whether a saddle stitch process is designated or not. If it is determined that a saddle stitch process is designated, the CPU 402 advances the processing to S3002. If not, the CPU 402 advances the processing to S3005.

In S3002, the CPU 402 calculates the number of output sheets for one copy of the resulting book bound product and advances the processing to S3003. In a case where images of two pages are laid out in one page as illustrated in FIG. 30A, the number of output sheets per copy may be calculated by expression that (the total number of pages+3)/4.

In S3003, the CPU 402 determines whether the number of output sheets per copy is higher than the number of sheets which can undergo saddle stitch processing to be performed by the sheet processing apparatus 315. The number of sheets which can undergo saddle stitch processing to be performed by the sheet processing apparatus 315 is stored in the ROM 404 as capability information of the sheet processing apparatus 315. If it is higher than the number of sheets which can undergo saddle stitch processing, the CPU 402 advances the processing to S3004. If not, the CPU 402 advances the processing to S3005.

In S3004, the CPU 402 performs processing for forcibly aborting the job. Then, an error pop-up message illustrated in FIG. 25 is displayed on the display unit 505. Then, the processing ends. The example has been described above that if it is determined in S3003 that the number of output sheets per copy is higher than the number of sheets which can undergo saddle stitch processing, the CPU 402 advances the processing to S3004 and that an error pop-up message illustrated in FIG. 25 is then displayed on the display unit 505. However, the present invention is not limited thereto. If it is determined in S3003 that the number of output sheets per copy is higher than the number of sheets which can undergo saddle stitch processing, the CPU 402 may advance the processing to S2001 in FIG. 33A and may execute the booklet printing processing procedure which discharges the sheets to the stacking tray.

On the other hand, in S3005, the CPU 402 determines whether printing on the cover sheet is designated or not. If so, the CPU 402 advances the processing to S3007. If not, the CPU 402 advances the processing to S3006.

In S3006, the CPU 402 lays out pages by the method as illustrated in FIG. 30A and advances the processing to S3008.

In S3008, the CPU 402 performs image formation processing on sheets corresponding to the body and advances the processing to S3009.

In S3009, the CPU 402 controls so as to switch back the sheets corresponding to the body through the conveyance rollers 37 and 38 and then store them within the conveying path 41.

In S3010, the CPU 402 determines whether attachment of a cover sheet is designated or not. If it is determined that cover sheet is designated to attach, the CPU 402 advances the processing to S3011. If not, the processing ends.

In S3011, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S3007, the CPU 402 determines whether printing on both sides of the cover sheet is designated or not. If it is determined that printing on both sides of the cover sheet is designated, the CPU 402 advances the processing to S3012. If not, the CPU 402 advances the processing to S3013.

In S3012, the CPU 402 lays out pages by the method as illustrated in FIG. 30B and advances the processing to S3014.

In S3014, the CPU 402 performs image formation processing on sheets corresponding to the body and advances the processing to S3015.

In S3015, the CPU 402 controls so as to switch back the sheets corresponding to the body through the conveyance rollers 37 and 38 and then store them within the conveying path 41.

In S3016, the CPU 402 performs image formation processing on sheets corresponding to the cover sheet and advances the processing to S3017.

In S3017, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S3013, the CPU 402 determines whether printing on the inner side of the cover sheet is designated or not. If it is determined that printing on the inner side of the cover sheet is designated, the CPU 402 advances the processing to S3018. If it is determined printing on the inner side of the cover sheet is not designated, the CPU 402 advances the processing to S3019.

In S3018, the CPU 402 lays out pages by the method as illustrated in FIG. 31A, and advances the processing to S3020.

In S3020, the CPU 402 performs image formation processing on sheets corresponding to the body and advances the processing to S3021.

In S3021, the CPU 402 controls so as to switch back the sheets corresponding to the body through the conveyance rollers 37 and 38 and then store them within the conveying path 41.

In S3022, the CPU 402 performs image formation processing on sheets corresponding to the cover sheet and advances the processing to S3023.

In S3023, the CPU 402 discharges the sheet after the fixing process with its printed side facing down to the relay unit 56 and is switched back by the internal structure of the relay unit 56 and is conveyed to the conveying path 57 for double-sided printing. The sheet again passes through the fixing unit 55, and the CPU 402 advances the processing to S3024.

In S3024, the CPU 402 discharges the sheet to the sheet discharge port 59 with its printed side facing up. After that, the CPU 402 switches back the sheet corresponding to the cover sheet through the conveyance rollers 37 and 38 and then stores it within the conveying path 41. The CPU 402 controls so as to execute saddle-stitch process and then a folding process and discharge the book bound product to the saddle-stitch bookbinding tray 331. Then, the processing ends.

On the other hand, in S3019, the CPU 402 lays out pages by the method as illustrated in FIG. 31B and advances the processing to S3025.

In S3025, the CPU 402 performs image formation processing on sheets corresponding to the body and advances the processing to S3026.

In S3026, the CPU 402 controls so as to switch back the sheets corresponding to the body through the conveyance rollers 37 and 38 and then store them within the conveying path 41.

In S3027, the CPU 402 performs image formation processing on sheets corresponding to the cover sheet and advances the processing to S3028.

In S3028, the CPU 402 switches back the sheet corresponding to the cover sheet through the conveyance rollers 37 and 38 and then stores it within the conveying path 41. The CPU 402 controls so as to perform a binding process and a folding process and discharge the saddle-stitch bookbinding tray 331. The processing ends then.

As described above, in a case where a sheet on which double-sided printing is unexecutable is used as a cover sheet of a book bound product, the sheet is discharged to a sheet processing apparatus having a switch back mechanism so that its printed side may face down. Thus, a book bound product with a cover sheet having an image printed on its outer side may be acquired in the binding processing tray.

OTHER EMBODIMENTS

Having described that how pages of images of a document are to be laid out in order to generate a leftward book bound product according to the aforementioned embodiment, the present invention is not limited to a leftward book bound product.

Having descried various examples and embodiments according to the present invention above, it should be understood by a person skilled in the art that the spirit and scope of the present invention is not limited to specific descriptions herein.

The present invention may be implemented by processing including supplying a program which implements one or more functions of the aforementioned embodiments to a system or an apparatus over a network or through a storage medium and reading and executing the program by one or more processors in a computer of the system or apparatus. The present invention may also be implemented by a circuit (such as an ASIC) which implements the one or more functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus capable of conveying sheets printed with images to a sheet processing apparatus, wherein the sheet processing apparatus is capable of (i) discharging the sheets conveyed from the printing apparatus to a first tray without reversing the conveyed sheets and without executing a saddle stitch bookbinding process, and (ii) discharging the sheets conveyed from the printing apparatus to a second tray after reversing the conveyed sheets and executing the saddle stitch bookbinding process for the reversed sheets, the printing apparatus comprising:
 a printer configured to print images on a plurality of sheets;
 an operating unit configured to receive a setting of executing the saddle stitch bookbinding process for the plurality of sheets; and
 a controller configured to determine whether or not a number of the plurality of sheets exceeds a predetermined number in a case where the operating unit receives the setting of executing the saddle stitch bookbinding process for the plurality of sheets,
 wherein in a case where it is determined that the number of the plurality of sheets exceeds the predetermined number, the controller is configured to control the printer to print the images on the plurality of sheets in a first printing order and control the sheet processing apparatus to discharge the plurality of sheets in the first tray,
 wherein in a case where it is determined that the number of the plurality of sheets doesn't exceeds the predetermined number, the controller is configured to control the printer to print the images on the plurality of sheets in a second printing order and control the sheet processing apparatus to execute the saddle stitch bookbinding process for the plurality of sheets and discharge the plurality of sheets to the second tray, and
 wherein an order of printing images on front and back sides of each of the plurality of sheets in the second printing order is opposite to that in the first printing order.

2. The printing apparatus according to claim 1, further comprising:
 a double-sided conveying path configured to convey each sheet, a first side of which an image has been printed on, to the printer so as to print an image on a second side thereof; and
 a discharge conveying path configured to convey each sheet, both sides of which images have been printed on, to the sheet processing apparatus.

3. The printing apparatus according to claim 1, wherein a conveying order of the plurality of sheets passing the discharge conveying path in a case where images are printed in the first printing order is same as a conveying order of the plurality of sheets in a case where images are printed in the second printing order.

4. The printing apparatus according to claim 1, wherein the operating unit includes a display and is configured to receive the setting via a setting screen on the display.

5. The printing apparatus according to claim 1, wherein the saddle stitch bookbinding process includes a binding process and a folding process for the plurality of sheets.

6. The printing apparatus according to claim 1, wherein the first printing order is an order of printing an image on a front side of a sheet before printing an image on a back side of the sheet, and the second printing order is an order of printing an image on a front side of a sheet after printing an image on a back side of the sheet.

7. The printing apparatus according to claim 1, wherein the first printing order is an order of printing an image on a front side of a sheet after printing an image on a back side of the sheet, and the second printing order is an order of printing an image on a front side of a sheet before printing an image on a back side of the sheet.

8. A printing system comprising:
 a printer configured to print images on both sides of a plurality of sheets;
 a reversing unit configured to reverse the plurality of sheets, both of which images have been printed on by the printer;
 a saddle stitching bookbinding unit configured to execute a saddle stitch bookbinding process for the plurality of sheets reversed by the reversing unit;
 a first discharging unit configured to discharge sheets to a first tray;
 a second discharging unit configured to discharge the plurality of sheets for which the saddle stitch bookbinding process is executed by the saddle stitching bookbinding unit to a second tray;
 an operating unit configured to receive a setting of executing the saddle stitch bookbinding process for the plurality of sheets;
 a controller configured to determine whether or not a number of the plurality of sheets exceeds a predetermined number in a case where the operating unit receives the setting of executing the saddle stitch bookbinding process for the plurality of sheets,
 wherein in a case where it is determined that the number of the plurality of sheets exceeds the predetermined number, the controller is configured to control the printer to print the images on the plurality of sheets in a first printing order and control the first discharging unit to discharge the plurality of sheets to the first tray, and
 wherein in a case where it is determined that the number of the plurality of sheets doesn't exceed the predetermined number, the controller is configured to control the printer to print the images on the plurality of sheets in a second printing order, control the saddle stitching bookbinding unit to execute the saddle stitch bookbinding process for the plurality of sheets, and control the second discharging unit to discharge the plurality of sheets to the second tray, wherein an order of printing images on front and back sides of each of the plurality of sheets in the second printing order is opposite to that in the first printing order.

* * * * *